United States Patent
Jeong et al.

(10) Patent No.: US 8,493,973 B2
(45) Date of Patent: Jul. 23, 2013

(54) METHOD OF AND APPARATUS FOR TRANSMITTING DIGITAL BROADCASTING SIGNAL IN ADVANCED-VSB (A-VSB) SYSTEM IN WHICH TRANSPORT PACKET WITHOUT ADAPTATION FIELD IS PROVIDED AT FIXED LOCATION IN DATA FIELD SLICES

(75) Inventors: Hae-joo Jeong, Seoul (KR); Jung-pil Yu, Suwon-si (KR); Joon-soo Kim, Suwon-si (KR); Yong-sik Kwon, Seoul (KR); Eui-Jun Park, Suwon-si (KR); Jin-hee Jeong, Suwon-si (KR); Kum-ran Ji, Seoul (KR); Jong-hun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1089 days.

(21) Appl. No.: 11/692,509

(22) Filed: Mar. 28, 2007

(65) Prior Publication Data
US 2007/0230460 A1    Oct. 4, 2007

Related U.S. Application Data

(60) Provisional application No. 60/788,707, filed on Apr. 4, 2006, provisional application No. 60/789,603, filed on Apr. 6, 2006.

(51) Int. Cl.
H04L 12/56    (2006.01)

(52) U.S. Cl.
USPC ........... 370/389; 370/335; 370/319; 375/340; 375/270; 375/233

(58) Field of Classification Search
USPC .......................................... 370/389, 390, 474
See application file for complete search history.

(56) References Cited

U.S. PATENT DOCUMENTS 6,671,314 B1 * 12/2003 Abe et al. ...................... 375/233
6,738,102 B1    5/2004 Park et al.
(Continued)

FOREIGN PATENT DOCUMENTS

| WO | WO 2004/062283 A1 | 7/2004 |
| WO | WO 2005/002221 | 1/2005 |
| WO | WO 2006/001635 A1 | 1/2006 |
| WO | WO 2007/114653 A1 | 10/2007 |

OTHER PUBLICATIONS

U.S. Appl. No. 11/416,254, filed May 3, 2006, Jung-pil Yu et al., Samsung Electronics Co., Ltd.

(Continued)

*Primary Examiner* — Dang T Ton
*Assistant Examiner* — Pamit Kaur
(74) *Attorney, Agent, or Firm* — Sughrue Mion, PLLC

(57) ABSTRACT

A method of processing a digital broadcasting signal includes generating a transport stream including a plurality of transport packets; selecting one of the transport packets as a starting packet to be mapped into a first data segment of an encoded data frame; and constructing deterministic data frames in the transport stream beginning with the starting packet; wherein at least one of the 52 transport packets does not have an adaptation field; wherein all remaining ones of the 52 transport packets do have an adaptation field; and wherein the at least one transport packet that does not have an adaptation field is provided at a fixed location in each of the slices.

4 Claims, 57 Drawing Sheets

U.S. PATENT DOCUMENTS

| | | | |
|---|---|---|---|
| 6,757,265 B1* | 6/2004 | Sebastian et al. | 370/319 |
| 6,810,084 B1* | 10/2004 | Jun et al. | 375/240.28 |
| 6,922,213 B2* | 7/2005 | Yamagata | 348/423.1 |
| 2003/0103481 A1* | 6/2003 | Heo et al. | 370/335 |
| 2003/0140304 A1* | 7/2003 | Hurt et al. | 714/786 |
| 2005/0162886 A1* | 7/2005 | Jeong et al. | 365/63 |
| 2005/0271158 A1* | 12/2005 | Birru | 375/270 |
| 2006/0039462 A1* | 2/2006 | Choi et al. | 375/240.01 |
| 2006/0159193 A1* | 7/2006 | Mattsson et al. | 375/265 |
| 2006/0271983 A1* | 11/2006 | Katayama et al. | 725/100 |

OTHER PUBLICATIONS

U.S. Appl. No. 11/416,258, filed May 3, 2006, Yong-sik Kwon et al., Samsung Electronics Co., Ltd.

U.S. Appl. No. 11/416,457, filed May 3, 2006, Jung-pil Yu et al., Samsung Electronics Co., Ltd.

U.S. Appl. No. 11/503,970, filed Aug. 15, 2006, Jung-pil Yu et al., Samsung Electronics Co., Ltd.

U.S. Appl. No. 11/504,024, filed Aug. 15, 2006, Jung-pil Yu et al., Samsung Electronics Co., Ltd.

U.S. Appl. No. 11/504,027, filed Aug. 15, 2006, Jung-pil Yu et al., Samsung Electronics Co., Ltd.

U.S. Appl. No. 11/504,029, filed Aug. 15, 2006, Jung-pil Yu et al., Samsung Electronics Co., Ltd.

U.S. Appl. No. 11/504,030, filed Aug. 15, 2006, Jung-pil Yu et al., Samsung Electronics Co., Ltd.

U.S. Appl. No. 11/504,031, filed Aug. 15, 2006, Jung-pil Yu et al., Samsung Electronics Co., Ltd.

U.S. Appl. No. 11/504,038, filed Aug. 15, 2006, Jung-pil Yu et al., Samsung Electronics Co., Ltd.

U.S. Appl. No. 11/504,651, filed Aug. 16, 2006, Jung-pil Yu et al., Samsung Electronics Co., Ltd.

U.S. Appl. No. 11/504,724, filed Aug. 16, 2006, Jung-pil Yu et al., Samsung Electronics Co., Ltd.

U.S. Appl. No. 11/504,725, filed Aug. 16, 2006, Jung-pil Yu et al., Samsung Electronics Co., Ltd.

U.S. Appl. No. 11/504,726, filed Aug. 16, 2006, Jung-pil Yu et al., Samsung Electronics Co., Ltd.

U.S. Appl. No. 11/505,369, filed Aug. 17, 2006, Jung-pil Yu et al., Samsung Electronics Co., Ltd.

U.S. Appl. No. 11/505,894, filed Aug. 18, 2006, Eui-jun Park et al., Samsung Electronics Co., Ltd.

U.S. Appl. No. 11/508,144, filed Aug. 23, 2006, Jung-pil Yu et al., Samsung Electronics Co., Ltd.

U.S. Appl. No. 11/523,716, filed Sep. 20, 2006, Jung-pil Yu et al., Samsung Electronics Co., Ltd.

International Search Report issued on Jul. 13, 2007, in International Application No. PCT/KR2007/001667.

Written Opinion of the International Searching Authority issued on Jul. 13, 2007, in International Application No. PCT/KR2007/001667.

"A/53: ATSC Digital Television Stardard, Parts 1-6", ATSC Standards, Advanced Television Systems Committee, Inc, Jan. 3, 2007, pp. 1-136.

European Search Report, dated Sep. 21, 2011, from the European Patent Office, issued in Ecounterpart uropean Application No. 09177099.0.

Y. Lee, et al., "ATSC Terrestrial Digital Television Broadcasting Using Single Frequency Networks", ETRI Journal, vol. 26, No. 2, Apr. 2004, pp. 92-100.

"ATSC Standard: Digital Television Standard (A/53), Revision D, Including Amendment No. 1", Advanced Television Systems Committee, Jul. 27, 2005, pp. 1-104.

Communication dated Jan. 11, 2013 issued by the European Patent Office in counterpart European Patent Application No. 09177099.0.

* cited by examiner

FIG. 14
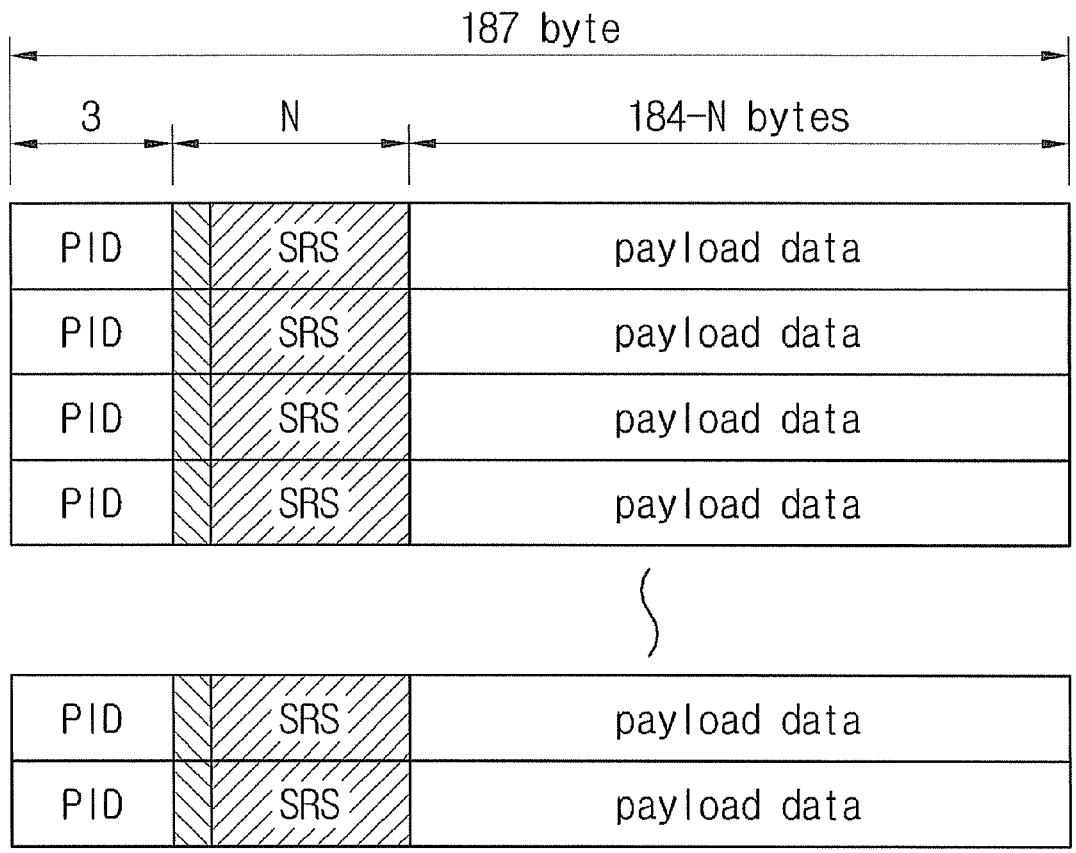
 adaptation field header
 SRS pattern

FIG. 21

| | 3 bytes | 2 bytes | 6 bytes | {4,14,21} bytes | 182-{10,20,26} bytes |
|---|---|---|---|---|---|
| 1 | Header | AF Head | | {10,20,26} bytes of SRS | Normal 182-{10,20,26} bytes |
| 2 | Header | AF Head | | {10,20,26} bytes of SRS | Normal 182-{10,20,26} bytes |
| 3 | Header | AF Head | | {10,20,26} bytes of SRS | Normal 182-{10,20,26} bytes |
| 4 | Header | AF Head | | {10,20,26} bytes of SRS | Normal 182-{10,20,26} bytes |
| 5 | Header | AF Head | | {10,20,26} bytes of SRS | Normal 182-{10,20,26} bytes |
| 6 | Header | AF Head | | {10,20,26} bytes of SRS | Normal 182-{10,20,26} bytes |
| 7 | Header | AF Head | | {10,20,26} bytes of SRS | Normal 182-{10,20,26} bytes |
| 8 | Header | AF Head | | {10,20,26} bytes of SRS | Normal 182-{10,20,26} bytes |
| 9 | Header | AF Head | | {10,20,26} bytes of SRS | Normal 182-{10,20,26} bytes |
| 10 | Header | AF Head | | {10,20,26} bytes of SRS | Normal 182-{10,20,26} bytes |
| 11 | Header | AF Head | | {10,20,26} bytes of SRS | Normal 182-{10,20,26} bytes |
| 12 | Header | AF Head | | {10,20,26} bytes of SRS | Normal 182-{10,20,26} bytes |
| 13 | Header | AF Head | | {10,20,26} bytes of SRS | Normal 182-{10,20,26} bytes |
| 14 | Header | AF Head | | {10,20,26} bytes of SRS | Normal 182-{10,20,26} bytes |
| 15 | Header | AF Head | reserved for PCR | {4,14,20} bytes SRS | Normal 182-{10,20,26} bytes |
| 16 | Header | AF Head | | {10,20,26} bytes of SRS | Normal 182-{10,20,26} bytes |
| 17 | Header | AF Head | | {10,20,26} bytes of SRS | Normal 182-{10,20,26} bytes |
| 18 | Header | AF Head | | {10,20,26} bytes of SRS | Normal 182-{10,20,26} bytes |
| 19 | Header | AF Head | Splice | {9,19,25} bytes of SRS | Normal 182-{10,20,26} bytes |
| 20 | Header | AF Head | | {10,20,26} bytes of SRS | Normal 182-{10,20,26} bytes |
| 21 | Header | AF Head | | {10,20,26} bytes of SRS | Normal 182-{10,20,26} bytes |
| 22 | Header | AF Head | | {10,20,26} bytes of SRS | Normal 182-{10,20,26} bytes |
| 23 | Header | AF Head | | {10,20,26} bytes of SRS | Normal 182-{10,20,26} bytes |
| 24 | Header | AF Head | | {10,20,26} bytes of SRS | Normal 182-{10,20,26} bytes |
| 25 | Header | AF Head | | {10,20,26} bytes of SRS | Normal 182-{10,20,26} bytes |
| 26 | Header | AF Head | | {10,20,26} bytes of SRS | Normal 182-{10,20,26} bytes |
| 27 | Header | AF Head | | {10,20,26} bytes of SRS | Normal 182-{10,20,26} bytes |
| 28 | Header | AF Head | | {10,20,26} bytes of SRS | Normal 182-{10,20,26} bytes |
| 29 | Header | AF Head | | {10,20,26} bytes of SRS | Normal 182-{10,20,26} bytes |
| 30 | Header | AF Head | | {10,20,26} bytes of SRS | Normal 182-{10,20,26} bytes |
| 31 | Header | AF Head | | {10,20,26} bytes of SRS | Normal 182-{10,20,26} bytes |
| 32 | Header | AF Head | | {10,20,26} bytes of SRS | Normal 182-{10,20,26} bytes |
| 33 | Header | AF Head | | {10,20,26} bytes of SRS | Normal 182-{10,20,26} bytes |
| 34 | Header | AF Head | | {10,20,26} bytes of SRS | Normal 182-{10,20,26} bytes |
| 35 | Header | AF Head | | {10,20,26} bytes of SRS | Normal 182-{10,20,26} bytes |
| 36 | Header | AF Head | | {10,20,26} bytes of SRS | Normal 182-{10,20,26} bytes |
| 37 | Header | AF Head | | {10,20,26} bytes of SRS | Normal 182-{10,20,26} bytes |
| 38 | Header | AF Head | | {10,20,26} bytes of SRS | Normal 182-{10,20,26} bytes |
| 39 | Header | AF Head | | {10,20,26} bytes of SRS | Normal 182-{10,20,26} bytes |
| 40 | Header | AF Head | | {10,20,26} bytes of SRS | Normal 182-{10,20,26} bytes |
| 41 | Header | AF Head | | {10,20,26} bytes of SRS | Normal 182-{10,20,26} bytes |
| 42 | Header | AF Head | | {10,20,26} bytes of SRS | Normal 182-{10,20,26} bytes |
| 43 | Header | AF Head | | {10,20,26} bytes of SRS | Normal 182-{10,20,26} bytes |
| 44 | Header | AF Head | | {10,20,26} bytes of SRS | Normal 182-{10,20,26} bytes |
| 45 | Header | AF Head | | {10,20,26} bytes of SRS | Normal 182-{10,20,26} bytes |
| 46 | Header | AF Head | | {10,20,26} bytes of SRS | Normal 182-{10,20,26} bytes |
| 47 | Header | AF Head | | {10,20,26} bytes of SRS | Normal 182-{10,20,26} bytes |
| 48 | Header | AF Head | | {10,20,26} bytes of SRS | Normal 182-{10,20,26} bytes |
| 49 | Header | AF Head | | {10,20,26} bytes of SRS | Normal 182-{10,20,26} bytes |
| 50 | Header | AF Head | | {10,20,26} bytes of SRS | Normal 182-{10,20,26} bytes |
| 51 | Header | AF Head | | {10,20,26} bytes of SRS | Normal 182-{10,20,26} bytes |
| 52 | Header | AF Head | | {10,20,26} bytes of SRS | Normal 182-{10,20,26} bytes |

| | 3 bytes | 2 bytes | 6 bytes | {4,14,21} bytes | 182-{10,20,26} bytes |
|---|---|---|---|---|---|
| 1 | Header | AF Head | | {10,20,26} bytes of SRS | Normal 182-{10,20,26} bytes |
| 2 | Header | AF Head | | {10,20,26} bytes of SRS | Normal 182-{10,20,26} bytes |
| 3 | Header | AF Head | | {10,20,26} bytes of SRS | Normal 182-{10,20,26} bytes |
| 4 | Header | AF Head | | {10,20,26} bytes of SRS | Normal 182-{10,20,26} bytes |
| 5 | Header | AF Head | | {10,20,26} bytes of SRS | Normal 182-{10,20,26} bytes |
| 6 | Header | AF Head | | {10,20,26} bytes of SRS | Normal 182-{10,20,26} bytes |
| 7 | Header | AF Head | | {10,20,26} bytes of SRS | Normal 182-{10,20,26} bytes |
| 8 | Header | AF Head | | {10,20,26} bytes of SRS | Normal 182-{10,20,26} bytes |
| 9 | Header | AF Head | | {10,20,26} bytes of SRS | Normal 182-{10,20,26} bytes |
| 10 | Header | AF Head | | {10,20,26} bytes of SRS | Normal 182-{10,20,26} bytes |
| 11 | Header | AF Head | | {10,20,26} bytes of SRS | Normal 182-{10,20,26} bytes |
| 12 | Header | AF Head | | {10,20,26} bytes of SRS | Normal 182-{10,20,26} bytes |
| 13 | Header | AF Head | | {10,20,26} bytes of SRS | Normal 182-{10,20,26} bytes |
| 14 | Header | AF Head | | {10,20,26} bytes of SRS | Normal 182-{10,20,26} bytes |
| 15 | Header | AF Head | PCR/Private Data/AF Ext | {4,14,20} bytes SRS | Normal 182-{10,20,26} bytes |
| 16 | Header | | {Null.PAT.PMT} packet In SRS-10 bytes | | |
| 17 | Header | AF Head | | {10,20,26} bytes of SRS | Normal 182-{10,20,26} bytes |
| 18 | Header | AF Head | | {10,20,26} bytes of SRS | Normal 182-{10,20,26} bytes |
| 19 | Header | AF Head | Splice | {9,19,25} bytes of SRS | Normal 182-{10,20,26} bytes |
| 20 | Header | AF Head | | {10,20,26} bytes of SRS | Normal 182-{10,20,26} bytes |
| 21 | Header | AF Head | | {10,20,26} bytes of SRS | Normal 182-{10,20,26} bytes |
| 22 | Header | AF Head | | {10,20,26} bytes of SRS | Normal 182-{10,20,26} bytes |
| 23 | Header | AF Head | | {10,20,26} bytes of SRS | Normal 182-{10,20,26} bytes |
| 24 | Header | AF Head | | {10,20,26} bytes of SRS | Normal 182-{10,20,26} bytes |
| 25 | Header | | {Null.PAT.PMT} packet In SRS-20 bytes | | |
| 26 | Header | AF Head | | {10,20,26} bytes of SRS | Normal 182-{10,20,26} bytes |
| 27 | Header | AF Head | | {10,20,26} bytes of SRS | Normal 182-{10,20,26} bytes |
| 28 | Header | AF Head | | {10,20,26} bytes of SRS | Normal 182-{10,20,26} bytes |
| 29 | Header | AF Head | | {10,20,26} bytes of SRS | Normal 182-{10,20,26} bytes |
| 30 | Header | AF Head | | {10,20,26} bytes of SRS | Normal 182-{10,20,26} bytes |
| 31 | Header | | {Null.PAT.PMT} packet In SRS-26 bytes | | |
| 32 | Header | AF Head | | {10,20,26} bytes of SRS | Normal 182-{10,20,26} bytes |
| 33 | Header | AF Head | | {10,20,26} bytes of SRS | Normal 182-{10,20,26} bytes |
| 34 | Header | AF Head | | {10,20,26} bytes of SRS | Normal 182-{10,20,26} bytes |
| 35 | Header | AF Head | | {10,20,26} bytes of SRS | Normal 182-{10,20,26} bytes |
| 36 | Header | AF Head | | {10,20,26} bytes of SRS | Normal 182-{10,20,26} bytes |
| 37 | Header | AF Head | | {10,20,26} bytes of SRS | Normal 182-{10,20,26} bytes |
| 38 | Header | AF Head | | {10,20,26} bytes of SRS | Normal 182-{10,20,26} bytes |
| 39 | Header | AF Head | | {10,20,26} bytes of SRS | Normal 182-{10,20,26} bytes |
| 40 | Header | AF Head | | {10,20,26} bytes of SRS | Normal 182-{10,20,26} bytes |
| 41 | Header | AF Head | | {10,20,26} bytes of SRS | Normal 182-{10,20,26} bytes |
| 42 | Header | AF Head | | {10,20,26} bytes of SRS | Normal 182-{10,20,26} bytes |
| 43 | Header | AF Head | | {10,20,26} bytes of SRS | Normal 182-{10,20,26} bytes |
| 44 | Header | AF Head | | {10,20,26} bytes of SRS | Normal 182-{10,20,26} bytes |
| 45 | Header | AF Head | | {10,20,26} bytes of SRS | Normal 182-{10,20,26} bytes |
| 46 | Header | AF Head | | {10,20,26} bytes of SRS | Normal 182-{10,20,26} bytes |
| 47 | Header | AF Head | | {10,20,26} bytes of SRS | Normal 182-{10,20,26} bytes |
| 48 | Header | AF Head | | {10,20,26} bytes of SRS | Normal 182-{10,20,26} bytes |
| 49 | Header | AF Head | | {10,20,26} bytes of SRS | Normal 182-{10,20,26} bytes |
| 50 | Header | AF Head | | {10,20,26} bytes of SRS | Normal 182-{10,20,26} bytes |
| 51 | Header | AF Head | | {10,20,26} bytes of SRS | Normal 182-{10,20,26} bytes |
| 52 | Header | AF Head | | {10,20,26} bytes of SRS | Normal 182-{10,20,26} bytes |

Harmonized ATSC SFN Functionality

ATSC A-VSB Exciter

SFN Synchronizaion Timelines

Expansion by 2 [1byte -> 2bytes]

Expansion by 4 [1byte -> 4bytes]

1/2 rate encoding

1/2 rate encoding

FIG. 50

|   | 3 bytes | 2 bytes | 128 bytes | 54 bytes |
|---|---------|---------|-----------|----------|
| 1 | PID | AF Header | 128 bytes of Turbo data | 54 bytes of Normal data |
| 2 | PID | | 184 bytes of Normal data | |
| 3 | PID | | 184 bytes of Normal data | |
| 4 | PID | | 184 bytes of Normal data | |
| 5 | PID | AF Header | 128 bytes of Turbo data | 54 bytes of Normal data |
| 6 | PID | | 184 bytes of Normal data | |
| 7 | PID | | 184 bytes of Normal data | |
| 8 | PID | | 184 bytes of Normal data | |
| 9 | PID | AF Header | 128 bytes of Turbo data | 54 bytes of Normal data |
| 10 | PID | | 184 bytes of Normal data | |
| 11 | PID | | 184 bytes of Normal data | |
| 12 | PID | | 184 bytes of Normal data | |
| 13 | PID | AF Header | 128 bytes of Turbo data | 54 bytes of Normal data |
| 14 | PID | | 184 bytes of Normal data | |
| 15 | PID | AF Header | reserved for PCR(6 bytes)    176 bytes of Normal data | |
| 16 | PID | | 184 bytes of Normal data | |
| 17 | PID | AF Header | 128 bytes of Turbo data | 54 bytes of Normal data |
| 18 | PID | | 184 bytes of Normal data | |
| 19 | PID | AF Header | Splice(1 byte)    184 bytes of Normal data | |
| 20 | PID | | 184 bytes of Normal data | |
| 21 | PID | AF Header | 128 bytes of Turbo data | 54 bytes of Normal data |
| 22 | PID | | 184 bytes of Normal data | |
| 23 | PID | | 184 bytes of Normal data | |
| 24 | PID | | 184 bytes of Normal data | |
| 25 | PID | AF Header | 128 bytes of Turbo data | 54 bytes of Normal data |
| 26 | PID | | 184 bytes of Normal data | |
| 27 | PID | | 184 bytes of Normal data | |
| 28 | PID | | 184 bytes of Normal data | |
| 29 | PID | AF Header | 128 bytes of Turbo data | 54 bytes of Normal data |
| 30 | PID | | 184 bytes of Normal data | |
| 31 | PID | | 184 bytes of Normal data | |
| 32 | PID | | 184 bytes of Normal data | |
| 33 | PID | AF Header | 128 bytes of Turbo data | 54 bytes of Normal data |
| 34 | PID | | 184 bytes of Normal data | |
| 35 | PID | | 184 bytes of Normal data | |
| 36 | PID | | 184 bytes of Normal data | |
| 37 | PID | AF Header | 128 bytes of Turbo data | 54 bytes of Normal data |
| 38 | PID | | 184 bytes of Normal data | |
| 39 | PID | | 184 bytes of Normal data | |
| 40 | PID | | 184 bytes of Normal data | |
| 41 | PID | AF Header | 128 bytes of Turbo data | 54 bytes of Normal data |
| 42 | PID | | 184 bytes of Normal data | |
| 43 | PID | | 184 bytes of Normal data | |
| 44 | PID | | 184 bytes of Normal data | |
| 45 | PID | AF Header | 128 bytes of Turbo data | 54 bytes of Normal data |
| 46 | PID | | 184 bytes of Normal data | |
| 47 | PID | | 184 bytes of Normal data | |
| 48 | PID | | 184 bytes of Normal data | |
| 49 | PID | AF Header | 128 bytes of Turbo data | 54 bytes of Normal data |
| 50 | PID | | 184 bytes of Normal data | |
| 51 | PID | | 184 bytes of Normal data | |
| 52 | PID | | 184 bytes of Normal data | |

FIG. 51

| | 3 bytes | 2 bytes | 128 bytes | 182-128 bytes |
|---|---|---|---|---|
| 1 | PID | | 184 bytes of Normal data | |
| 2 | PID | | 184 bytes of Normal data | |
| 3 | PID | AF Header | 16 bytes of Turbo data | 166 bytes of Normal data |
| 4 | PID | | 184 bytes of Normal data | |
| 5 | PID | | 184 bytes of Normal data | |
| 6 | PID | | 184 bytes of Normal data | |
| 7 | PID | AF Header | 16 bytes of Turbo data | 166 bytes of Normal data |
| 8 | PID | | 184 bytes of Normal data | |
| 9 | PID | | 184 bytes of Normal data | |
| 10 | PID | | 184 bytes of Normal data | |
| 11 | PID | AF Header | 16 bytes of Turbo data | 166 bytes of Normal data |
| 12 | PID | | 184 bytes of Normal data | |
| 13 | PID | | 184 bytes of Normal data | |
| 14 | PID | | 184 bytes of Normal data | |
| 15 | PID | AF Header | reserved for PCR(6 bytes) 16 bytes of Turbo D | 160 bytes of Normal Data |
| 16 | PID | | 184 bytes of Normal data | |
| 17 | PID | | 184 bytes of Normal data | |
| 18 | PID | | 184 bytes of Normal data | |
| 19 | PID | AF Header | Splice(1 byte) 16 bytes of Turbo Data | 165 bytes of Normal Data |
| 20 | PID | | 184 bytes of Normal data | |
| 21 | PID | | 184 bytes of Normal data | |
| 22 | PID | | 184 bytes of Normal data | |
| 23 | PID | AF Header | 16 bytes of Turbo data | 166 bytes of Normal data |
| 24 | PID | | 184 bytes of Normal data | |
| 25 | PID | | 184 bytes of Normal data | |
| 26 | PID | | 184 bytes of Normal data | |
| 27 | PID | AF Header | 16 bytes of Turbo data | 166 bytes of Normal data |
| 28 | PID | | 184 bytes of Normal data | |
| 29 | PID | | 184 bytes of Normal data | |
| 30 | PID | | 184 bytes of Normal data | |
| 31 | PID | AF Header | 16 bytes of Turbo data | 166 bytes of Normal data |
| 32 | PID | | 184 bytes of Normal data | |
| 33 | PID | | 184 bytes of Normal data | |
| 34 | PID | | 184 bytes of Normal data | |
| 35 | PID | AF Header | 16 bytes of Turbo data | 166 bytes of Normal data |
| 36 | PID | | 184 bytes of Normal data | |
| 37 | PID | | 184 bytes of Normal data | |
| 38 | PID | | 184 bytes of Normal data | |
| 39 | PID | AF Header | 16 bytes of Turbo data | 166 bytes of Normal data |
| 40 | PID | | 184 bytes of Normal data | |
| 41 | PID | | 184 bytes of Normal data | |
| 42 | PID | | 184 bytes of Normal data | |
| 43 | PID | AF Header | 16 bytes of Turbo data | 166 bytes of Normal data |
| 44 | PID | | 184 bytes of Normal data | |
| 45 | PID | | 184 bytes of Normal data | |
| 46 | PID | | 184 bytes of Normal data | |
| 47 | PID | AF Header | 16 bytes of Turbo data | 166 bytes of Normal data |
| 48 | PID | | 184 bytes of Normal data | |
| 49 | PID | | 184 bytes of Normal data | |
| 50 | PID | | 184 bytes of Normal data | |
| 51 | PID | AF Header | 16 bytes of Turbo data | 166 bytes of Normal data |
| 52 | PID | | 184 bytes of Normal data | |

FIG. 52

|    | 3 bytes | 2 bytes   | SRS         |                | Turbo Data | Normal Data         |
|----|---------|-----------|-------------|----------------|------------|---------------------|
| 1  | Header  | AF Header | SRS {10,20,26} |             | Turbo 128  | Normal 54_{10,20,26} |
| 2  | Header  | AF Header | SRS {10,20,26} |             |            | Normal 182-{10,20,26} |
| 3  | Header  | AF Header | SRS {10,20,26} |             |            | Normal 182-{10,20,26} |
| 4  | Header  | AF Header | SRS {10,20,26} |             |            | Normal 182-{10,20,26} |
| 5  | Header  | AF Header | SRS {10,20,26} |             | Turbo 128  | Normal 54_{10,20,26} |
| 6  | Header  | AF Header | SRS {10,20,26} |             |            | Normal 182-{10,20,26} |
| 7  | Header  | AF Header | SRS {10,20,26} |             |            | Normal 182-{10,20,26} |
| 8  | Header  | AF Header | SRS {10,20,26} |             |            | Normal 182-{10,20,26} |
| 9  | Header  | AF Header | SRS {10,20,26} |             | Turbo 128  | Normal 54_{10,20,26} |
| 10 | Header  | AF Header | SRS {10,20,26} |             |            | Normal 182-{10,20,26} |
| 11 | Header  | AF Header | SRS {10,20,26} |             |            | Normal 182-{10,20,26} |
| 12 | Header  | AF Header | SRS {10,20,26} |             |            | Normal 182-{10,20,26} |
| 13 | Header  | AF Header | SRS {10,20,26} |             | Turbo 128  | Normal 54_{10,20,26} |
| 14 | Header  | AF Header | SRS {10,20,26} |             |            | Normal 182-{10,20,26} |
| 15 | Header  | AF Header | PCR (6)     | SRS {4,14,20}  |            | Normal 182-{10,20,26} |
| 16 | Header  | AF Header | SRS {10,20,26} |             |            | Normal 182-{10,20,26} |
| 17 | Header  | AF Header | SRS {10,20,26} |             | Turbo 128  | Normal 54_{10,20,26} |
| 18 | Header  | AF Header | SRS {10,20,26} |             |            | Normal 182-{10,20,26} |
| 19 | Header  | AF Header | Splice (1)  | SRS {9,19,25}  |            | Normal 182-{10,20,26} |
| 20 | Header  | AF Header | SRS {10,20,26} |             |            | Normal 182-{10,20,26} |
| 21 | Header  | AF Header | SRS {10,20,26} |             | Turbo 128  | Normal 54_{10,20,26} |
| 22 | Header  | AF Header | SRS {10,20,26} |             |            | Normal 182-{10,20,26} |
| 23 | Header  | AF Header | SRS {10,20,26} |             |            | Normal 182-{10,20,26} |
| 24 | Header  | AF Header | SRS {10,20,26} |             |            | Normal 182-{10,20,26} |
| 25 | Header  | AF Header | SRS {10,20,26} |             | Turbo 128  | Normal 54_{10,20,26} |
| 26 | Header  | AF Header | SRS {10,20,26} |             |            | Normal 182-{10,20,26} |
| 27 | Header  | AF Header | SRS {10,20,26} |             |            | Normal 182-{10,20,26} |
| 28 | Header  | AF Header | SRS {10,20,26} |             |            | Normal 182-{10,20,26} |
| 29 | Header  | AF Header | SRS {10,20,26} |             | Turbo 128  | Normal 54_{10,20,26} |
| 30 | Header  | AF Header | SRS {10,20,26} |             |            | Normal 182-{10,20,26} |
| 31 | Header  | AF Header | SRS {10,20,26} |             |            | Normal 182-{10,20,26} |
| 32 | Header  | AF Header | SRS {10,20,26} |             |            | Normal 182-{10,20,26} |
| 33 | Header  | AF Header | SRS {10,20,26} |             | Turbo 128  | Normal 54_{10,20,26} |
| 34 | Header  | AF Header | SRS {10,20,26} |             |            | Normal 182-{10,20,26} |
| 35 | Header  | AF Header | SRS {10,20,26} |             |            | Normal 182-{10,20,26} |
| 36 | Header  | AF Header | SRS {10,20,26} |             |            | Normal 182-{10,20,26} |
| 37 | Header  | AF Header | SRS {10,20,26} |             | Turbo 128  | Normal 54_{10,20,26} |
| 38 | Header  | AF Header | SRS {10,20,26} |             |            | Normal 182-{10,20,26} |
| 39 | Header  | AF Header | SRS {10,20,26} |             |            | Normal 182-{10,20,26} |
| 40 | Header  | AF Header | SRS {10,20,26} |             |            | Normal 182-{10,20,26} |
| 41 | Header  | AF Header | SRS {10,20,26} |             | Turbo 128  | Normal 54_{10,20,26} |
| 42 | Header  | AF Header | SRS {10,20,26} |             |            | Normal 182-{10,20,26} |
| 43 | Header  | AF Header | SRS {10,20,26} |             |            | Normal 182-{10,20,26} |
| 44 | Header  | AF Header | SRS {10,20,26} |             |            | Normal 182-{10,20,26} |
| 45 | Header  | AF Header | SRS {10,20,26} |             | Turbo 128  | Normal 54_{10,20,26} |
| 46 | Header  | AF Header | SRS {10,20,26} |             |            | Normal 182-{10,20,26} |
| 47 | Header  | AF Header | SRS {10,20,26} |             |            | Normal 182-{10,20,26} |
| 48 | Header  | AF Header | SRS {10,20,26} |             |            | Normal 182-{10,20,26} |
| 49 | Header  | AF Header | SRS {10,20,26} |             | Turbo 128  | Normal 54_{10,20,26} |
| 50 | Header  | AF Header | SRS {10,20,26} |             |            | Normal 182-{10,20,26} |
| 51 | Header  | AF Header | SRS {10,20,26} |             |            | Normal 182-{10,20,26} |
| 52 | Header  | AF Header | SRS {10,20,26} |             |            | Normal 182-{10,20,26} |

FIG. 53

| | 3 bytes | 2 bytes | SRS | Turbo Data | Normal Data |
|---|---|---|---|---|---|
| 1 | Header | AF Header | SRS {10,20,26} | Turbo 182-{10,20,26} | |
| 2 | Header | AF Header | SRS {10,20,26} | Turbo 182-{10,20,26} | |
| 3 | Header | AF Header | SRS {10,20,26} | Turbo 20+2*{10,20,26} | Normal 162-3*{10,20,26} |
| 4 | Header | AF Header | SRS {10,20,26} | Normal 182-{10,20,26} | |
| 5 | Header | AF Header | SRS {10,20,26} | Turbo 182-{10,20,26} | |
| 6 | Header | AF Header | SRS {10,20,26} | Turbo 182-{10,20,26} | |
| 7 | Header | AF Header | SRS {10,20,26} | Turbo 20+2*{10,20,26} | Normal 162-3*{10,20,26} |
| 8 | Header | AF Header | SRS {10,20,26} | Normal 182-{10,20,26} | |
| 9 | Header | AF Header | SRS {10,20,26} | Turbo 182-{10,20,26} | |
| 10 | Header | AF Header | SRS {10,20,26} | Turbo 182-{10,20,26} | |
| 11 | Header | AF Header | SRS {10,20,26} | Turbo 20+2*{10,20,26} | Normal 162-3*{10,20,26} |
| 12 | Header | AF Header | SRS {10,20,26} | Normal 182-{10,20,26} | |
| 13 | Header | AF Header | SRS {10,20,26} | Turbo 182-{10,20,26} | |
| 14 | Header | AF Header | SRS {10,20,26} | Turbo 182-{10,20,26} | |
| 15 | Header | AF Header | PCR (6)   SRS {4,14,20} | Turbo 20+2*{10,20,26} | Normal 162-3*{10,20,26} |
| 16 | Header | AF Header | SRS {10,20,26} | Normal 182-{10,20,26} | |
| 17 | Header | AF Header | SRS {10,20,26} | Turbo 182-{10,20,26} | |
| 18 | Header | AF Header | SRS {10,20,26} | Turbo 182-{10,20,26} | |
| 19 | Header | AF Header | Splice (1)   SRS {9,19,25} | Turbo 20+2*{10,20,26} | Normal 162-3*{10,20,26} |
| 20 | Header | AF Header | SRS {10,20,26} | Normal 182-{10,20,26} | |
| 21 | Header | AF Header | SRS {10,20,26} | Turbo 182-{10,20,26} | |
| 22 | Header | AF Header | SRS {10,20,26} | Turbo 182-{10,20,26} | |
| 23 | Header | AF Header | SRS {10,20,26} | Turbo 20+2*{10,20,26} | Normal 162-3*{10,20,26} |
| 24 | Header | AF Header | SRS {10,20,26} | Normal 182-{10,20,26} | |
| 25 | Header | AF Header | SRS {10,20,26} | Turbo 182-{10,20,26} | |
| 26 | Header | AF Header | SRS {10,20,26} | Turbo 182-{10,20,26} | |
| 27 | Header | AF Header | SRS {10,20,26} | Turbo 20+2*{10,20,26} | Normal 162-3*{10,20,26} |
| 28 | Header | AF Header | SRS {10,20,26} | Normal 182-{10,20,26} | |
| 29 | Header | AF Header | SRS {10,20,26} | Turbo 182-{10,20,26} | |
| 30 | Header | AF Header | SRS {10,20,26} | Turbo 182-{10,20,26} | |
| 31 | Header | AF Header | SRS {10,20,26} | Turbo 20+2*{10,20,26} | Normal 162-3*{10,20,26} |
| 32 | Header | AF Header | SRS {10,20,26} | Normal 182-{10,20,26} | |
| 33 | Header | AF Header | SRS {10,20,26} | Turbo 182-{10,20,26} | |
| 34 | Header | AF Header | SRS {10,20,26} | Turbo 182-{10,20,26} | |
| 35 | Header | AF Header | SRS {10,20,26} | Turbo 20+2*{10,20,26} | Normal 162-3*{10,20,26} |
| 36 | Header | AF Header | SRS {10,20,26} | Normal 182-{10,20,26} | |
| 37 | Header | AF Header | SRS {10,20,26} | Turbo 182-{10,20,26} | |
| 38 | Header | AF Header | SRS {10,20,26} | Turbo 182-{10,20,26} | |
| 39 | Header | AF Header | SRS {10,20,26} | Turbo 20+2*{10,20,26} | Normal 162-3*{10,20,26} |
| 40 | Header | AF Header | SRS {10,20,26} | Normal 182-{10,20,26} | |
| 41 | Header | AF Header | SRS {10,20,26} | Turbo 182-{10,20,26} | |
| 42 | Header | AF Header | SRS {10,20,26} | Turbo 182-{10,20,26} | |
| 43 | Header | AF Header | SRS {10,20,26} | Turbo 20+2*{10,20,26} | Normal 162-3*{10,20,26} |
| 44 | Header | AF Header | SRS {10,20,26} | Normal 182-{10,20,26} | |
| 45 | Header | AF Header | SRS {10,20,26} | Turbo 182-{10,20,26} | |
| 46 | Header | AF Header | SRS {10,20,26} | Turbo 182-{10,20,26} | |
| 47 | Header | AF Header | SRS {10,20,26} | Turbo 20+2*{10,20,26} | Normal 162-3*{10,20,26} |
| 48 | Header | AF Header | SRS {10,20,26} | Normal 182-{10,20,26} | |
| 49 | Header | AF Header | SRS {10,20,26} | Turbo 182-{10,20,26} | |
| 50 | Header | AF Header | SRS {10,20,26} | Turbo 182-{10,20,26} | |
| 51 | Header | AF Header | SRS {10,20,26} | Turbo 20+2*{10,20,26} | Normal 162-3*{10,20,26} |
| 52 | Header | AF Header | SRS {10,20,26} | Normal 182-{10,20,26} | |

FIG. 55

| | | Walsh Chip within Symbol | | | | | | | | | | | | | | | |
|---|---|---|---|---|---|---|---|---|---|---|---|---|---|---|---|---|
| | | 0 | 1 | 2 | 3 | 4 | 5 | 6 | 7 | 8 | 9 | 10 | 11 | 12 | 13 | 14 | 15 |
| Modulation Symbol Index | 0 | 0 | 0 | 0 | 0 | 0 | 0 | 0 | 0 | 0 | 0 | 0 | 0 | 0 | 0 | 0 | 0 |
| | 1 | 0 | 1 | 0 | 1 | 0 | 1 | 0 | 1 | 0 | 1 | 0 | 1 | 0 | 1 | 0 | 1 |
| | 2 | 0 | 0 | 1 | 1 | 0 | 0 | 1 | 1 | 0 | 0 | 1 | 1 | 0 | 0 | 1 | 1 |
| | 3 | 0 | 1 | 1 | 0 | 0 | 1 | 1 | 0 | 0 | 1 | 1 | 0 | 0 | 1 | 1 | 0 |
| | 4 | 0 | 0 | 0 | 0 | 1 | 1 | 1 | 1 | 0 | 0 | 0 | 0 | 1 | 1 | 1 | 1 |
| | 5 | 0 | 1 | 0 | 1 | 1 | 0 | 1 | 0 | 0 | 1 | 0 | 1 | 1 | 0 | 1 | 0 |
| | 6 | 0 | 0 | 1 | 1 | 1 | 1 | 0 | 0 | 0 | 0 | 1 | 1 | 1 | 1 | 0 | 0 |
| | 7 | 0 | 1 | 1 | 0 | 1 | 0 | 0 | 1 | 0 | 1 | 1 | 0 | 1 | 0 | 0 | 1 |
| | 8 | 0 | 0 | 0 | 0 | 0 | 0 | 0 | 0 | 1 | 1 | 1 | 1 | 1 | 1 | 1 | 1 |
| | 9 | 0 | 1 | 0 | 1 | 0 | 1 | 0 | 1 | 1 | 0 | 1 | 0 | 1 | 0 | 1 | 0 |
| | 10 | 0 | 0 | 1 | 1 | 0 | 0 | 1 | 1 | 1 | 1 | 0 | 0 | 1 | 1 | 0 | 0 |
| | 11 | 0 | 1 | 1 | 0 | 0 | 1 | 1 | 0 | 1 | 0 | 0 | 1 | 1 | 0 | 0 | 1 |
| | 12 | 0 | 0 | 0 | 0 | 1 | 1 | 1 | 1 | 1 | 1 | 1 | 1 | 0 | 0 | 0 | 0 |
| | 13 | 0 | 1 | 0 | 1 | 1 | 0 | 1 | 0 | 1 | 0 | 1 | 0 | 0 | 1 | 0 | 1 |
| | 14 | 0 | 0 | 1 | 1 | 1 | 1 | 0 | 0 | 1 | 1 | 0 | 0 | 0 | 0 | 1 | 1 |
| | 15 | 0 | 1 | 1 | 0 | 1 | 0 | 0 | 1 | 1 | 0 | 0 | 1 | 0 | 1 | 1 | 0 |

M-4,B=52,N=208,R-s Block=207,BXM=N

METHOD OF AND APPARATUS FOR TRANSMITTING DIGITAL BROADCASTING SIGNAL IN ADVANCED-VSB (A-VSB) SYSTEM IN WHICH TRANSPORT PACKET WITHOUT ADAPTATION FIELD IS PROVIDED AT FIXED LOCATION IN DATA FIELD SLICES

CROSS-REFERENCE TO RELATED APPLICATIONS

This application claims the benefit of U.S. Provisional Application No. 60/788,707 filed on Apr. 4, 2006, and U.S. Provisional Application No. 60/789,603 filed on Apr. 6, 2006, the disclosures of which are incorporated herein by reference in their entirety.

BACKGROUND OF THE INVENTION

1. Field of the Invention

Aspects of the invention relate in part to enhancements to the Advanced Television Systems Committee (ATSC) Digital Television (DTV) System.

2. Description of the Related Art

The ATSC DTV system uses an 8-symbol vestigial sideband (8-VSB) transmission system which is susceptible to reception problems in certain applications and under certain conditions, such as in mobile applications and in communication over channels subject to Doppler fading.

An enhanced version of the 8-VSB system called the Enhanced-VSB (E-VSB) system has been developed. The E-VSB system enables an enhanced or robust data stream to be transmitted. This enhanced or robust data stream is intended to solve some of the reception problems that occur in the 8-VSB system. However, the E-VSB system is still susceptible to reception problems. Aspects of the invention have been developed in part in an effort so solve the reception problems that occur in the 8-VSB and E-VSB systems, and includes an enhanced version of these systems known as the Advanced-VSB (A-VSB) system.

SUMMARY OF THE INVENTION

According to an aspect of the invention, a method of processing a digital broadcasting signal includes generating a transport stream including a plurality of transport packets, each of the transport packets having 187 bytes, each of the bytes having 8 bits, the 187 bytes including 3 packet identifier (PID) bytes; selecting one of the transport packets as a starting packet to be mapped into a first data segment of an encoded data frame; and constructing deterministic data frames in the transport stream beginning with the starting packet, each of the deterministic data frames having 2 data fields, each of the data fields having 6 slices, each of the slices having 52 transport packets; wherein at least one of the 52 transport packets does not have an adaptation field and has 187 bytes, each of the bytes having 8 bits, the 187 bytes including 3 PID bytes, followed by 184 data bytes; wherein all remaining ones of the 52 transport packets each have 187 bytes, each of the bytes having 8 bits, the 187 bytes including 3 PID bytes, followed by 2 adaptation field (AF) header bytes specifying an adaptation field having a length of N bytes, followed by N adaptation field bytes, followed by 182-N data bytes; and wherein the at least one transport packet that does not have an adaptation field is provided at a fixed location in each of the slices.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will be become apparent and more readily appreciated from the following description of embodiments of the invention, taken in conjunction with the accompanying drawings of which:

FIG. 14 shows a transport stream carrying SRS according to an aspect of the invention;

FIG. 21 shows one slice (52 segments) of a deterministic frame (DF) template for use with SRS according to an aspect of the invention;

FIG. 22 shows pattern byte values stored in an SRS pattern memory according to an aspect of the invention;

FIG. 26 shows one slice (52 segments) of a deterministic frame (DF) template for use with SRS according to an aspect of the invention that includes a {Null, PAT, PMT} packet without an adaptation field is provided at a fixed location in a frame;

FIG. 50 shows one slice (52 segments) of a deterministic frame (DF) template for use with turbo stream mode 2 or 4 according to an aspect of the invention;

FIG. 51 shows one slice (52 segments) of a deterministic frame (DF) template for use with turbo stream mode 5 or 6 according to an aspect of the invention;

FIG. 52 shows one slice (52 segments) of a deterministic frame (DF) template for use with both SRS and turbo stream mode 2 or 4 according to an aspect of the invention;

FIG. 53 shows one slice (52 segments) of a deterministic frame (DF) template for use with both SRS and turbo stream mode 5 or 6 according to an aspect of the invention;

FIG. 55 show Walsh codes of (16) bits used in the A-VSB mode signaling scheme according to an aspect of the invention;

DETAILED DESCRIPTION OF THE EMBODIMENTS

Figure 1:
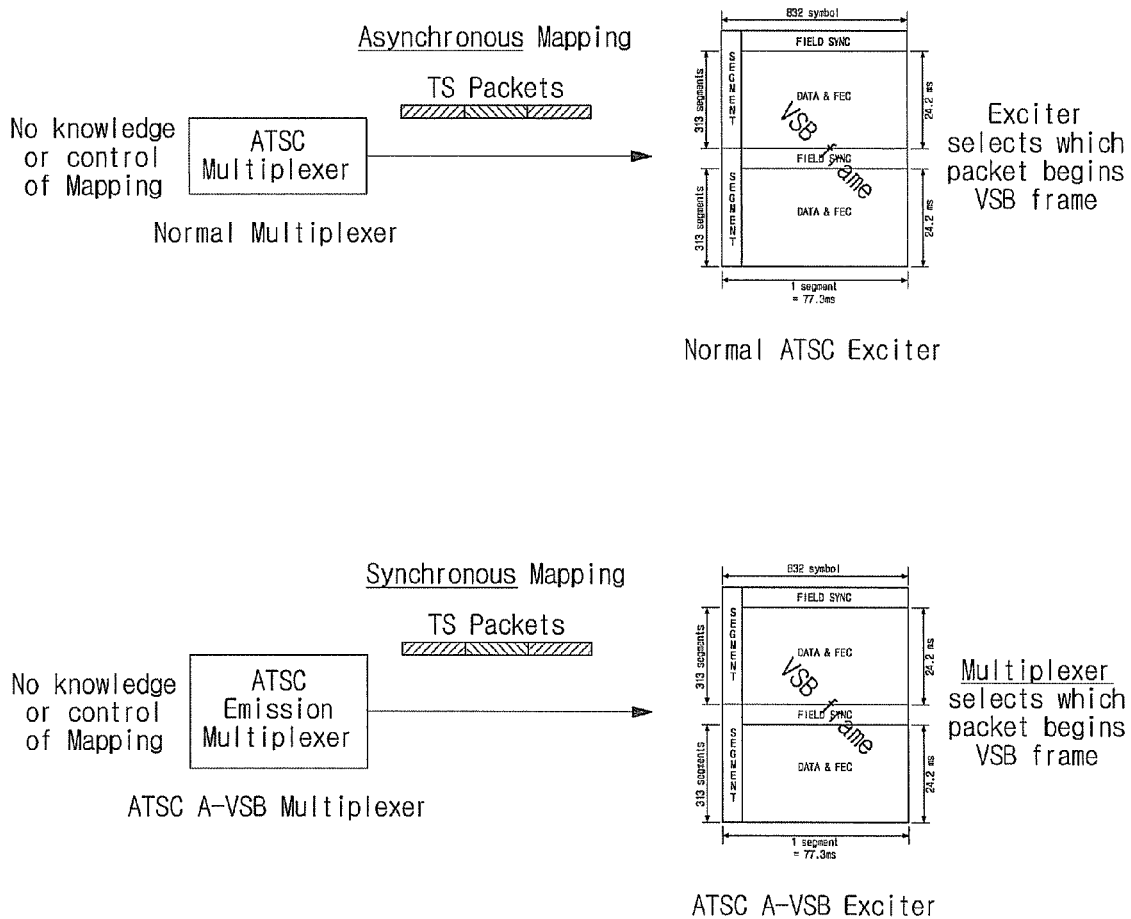
FIG. 1 shows asynchronous and synchronous mappings of ATSC transport stream (TS) packets to a VSB frame according to an aspect of the invention, with the synchronous mapping producing a deterministic frame (DF) according to an aspect of the invention.

Reference will now be made in detail to embodiments of the invention, examples of which are shown in the accompanying drawings, wherein like reference numerals refer to like elements throughout. The embodiments are described below in order to explain the present invention by referring to the figures.

Aspects of the invention described below include deterministic frame (DF), deterministic trellis reset (DTR), supplementary reference sequence (SRS), single-frequency network (SFN), and turbo stream. These aspects of the invention are described in the context of the ATSC DTV 8-VSB system as part of an Advanced-VSB (A-VSB) system, but are not limited to use in such a context.

The following description presumes a familiarity with the Advanced Television Systems Committee (ATSC) Digital Television (DTV) System which incorporates aspects of the MPEG-2 system, details of which are described in the corresponding standards. Examples of such standards which may be relevant are ATSC A/52B, Digital Audio Compression Standard (AC-3, E-AC-3), Revision B, 14 Jun. 2005; ATSC A/53E, ATSC Digital Television Standard (A/53), Revision E, 27 Dec. 2005; Working Draft Amendment 2 to ATSC Digital Television Standard (A/53C) with Amendment 1 and Corrigendum 1; ATSC A/54A, Recommended Practice: Guide to the Use of the ATSC Digital Television Standard, 4 Dec. 2003; ATSC A110/A, Synchronization Standard for Distributed Transmission, Revision A, 19 Jul. 2005; ISO/IEC IS13818-1:2000(E), Information technology-Generic coding of moving pictures and Associated audio information: Systems (second edition) (MPEG-2); and ISO/IEC IS13818-2: 2000(E), Information technology-Generic coding of moving pictures and associated audio information: Video (second edition) (MPEG-2), the contents of which are incorporated herein by reference in their entirety.

Deterministic frame and deterministic trellis reset prepare the 8-VSB system to be operated in a deterministic manner. In the A-VSB system, the emission multiplexer has knowledge of and signals the start of the 8-VSB frame to the A-VSB exciter. This a priori knowledge of the emission multiplexer allows intelligent multiplexing to be performed according to an aspect of the invention.

An absence of adequate equalizer training signals has encouraged receiver designs with an over-dependence on blind equalization techniques. SRS offers a system solution with adequate equalizer training signals coupled with the latest algorithmic advances in receiver design principles to achieve new levels of performance in dynamic environments. SRS improves normal stream reception. However, it is understood that other training sequences can be used in other aspects of the invention.

SFN functionality is provided in the A-VSB system as a fully harmonized approach that works with the other A-VSB features.

Turbo stream according to aspects of the invention provides a new level of error correction capability. This brings robust reception in terms of lower SNR receiver threshold and improvements in multi-path environments. Normal stream reception in a legacy receiver is not affected by turbo stream.

An initial application of the A-VSB system might be to address reception issues of main stream services in fixed or portable modes of operation in ATSC DTV applications. The A-VSB system is backward compatible and will offer terrestrial broadcasters options to leverage technological change and meet changing consumer expectations going forward.

Deterministic frame (DF) is one element of the A-VSB system, and its purpose is to make the mapping of ATSC transport stream packets a synchronous process. Currently, this mapping is an asynchronous process. The current ATSC multiplexer at a studio produces a fixed-rate transport stream with no knowledge of the 8-VSB physical layer frame structure or mapping of packets. This situation is shown in the top half of FIG. 1.

The normal (A/53) ATSC exciter randomly picks a packet to map into the first segment of a VSB frame. No knowledge of this decision (and hence the temporal position of any transport stream packet in the VSB frame) is known to the upstream multiplexer. In the ATSC A-VSB system disclosed herein, the emission multiplexer makes a deliberate decision of which packet the ATSC exciter should map into the first segment of the VSB frame. This decision is then signaled to the A-VSB exciter which operates as a slave to the emission multiplexer. The starting packet coupled with knowledge of the fixed VSB frame structure, gives the emission multiplexer knowledge of every packet's position in the VSB frame. This situation is shown in the bottom half of FIG. 1. This fundamental change in the selection of the starting packet is called "deterministic frame" (DF). Briefly stated, the A-VSB emission multiplexer will work in harmony with the A-VSB exciter to perform intelligent multiplexing. The DF allows special pre-processing in the emission multiplexer and synchronous post-processing in the exciter.

The deterministic frame enables the use of an emission multiplexer and an A-VSB exciter. The emission multiplexer shown in the bottom half of FIG. 1 is a special-purpose ATSC multiplexer that is used at a studio or a network operations center (NOC) and directly feeds one or more 8-VSB transmitters all having an A-VSB exciter. Hence the term "emission" multiplexer is used. However, other multiplexers may be used and need not be special-purpose multiplexers.

The first compatible change in the ATSC system design is the required locking of both the emission multiplexer transport stream clock and the symbol clock of the A-VSB exciter to a universally available frequency reference. The 10 MHz reference from a GPS receiver is used for this purpose in the example disclosed herein. Locking both the symbol and transport stream clocks to an external reference provides the needed stability and buffer management in a simple, straightforward manner. One additional benefit to legacy and new ATSC receivers will be a stable ATSC symbol clock, without the jitter that can occur with the current system design. The preferred transport stream interface supported on the emission multiplexer and the A-VSB exciter will be asynchronous serial interface (ASI). However, other clocks and other interfaces can be used.

The emission multiplexer is considered to be a master, and its syntax and semantics will signal to the A-VSB exciter operating as a slave which transport stream packet shall be used as the first VSB data segment in a VSB frame. Since the system is operating with synchronous clocks, the system knows with 100% certainty which 624 transport stream (TS) packets make up a VSB frame with the A-VSB exciter slaved to the syntax and semantics of the emission multiplexer. A simple frame counter that counts 624 TS packets numbered 0 through 623 is provided in the emission multiplexer. When SFN is used as described below, DF is achieved through the insertion of a VSB frame initialization packet (VFIP) in the last (623rd) TS packet in a VSB frame as described in detail below. However, if SFN is not used, then another simple syntax can be used. One example of such a simple syntax is the data frame cadence signal (CS) described in ATSC A/110 which is inserted in a transport stream by inverting the value of a MPEG-2 packet sync byte once every 624 packets. The normal value of the MPEG-2 packet sync byte is 0x47, and the inverted value of the MPEG-2 packet sync byte is 0xB8. This syntax can be applied to aspects of the invention by inserting in each encoded data frame a frame construction starting signal indicating that construction of a new frame is be started by inverting the value of a data segment sync byte once every 624 data segments beginning in a first one of the encoded data frames with a selected one of the data segments corresponding to a transport packet that was selected as a starting packet to be mapped into a first data segment of the first one of the encoded data frames. The ATSC VSB frame can be viewed by the emission multiplexer as being divided into 12 groups or slices each having (52) data segments.

Figure 2:
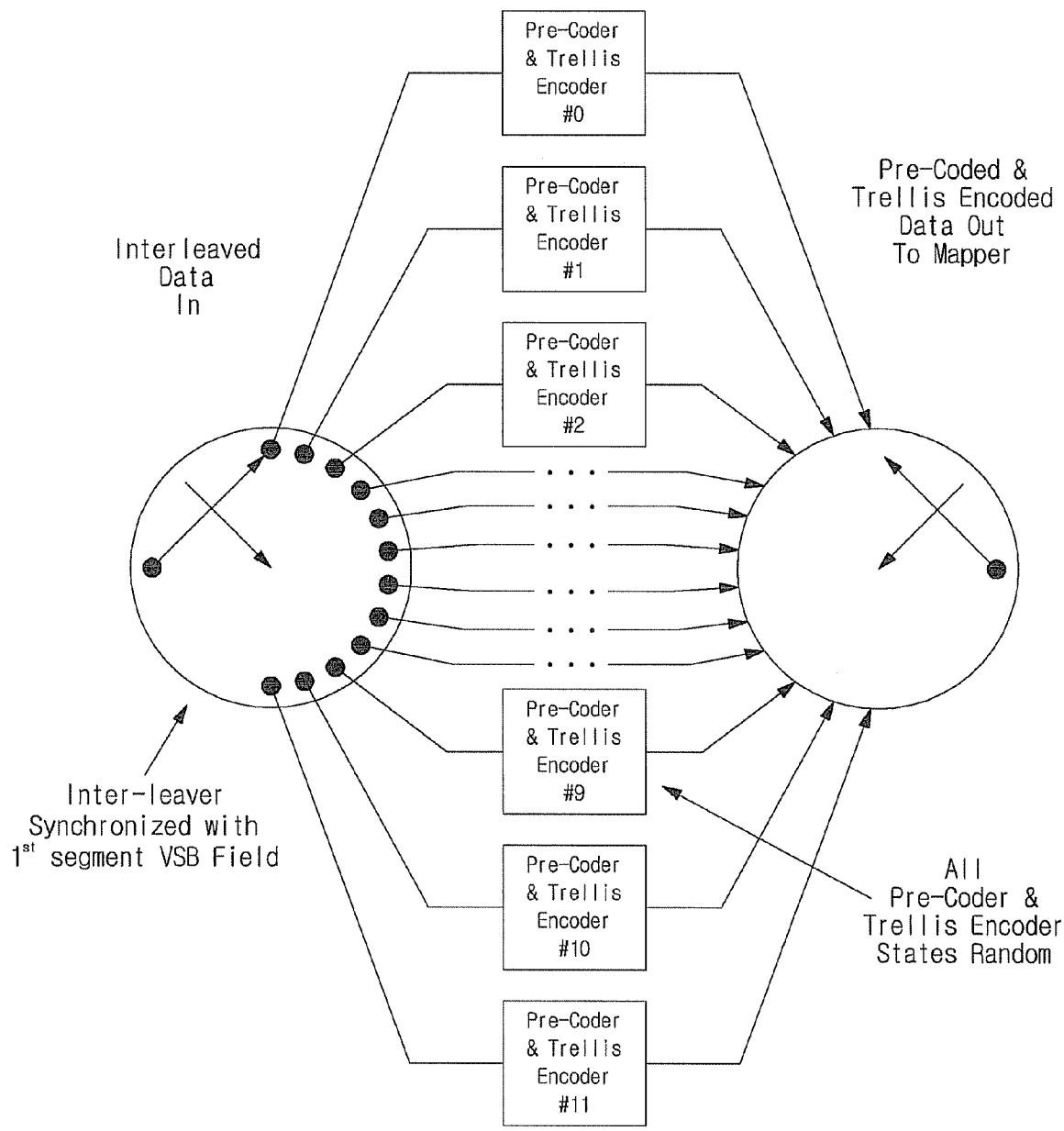
FIG. 2 shows a block diagram of pre-coders/trellis encoders used to illustrate an aspect of the invention.

Deterministic trellis reset (DTR) is another element of the A-VSB system, and is an operation that resets the trellis-coded modulation (TCM) encoder states (pre-coder and trellis encoder states) in the ATSC exciter to a known deterministic state at selected temporal locations in the VSB frame. FIG. 2 shows that the states of the (12) pre-coder/trellis encoders are random. No external knowledge of these states can be obtained due to the random nature of these states in the current A/53 exciter. The DTR provides a mechanism to force all TCM encoders to a zero state (a known deterministic state).

Figure 4:
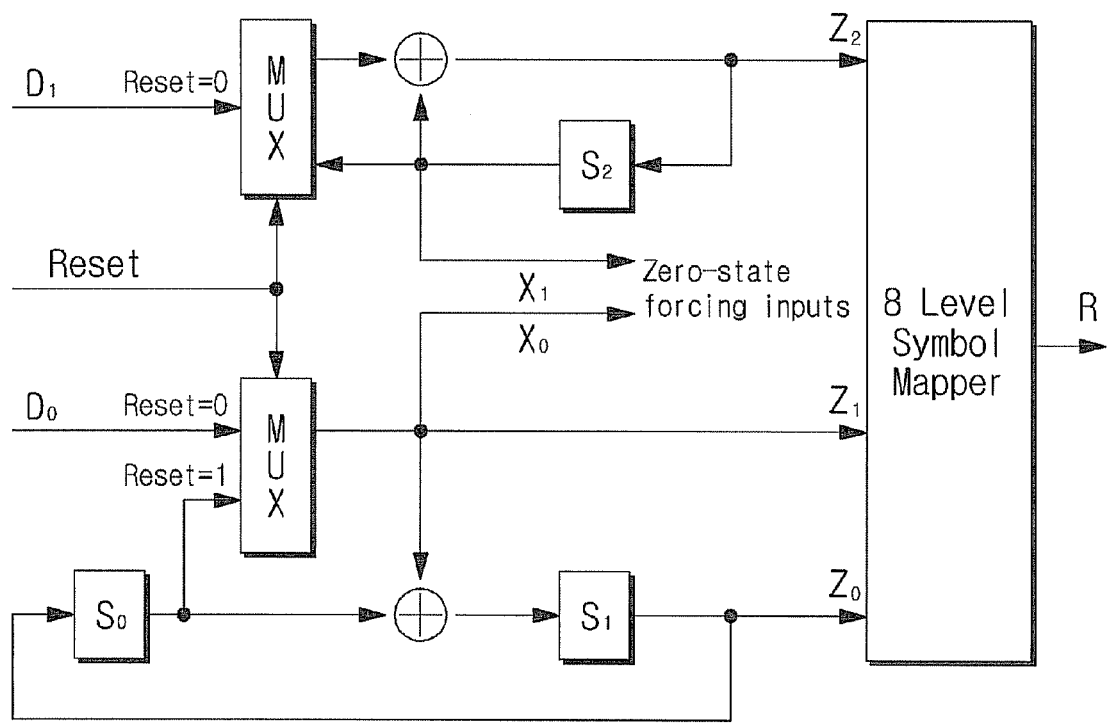
FIG. 4 shows a circuit for performing a deterministic trellis reset (DTR) according to an aspect of the invention.

FIG. 4 shows a circuit of (1 of 12) modified TCM encoders used in an 8-trellis VSB SB) system. Two new multiplexer (MUX) circuits have been added to existing logic gates circuit shown. When the reset input is inactive (Reset=0), the circuit operates as a 8-VSB encoder. When the reset input is active (Reset=1), the circuit performs a state operation as described below in conjunction with the following Table 1.

TABLE 1

Trellis Reset Table

| Reset at t = 0 | (S0 S1 S2) at t = 0 | (X0 X1) at t = 0 | (S0 S1 S2) at t = 1 | (X0 X1) at t = 1 | (S0 S1 S2) Next State at t = 2 | Output (Z2 Z1 Z0) |
|---|---|---|---|---|---|---|
| 1 | 0, 0, 0 | 0, 0 | 0, 0, 0 | 0, 0 | 0, 0, 0 | 000 |
| 1 | 0, 0, 1 | 0, 1 | 0, 0, 0 | 0, 0 | 0, 0, 0 | 000 |
| 1 | 0, 1, 0 | 0, 0 | 1, 0, 0 | 1, 0 | 0, 0, 0 | 000 |
| 1 | 0, 1, 1 | 0, 1 | 1, 0, 0 | 1, 0 | 0, 0, 0 | 000 |
| 1 | 1, 0, 0 | 1, 0 | 0, 0, 0 | 0, 0 | 0, 0, 0 | 000 |
| 1 | 1, 0, 1 | 1, 1 | 0, 0, 0 | 0, 0 | 0, 0, 0 | 000 |
| 1 | 1, 1, 0 | 1, 0 | 1, 0, 0 | 1, 0 | 0, 0, 0 | 000 |
| 1 | 1, 1, 1 | 1, 1 | 1, 0, 0 | 1, 0 | 0, 0, 0 | 000 |

The truth table of the two XOR gates in FIG. 4 states that "when both inputs are at like logic levels (either 1 or 0), the output of the XOR gate is always 0 (zero)". Note that there are three D latches (S0, S1, S2) in FIG. 4 that form the memory of the TCM encoder. These can be in one of two possible states, (0 or 1). Therefore, as shown the second column in Table 1, there are (8) possible starting states of the TCM encoder memory. Table 1 shows the logical outcome when the reset input is held active (Reset=1) for two consecutive symbol clock periods. Regardless of the starting states of the TCM encoder memory, the states are forced to a known zero state (S0=S1=S2=0) after two symbol clock periods. This is shown in the next-to-last column labeled "Next State". Hence, a deterministic trellis reset (DTR) can be forced over two symbol clock periods.

Additionally, zero-state forcing inputs (X0, X1 in FIG. 4) are available. These are TCM encoder inputs which force the TCM encoder states to zero, and they are produced during the two symbol clock periods. The DTR operation can be explained as follows. At the moment of reset, that is, when the reset input becomes active (Reset=1), the two multiplexers disconnect the normal inputs (D0, D1 in FIG. 4) from the TCM encoder and connect the zero-state forcing inputs to the TCM encoder for the next two symbol clock periods. Then TCM encoder states are forced to zero by the zero-state forcing inputs. These zero-state forcing inputs play an important role in correcting parity errors induced by a DTR operation as described later.

The appropriate moment to reset the TCM encoder states depends on the application. Some applications for DTR are described below.

If introduced immediately after a DTR operation, a selected bit sequence, based on the known starting states of the TCM encoder, will generate a known pattern of symbols. This is used to generate a supplementary reference sequence (SRS) as described later. The appropriate moment to reset the TCM encoder states is thus the first 2 symbols (4 bits) from each TCM Encoder (1 of 12) that process SRS. This process will create a pattern known to a receiver in known locations of the VSB frame, which will enable the equalizer of the receiver to identify the pattern.

In a single-frequency network (SFN) as described later, the DTR operation is synchronous with DTR stuff bytes carried in the VSB frame initialization packet (VFIP) to cause all of the pre-coder/trellis encoders in all of the exciters in the SFN to assume the same states. Each one of the 12 stuff bytes in the VFIP maps to (1 of 12) pre-coder/trellis encoders in a deterministic fashion.

Although several examples of applications for DTR have been described, the use of DTR is not limited to these applications, and DTR can be used in any application which requires that TCM encoder states be reset to known states at a particular time.

Supplementary reference sequence (SRS) is another element of the A-VSB system. The current ATSC 8-VSB system needs improvement to provide reliable reception in fixed, indoor, and portable environments susceptible to dynamic multi-path interference. The basic principle of SRS is to periodically insert a special known sequence in a deterministic VSB frame in such a way that a receiver equalizer can utilize this known sequence to mitigate dynamic multi-path interference and other adverse channel conditions and adapt itself to a dynamically changing channel.

Figure 3:
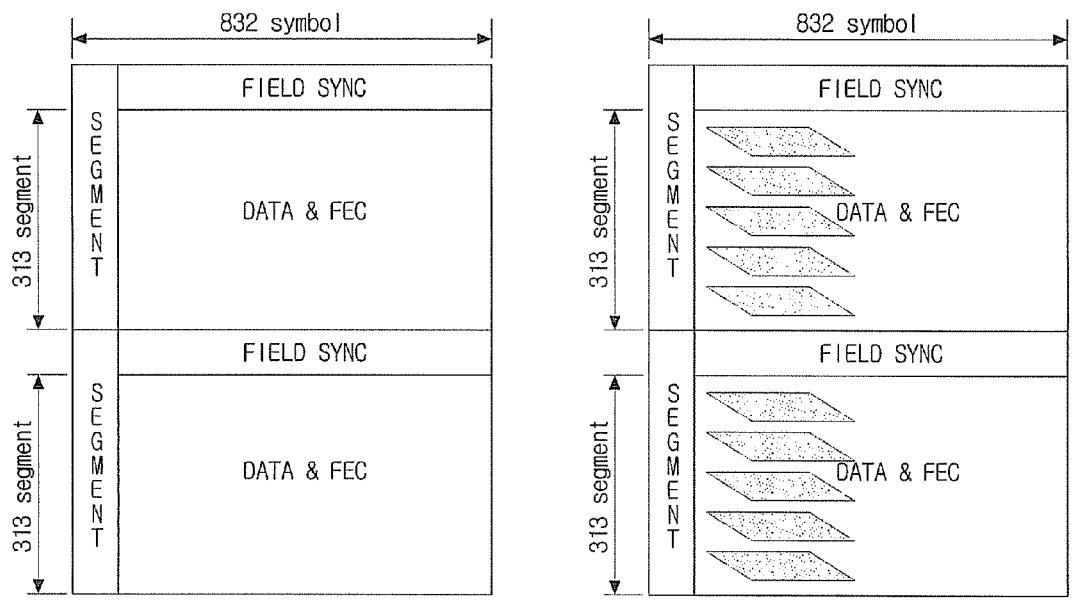
FIG. 3 shows a normal VSB and an A-VSB frame according to an aspect of the invention.

When the TCM encoder states have been forced to a known deterministic state by a DTR, an appended precalculated known sequence of bits (an SRS pattern) is then processed immediately in a predetermined way at specific temporal locations at the interleaver input of the frame. The resulting symbols at the interleaver output, due to the way the ATSC interleaver functions, will appear as known contiguous symbol patterns in known locations in the VSB frame, which will be available to the receiver as an additional equalizer training sequence. FIG. 3 shows the normal VSB frame on the left and the A-VSB frame on the right with SRS turned on. The A-VSB frame has frequently appearing SRS available to a new A-VSB design ATSC receiver. The data to be used in transport stream packets to create this known symbol sequence is introduced into the system in a backward compatible way using existing standard mechanisms. This data is carried in the MPEG-2 adaptation field. Hence, existing standards are leveraged, and compatibility is assured.

The RS encoder preceding the interleaver calculates the RS parity. Due to resetting the TCM encoders, the calculated RS parity bytes are wrong and need to be corrected. Thus, an additional processing step corrects parity errors in selected packets. All packets with parity errors will have their RS parity re-encoded. A (52) segment byte interleaver with unique time dispersion properties that generates contiguous SRS pattern bytes is leveraged to provide adequate time to re-encode parity bytes. The time required to do this constrains the maximum number of SRS pattern bytes.

Figure 5:
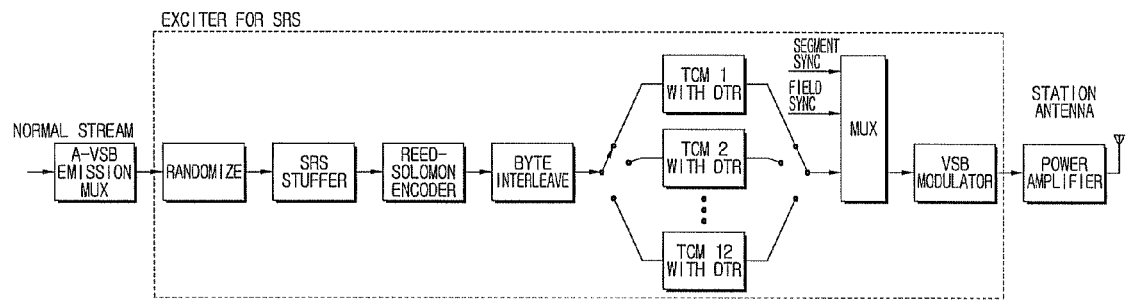
FIG. 5 shows a block diagram of an ATSC DTV transmitter using a supplementary reference sequence (SRS) according to an aspect of the invention.

To add the SRS feature to the ATSC DTV RF transmission system (the VSB system), an ATSC DTV transmitter is modified as shown in FIG. 5 according to an aspect of the invention. The A-VSB emission multiplexer and TCM blocks are modifications of existing blocks to perform SRS processing, and a new SRS stuffer block is provided. The A-VSB emission multiplexer scheduling algorithm takes into consideration a predefined deterministic frame template for SRS. The generated packets are prepared for SRS post-processing in an A-VSB exciter.

The packets are first randomized, and then the SRS stuffer fills the stuffing area in the adaptation fields of packets with a predefined sequence (SRS pattern data). Along with all data packets the SRS-containing packets are also processed for forward error correction with the (207, 187) Reed-Solomon code. After byte interleaving, the packets are encoded in the ⅔ rate trellis encoder block. At every SRS-appearing instant, the deterministic trellis reset (DTR) is performed to generate a known symbol output.

DTR necessarily entails some symbol changes (2 symbols for each TCM encoder) at the SRS-appearing instant. Since these changes occur after Reed-Solomon encoding, the previously calculated RS parity bytes are no longer correct. In order to correct these erroneous parity bytes, the parity bytes are recalculated and the recalculated parity bytes replace the old parity bytes in the TCM with DTR block in FIG. 5. The following blocks are generally the same as the standard ATSC VSB exciter and the data pass through them. Now each block in FIG. 5 will be examined one by one.

Figure 6:
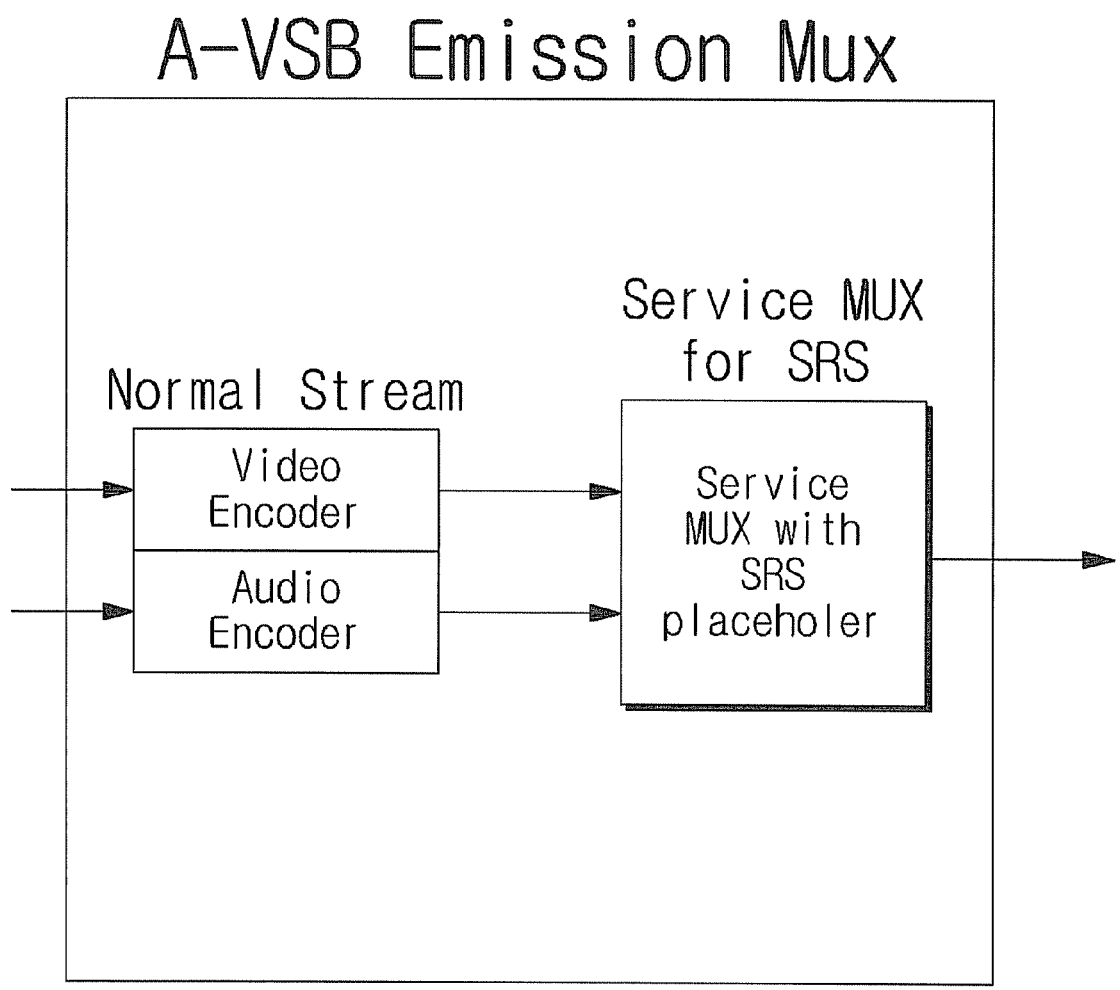
FIG. 6 shows a block diagram of an ATSC emission multiplexer using SRS according to an aspect of the invention.
Figure 7:
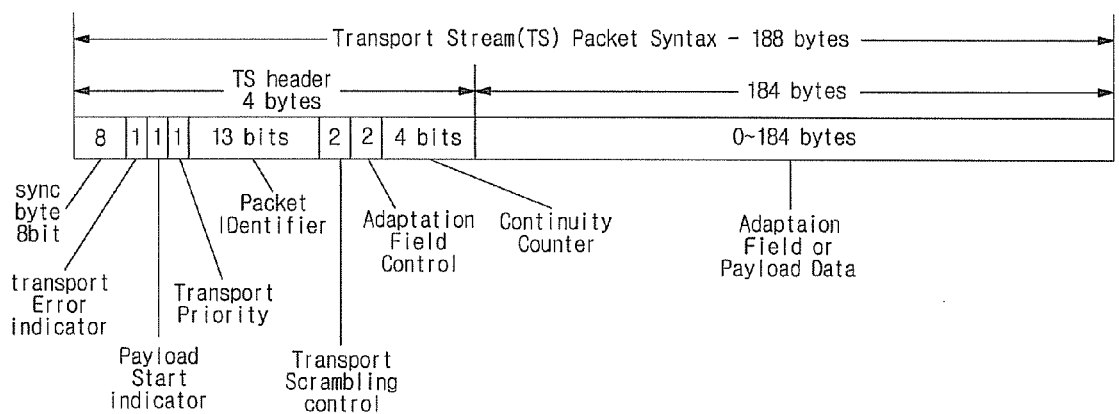
FIG. 7 shows a normal TS packet syntax according to an aspect of the invention.
Figure 8:
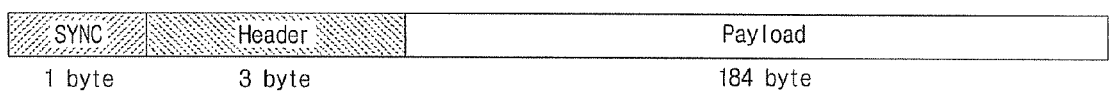
FIG. 8 shows a TS packet without SRS according to an aspect of the invention.
Figure 9:
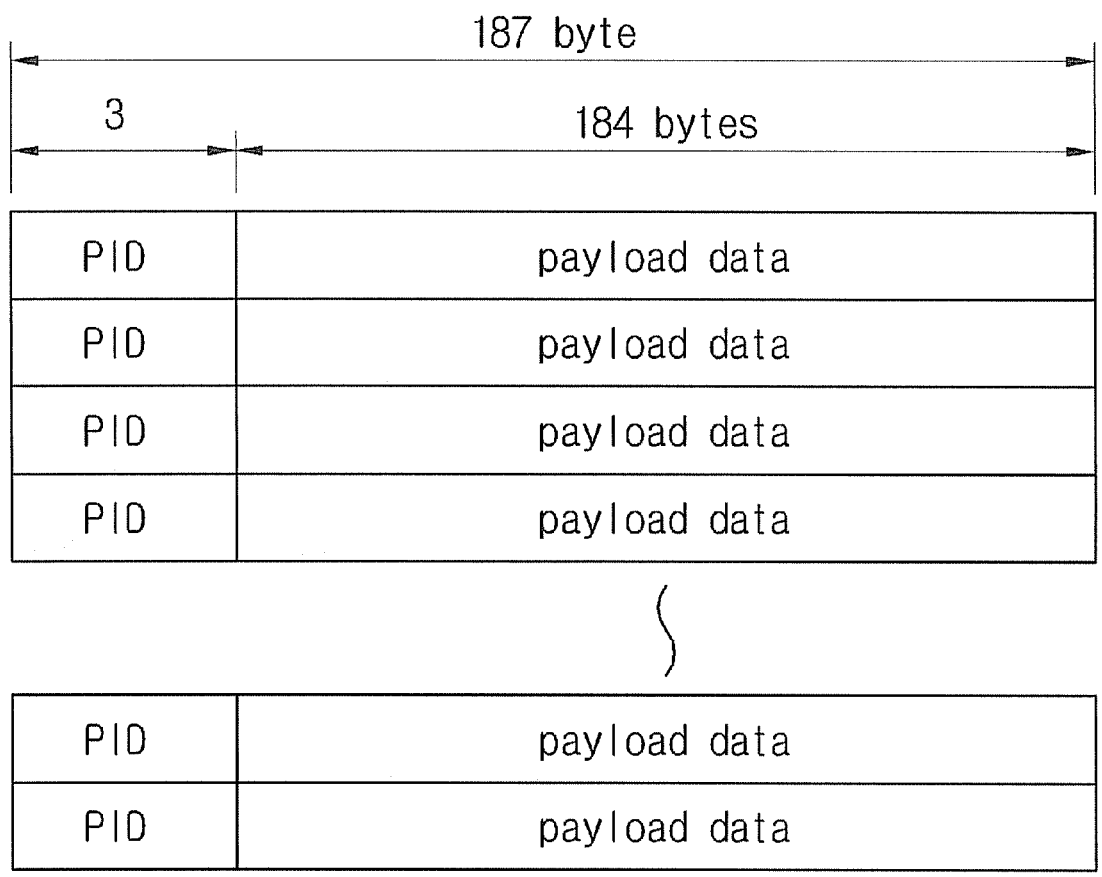
FIG. 9 shows a normal transport stream according to an aspect of the invention.

An example of an A-VSB emission multiplexer for SRS is shown in FIG. 6. In principle, the service multiplexer for SRS in FIG. 6 places adaptation fields (AF) in all TS packets for later SRS processing. The MPEG-2 TS packet syntax is shown in FIG. 7 according to an aspect of the invention. An MPEG-2 TS packet without AF is depicted in FIG. 8 according to an aspect of the invention which complies with the syntax shown in FIG. 7. This packet has a 1-byte MPEG-2 sync, a 3-byte header, and 184 bytes of payload (resulting in a total 188-byte length). A transport stream with packets without AF is shown in FIG. 9 according to an aspect of the invention.

Figure 10:
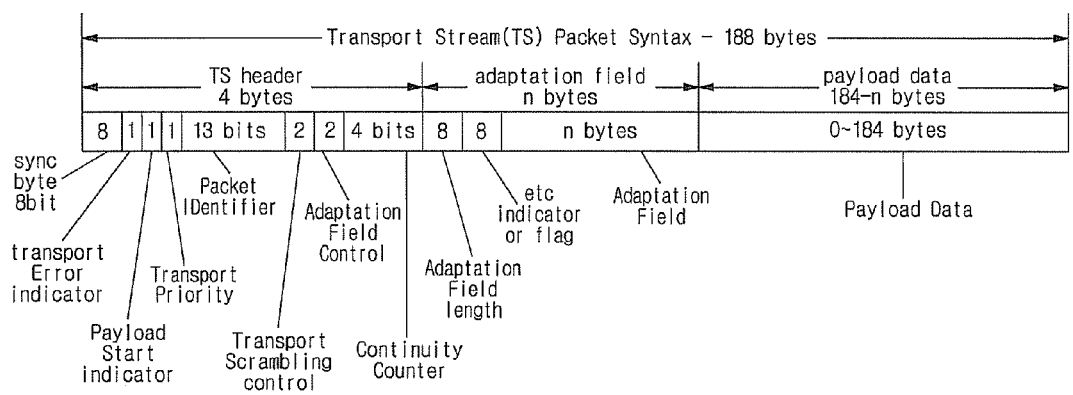
FIG. 10 shows a normal TS packet syntax with an adaptation field according to an aspect of the invention.
Figure 11:
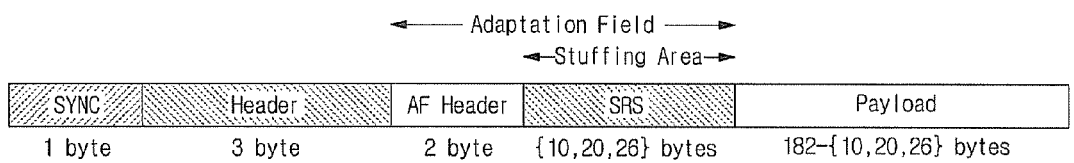
FIG. 11 shows an SRS-carrying TS packet according to an aspect of the invention.
Figure 12:
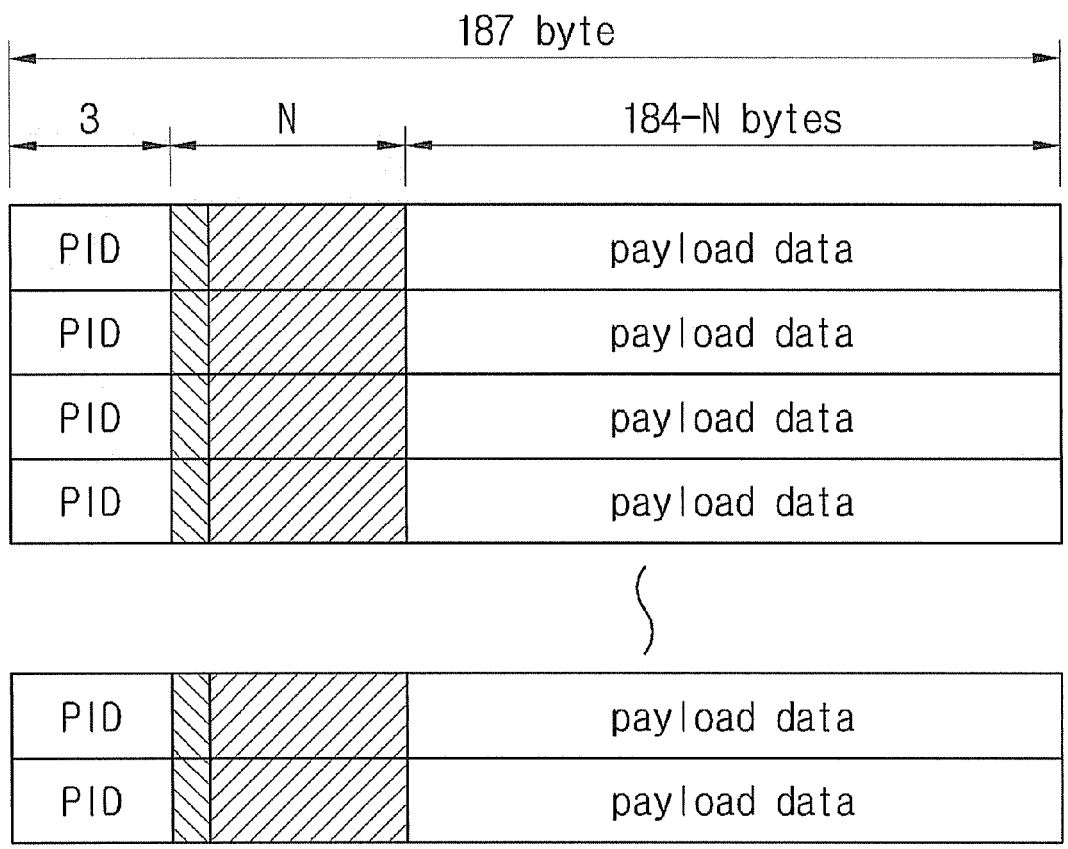
FIG. 12 shows a transport stream with SRS packets according to an aspect of the invention.

The adaptation field control in the TS header turns on an adaptation field having a length of (N) bytes which includes a 2-byte adaptation field header, leaving (N−2) bytes to carry SRS pattern data. The packet syntax with AF is shown in FIG. 10 according to an aspect of the invention. The adaptation field is mainly used to adjust a payload size during packetized elementary stream (PES) encapsulation and to carry the PCR and so on. A typical SRS packet is depicted in FIG. 11 according to an aspect of the invention, and a transport stream with SRS packets is depicted in FIG. 12 according to an aspect of the invention, which will be an output of the service multiplexer for SRS shown in FIG. 6.

The frame structure for SRS will now be described. An 8-VSB Frame has 2 data fields. Each data field has a data field sync segment and 312 data segments. A VSB slice is defined as a group of 52 data segments. Since a VSB frame has 2*312/52=12 slices, this 52 data segment granularity fits well with the special characteristics of the ATSC 52 segment VSB interleaver used in the ATSC DTV 8-VSB transmission system.

In a real situation, there are several other pieces of information that must be carried in an adaptation field along with SRS in order to be compatible with the MPEG-2 standard. These other pieces of information can be a program clock reference (PCR), an original program clock reference (OPCR), a splice counter, private data, and so on. From the ATSC and MPEG-2 perspective of an emission multiplexer, the PCR and the splice counter must be carried when needed along with the SRS. This imposes a constraint during TS packet generation since the PCR is located where the first 6 SRS pattern bytes would be stuffed. This constraint can easily be accommodated by using the deterministic frame (DF) element of the A-VSB system. Since the A-VSB frame structure must be deterministic, positions of data segments with PCR are fixed. An exciter designed for SRS knows the temporal position of the PCR and the splice counter, and properly stuffs the SRS pattern bytes to avoid overwriting the PCR and the splice counter. FIG. 21 shows one slice (52 segments) of a deterministic frame (DF) template for use with SRS according to an aspect of the invention. The SRS DF template stipulates that the 15-th (19-th) segment in every slice can be a PCR (splice counter)-carrying packet. This is based on the fact that broadcasters generally use only the PCR and splice counter of the MPEG-2 standard. However, the MPEG-2 standard provides for many other types of data to be transmitted in the TS packets, such as OPCR, adaptation field extension length, private data, etc., and if such data is required by broadcasters in the future, the SRS DF template may be modified to protect such data from being overwritten by SRS pattern data.

The MPEG-2 standard requires that a PCR-carrying packet appear in the transport stream at least once every 100 ms. The ATSC standard uses MPEG-2 transport packets, and has the same requirement that a PCR-carrying packet appear in the transport stream at least once every 100 ms. The Digital Video Broadcasting (DVB) standard, which is an alternative to the ATSC standard, and which, like the ATSC standard, uses MPEG-2 transport streams, requires that a PCR-carrying packet appear in the transport stream at least once every 40 ms. When using SRS in the A-VSB system described herein, the 15th segment in every slice of the transport stream is a PCR-carrying packet. Each slice takes 4.03 ms, so a PCR-carrying packet appears every 4.03 ms, thus far exceeding the requirements of the MPEG-2, ATSC, and DVB standards.

Obviously, a normal payload data rate with SRS will be reduced depending on (N−2) bytes of SRS pattern data in FIG. 14. (N−2) can be 0 through 26, with 0 (no SRS) being normal ATSC 8-VSB. The recommended (N−2) bytes of SRS pattern data are {10, 20, 26} bytes. The following Table 2 lists four SRS modes {0, 1, 2, 3} corresponding to (N−2) bytes of {0, 10, 20, 26}, wherein "Mbps" means megabits per second. However, other modes can be defined in other aspects of the invention.

TABLE 2

Recommended SRS-n

| SRS Mode | Mode 0 | Mode 1 | Mode 2 | Mode 3 |
| --- | --- | --- | --- | --- |
| SRS Length | 0 byte | 10 bytes | 20 bytes | 26 bytes |
| Payload Loss | 0 Mbps | 1.24 Mbps | 2.27 Mbps | 2.89 Mbps |

SRS modes are signaled to the exciter from the emission multiplexer, and are Walsh coded in bytes reserved for A-VSB in the data field sync segment. The detailed signaling scheme is described below in the section entitled "A-VSB Mode Signaling Scheme". Table 2 shows also the payload loss associated with each mode. Since 1 slice takes 4.03 ms, the payload loss due to SRS of 10 bytes is 1.24 Mbps as calculated by the following expression:

$$\frac{(10+2)\text{bytes} \cdot 52 \text{ packets}}{4.03 \text{ ms}} \cdot 8 = 1.24 \text{ Mbps}$$

Similarly, the payload loss due to SRS of 20 bytes is 2.27 Mbps, and the payload loss due to SRS of 26 bytes is 2.89 Mbps.

Figure 13:
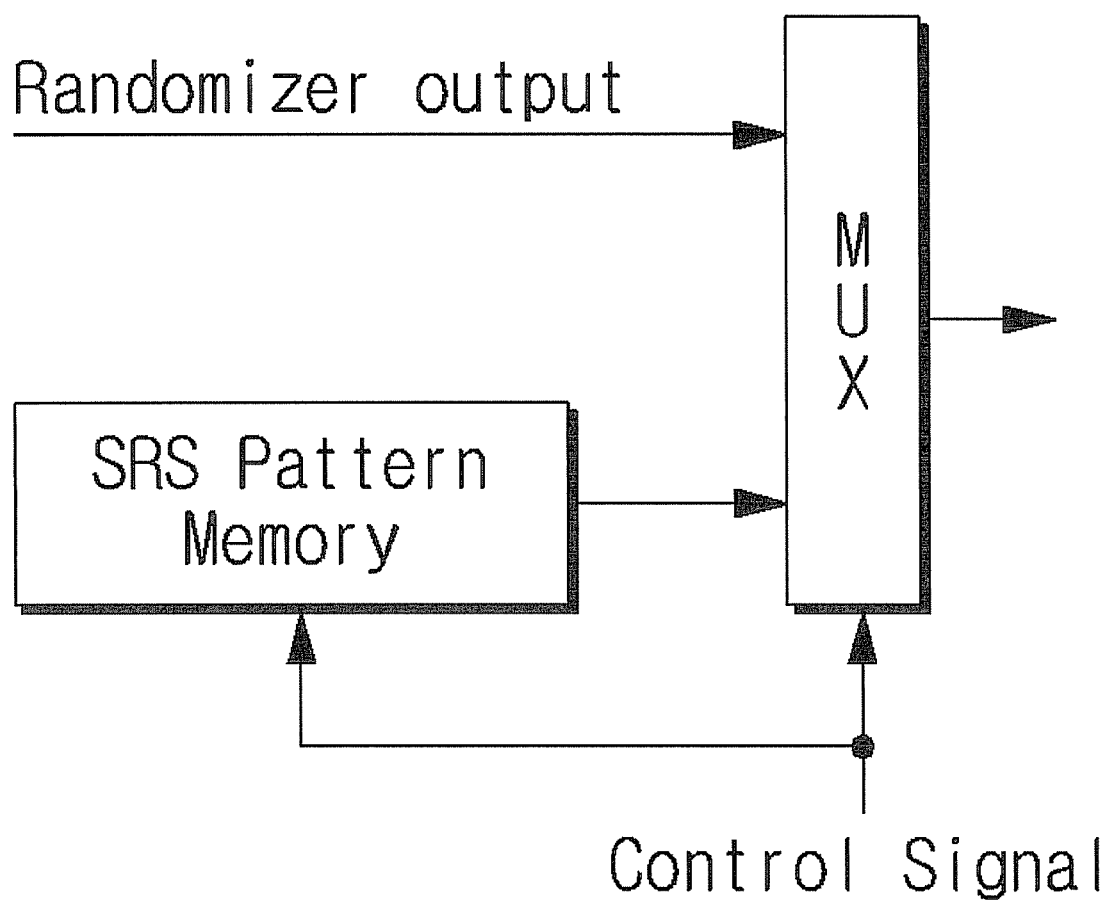
FIG. 13 shows a block diagram of an SRS stuffer according to an aspect of the invention.

The basic operation of the SRS stuffer is to fill the SRS pattern bytes to the stuffing area of the AF in each TS packet. In FIG. 13, the SRS pattern memory is activated by the control signal at the SRS stuffing time. The control signal also switches the output of the SRS stuffer to the SRS pattern memory. FIG. 14 depicts the transport stream carrying the SRS pattern bytes in the AF according to an aspect of the invention.

The SRS stuffer must not overwrite a PCR when a PCR-carrying packet is sent in a multiplex stream. Since the exciter knows that the 15-th packet in a slice from the emission multiplexer carries a PCR, the SRS stuffer can protect a PCR of the packet. Similarly, the SRS stuffer can also protect a splice counter. However, it is understood that other packet elements can be designated for protection in other aspects of the invention.

Figure 22:
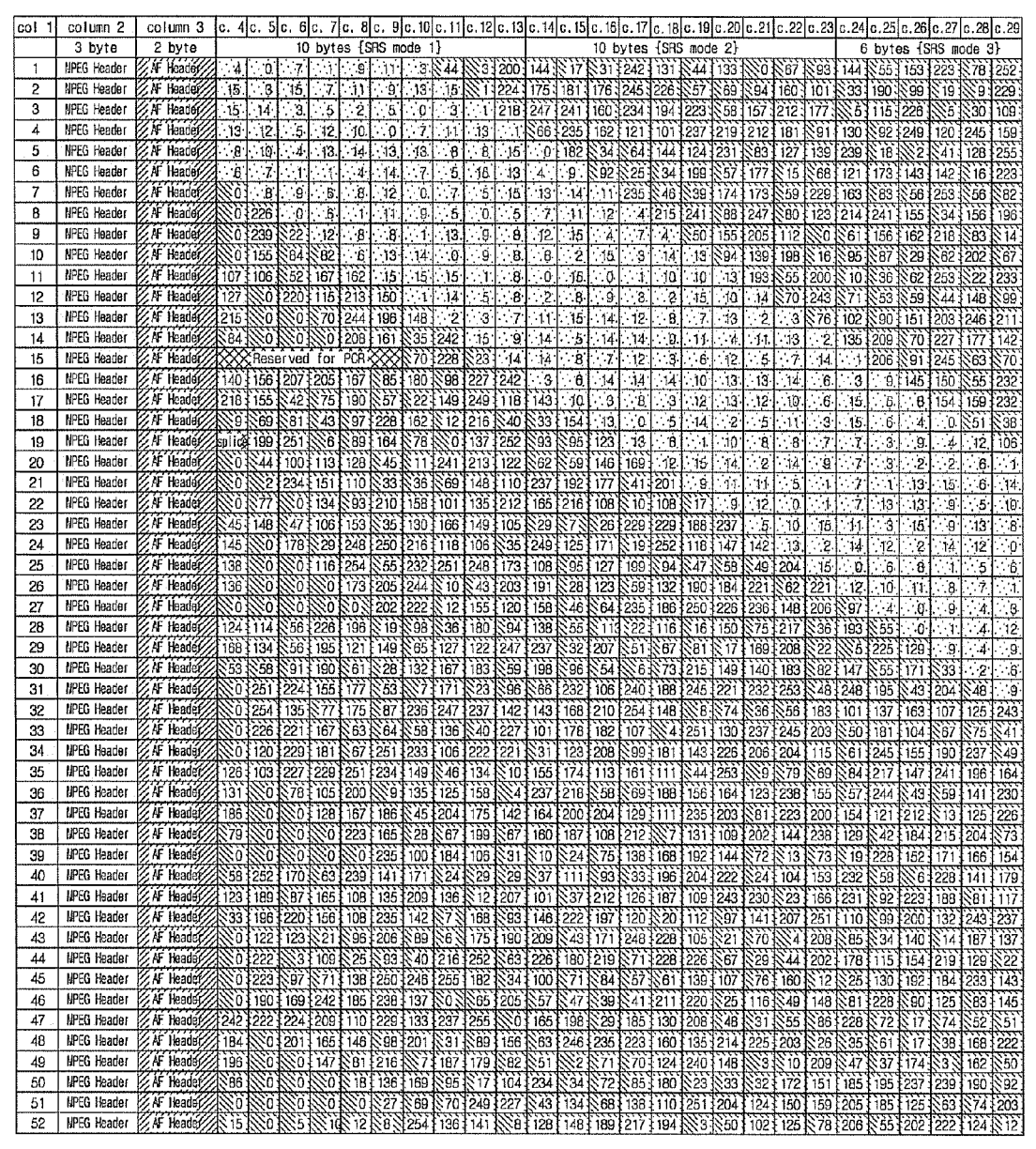

FIG. 22 shows pattern byte values stored in an SRS pattern memory. These values are designed to give a good performance for equalization in a receiver. The values in the light gray diagonal band, ranging from 0 to 15, are fed to the TCM encoders at DTR. The 4 MSBs of these bytes having values 0-15 are effectively replaced with the zero-state forcing inputs in an exciter.

Depending on the selected SRS mode, different ones of these SRS pattern byte values are used. For example, in SRS mode 1, 10 bytes of SRS pattern data per packet are used which results in the values in the 4th to the 13th columns in FIG. 22 being used. In SRS mode 2, the values from the 4th to the 23rd columns are used. In SRS mode 3, the values from the 4th to the 29th column are used. However, other values can be used in other aspects of the invention.

Figure 15:
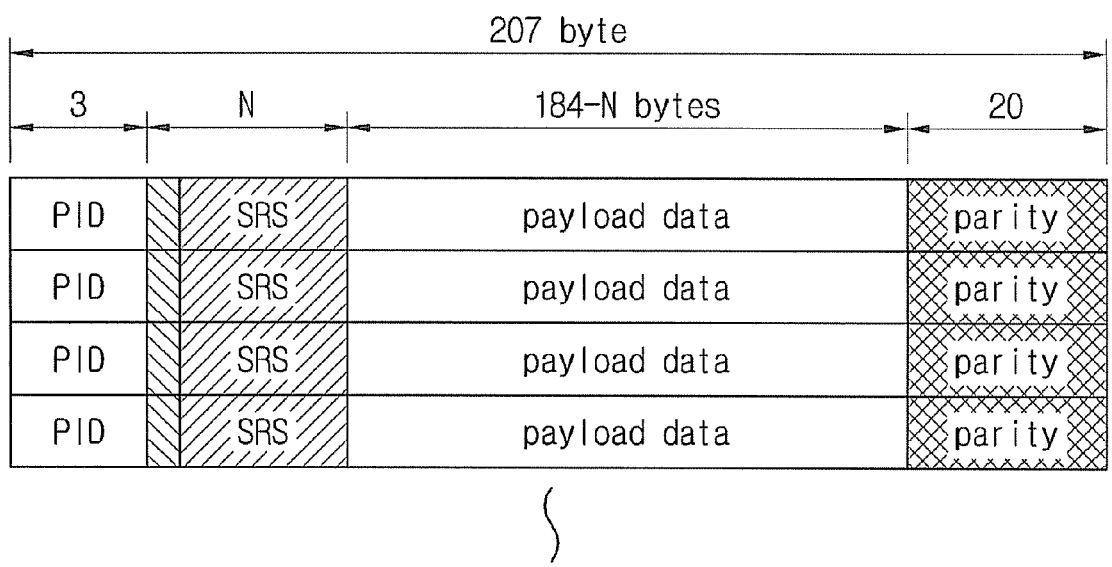
FIG. 15 shows a transport stream carrying SRS with parity added by the ReedSolomon encoder in FIG. 5 according to an aspect of the invention.

A transport stream carrying SRS is then fed to the Reed-Solomon (RS) encoder in FIG. 5. The output of the RS encoder is shown in FIG. 15, which is an example of a parity-attached version of an SRS-carrying transport stream according to an aspect of the invention.

Figure 16:
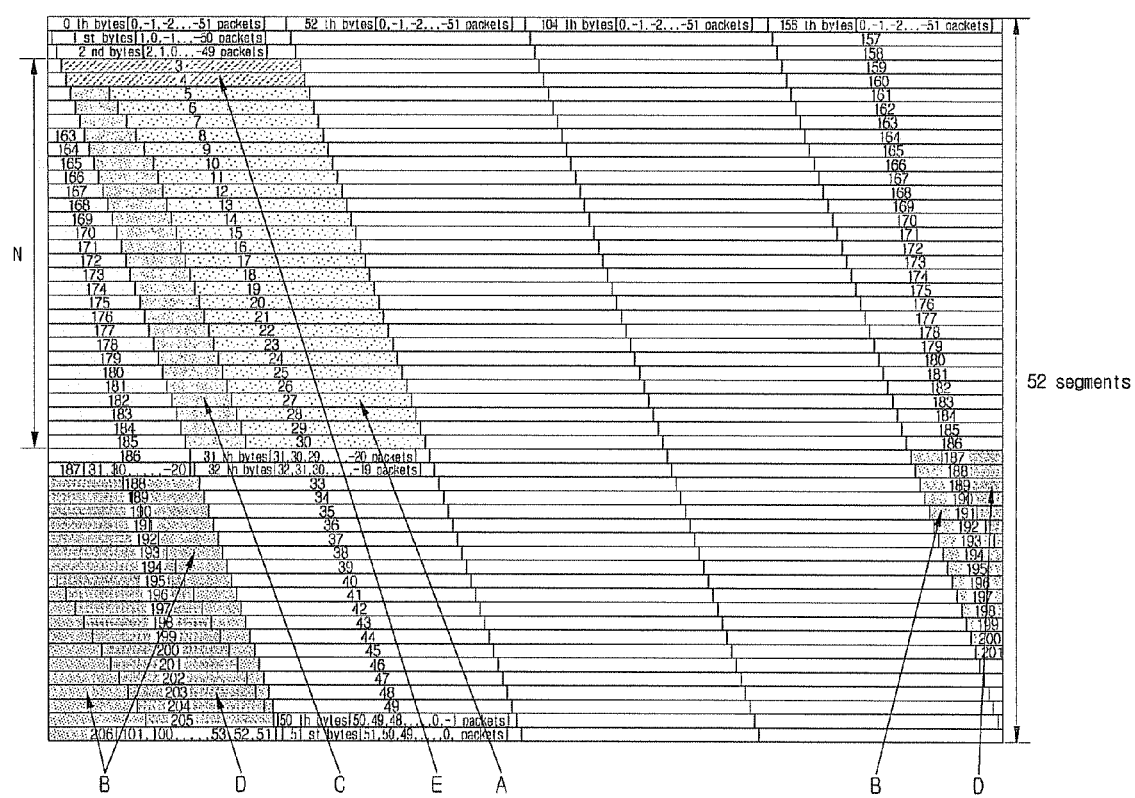
FIG. 16 shows an ATSC byte interleaver output for N=26 (SRS)+2(AF header) according to an aspect of the invention.

FIG. 16 shows the output of the byte interleaver in FIG. 5. See the discussion below in the section entitled "ATSC Byte Interleaver Mapping" to understand the exact byte interleaver mapping. FIGS. 57-62 discussed in that section graphically show how to manipulate the input bytes to obtain the final interleaved bytes.

Figure 17:
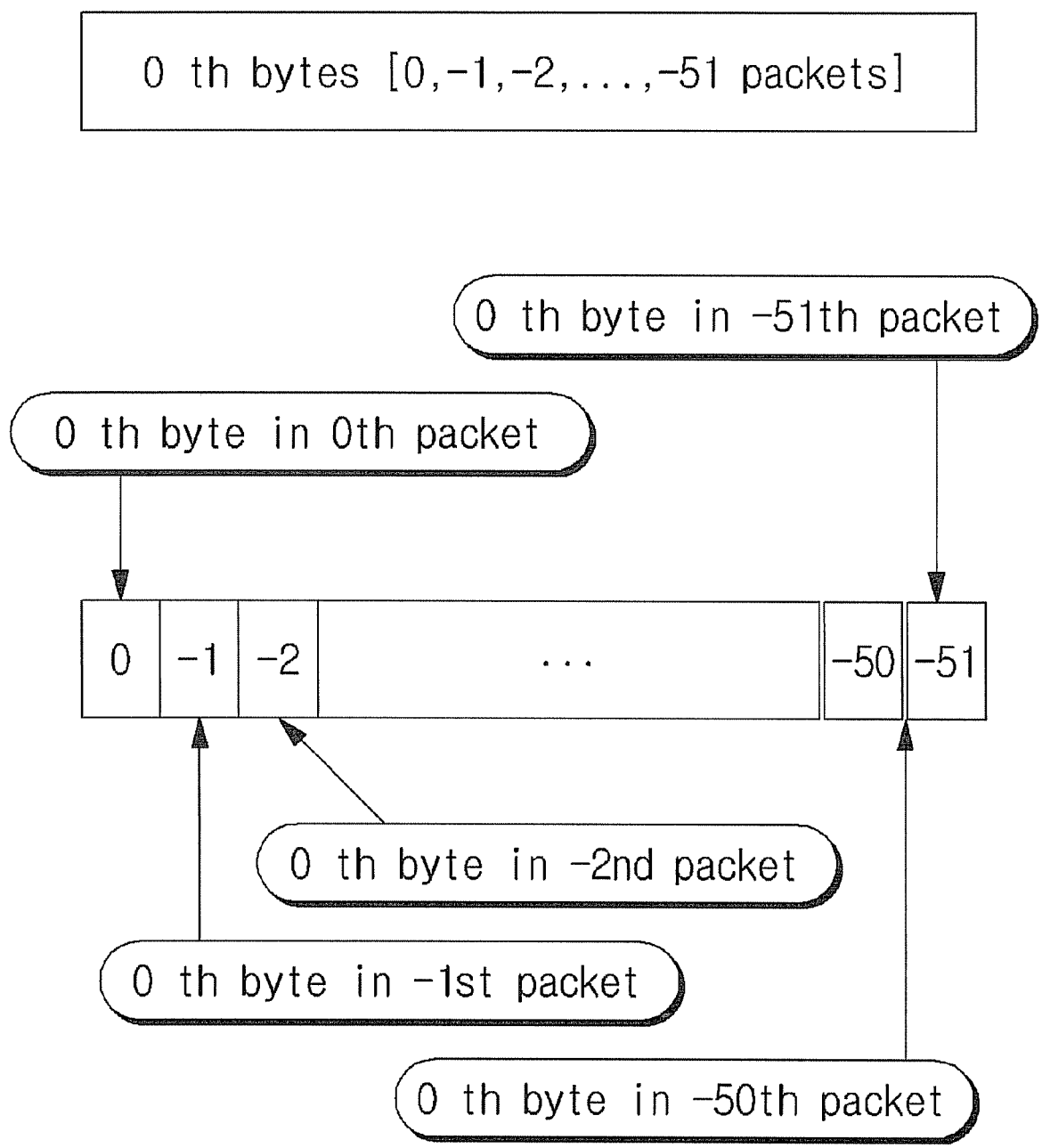
FIG. 17 shows the meaning of "0th bytes according to an aspect of the invention.

The region labeled "A" in FIG. 16 contains SRS pattern bytes, while the regions labeled "B" contain parity bytes. The region labeled "C" contains bytes to be replaced by DTR, and the regions labeled "D" contain the parity bytes to be recalculated in order to correct the parity mismatch introduced by DTR. The region labeled "E" contains adaptation field header bytes. FIG. 17 explains how to interpret "0th bytes in FIG. 16. A negative packet number means nothing but a relative order among packets. The -1-th packet is the packet preceding the 0-th packet.

Note that (N) bytes of SRS pattern data contained in 52 segments in FIG. 16 are arranged vertically by the ATSC byte interleaver mapping, resulting in (N) segments each containing 52 contiguous bytes of SRS pattern data. The 52 contiguous bytes of SRS pattern data in each of the (N) segments serve as a training sequence that is used by an SRS-aware equalizer in a receiver.

Figure 18:
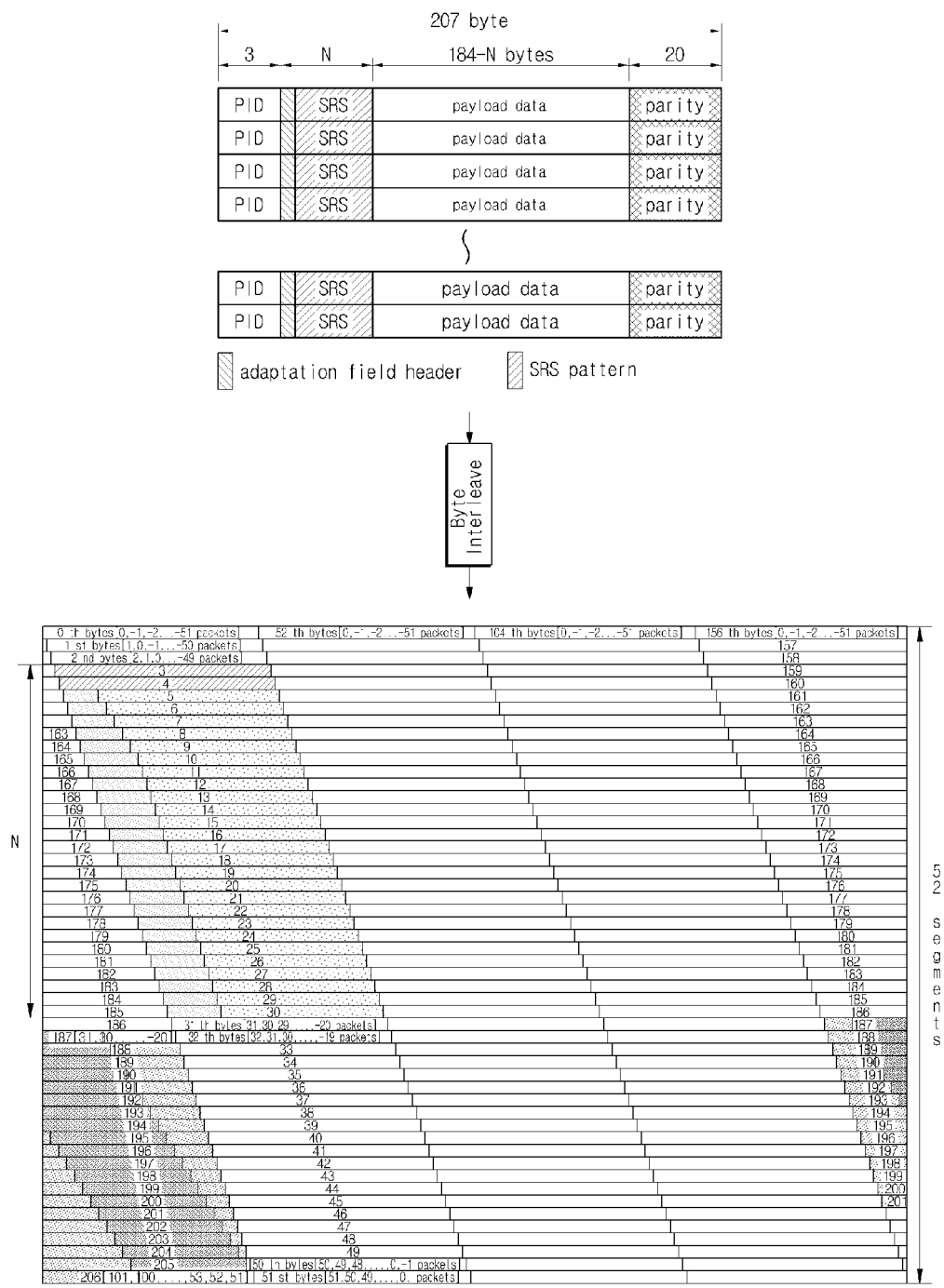
FIG. 18 conceptually shows how an ATSC byte interleaver converts 52 segments each containing 26 bytes of SRS pattern data in a transport stream into 26 segments each containing 52 contiguous bytes of SRS pattern data in a transmission stream.

More specifically, the SRS DF template in FIG. 21 shows that each one of the 52 segments contains 10, 20, or 26 bytes of SRS pattern data in the transport stream. The ATSC byte interleaver converts this arrangement of SRS pattern data in the transport stream into 10, 20, or 26 segments each containing 52 contiguous bytes of SRS pattern data in the transmission stream. FIG. 16 shows an example where 52 segments each containing 26 bytes of SRS pattern data in the transport stream have been converted into 26 segments numbered 5 through 30 each containing 52 contiguous bytes of SRS pattern data in the transmission stream. As can be seen from FIG. 16, the ATSC byte interleaver converts the 52 segments each containing 207 total bytes in the transport stream into 207 segments each containing 52 bytes in the transmission stream. This conversion process is shown conceptually in FIG. 18 in which the top portion corresponds to FIG. 15, the small block in the middle labeled "Byte Interleave" corresponds to the block labeled "Byte Interleave" in FIG. 5, and the bottom portion corresponds to FIG. 16.

FIG. 3 shows an A-VSB frame on the right with SRS turned on. Each of the 12 rhombus-shaped areas in FIG. 3 corresponds to the combination of the regions labeled "A" and "C" in FIG. 3, and contains portions of 10, 20, or 26 segments each containing 52 contiguous bytes of SRS pattern data, or 208 contiguous symbols since 1 byte equals 4 symbols. Thus, a known sequence of 52 contiguous bytes or 208 contiguous symbols of SRS pattern data appears in 120, 240, or 312 segments out of the 626 segments in an A-VSB frame for use as a training sequence by a receiver equalizer. This frequent training of the receiver equalizer is very effective in mitigating dynamic multi-path interference and other adverse channel conditions and adapting to a dynamically changing channel.

Figure 19:
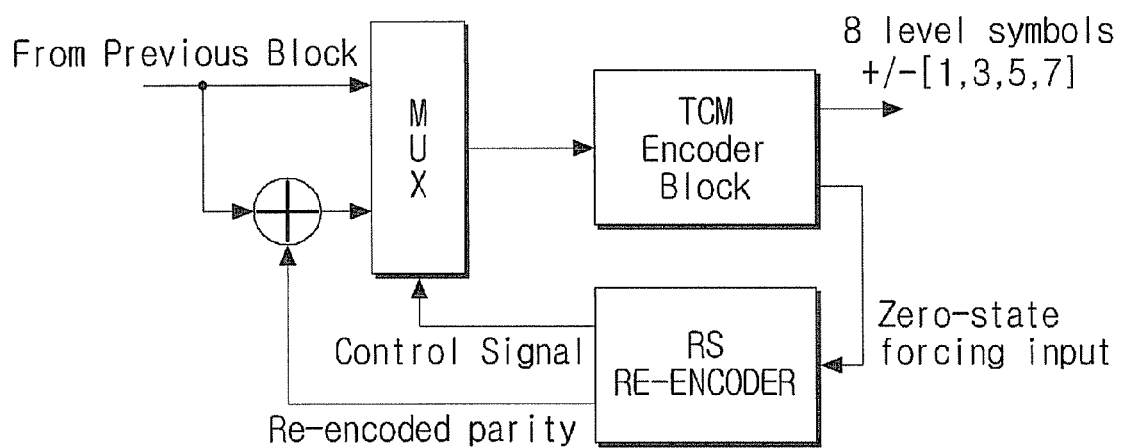
FIG. 19 shows a block diagram of a trellis-coded modulation (TCM) encoder block with parity correction according to an aspect of the invention.

FIG. 19 shows a block diagram of a TCM encoder block with parity correction. The RS re-encoder receives zero-state forcing inputs from the TCM encoder block. After synthesizing an RS code information word from the zero-state forcing inputs, the RS re-encoder calculates parity bytes. When the parity bytes to be replaced arrive, these parity bytes are replaced by the values generated by the exclusive-OR of these parity bytes and the recalculated parity bytes from the RS re-encoder.

Figure 20:
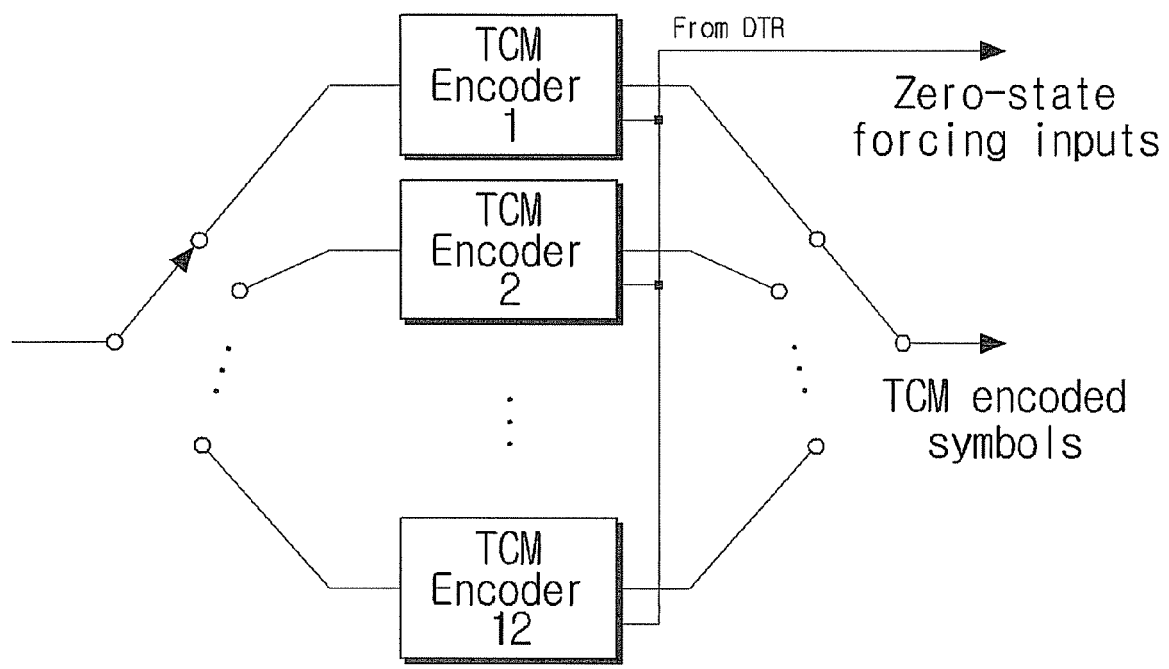
FIG. 20 shows a detailed block diagram of the TCM encoder block in FIG. 19 according to an aspect of the invention.

The trellis encoder block shown in FIG. 19 includes a 12-way data splitter, 12 TCM encoders, and a 12-way data de-splitter as shown in FIG. 20. TCM encoder behavior is described in Annex D of ATSC A/53E previously referred to above. The 12 trellis encoders for A-VSB have DTR functionality. The zero-forcing inputs are fed to the next block, which calculates the re-encoded parity bytes. However, it is understood that other types of TCM encoders can be used in other aspects of the invention.

As discussed above, the number (N−2) of bytes of SRS pattern data can be 0 through 26 bytes, with recommended modes being 10, 20, and 26 bytes. Actually, up to 27 bytes of SRS pattern data can be used, but it is preferable to use a maximum of 26 bytes of SRS pattern data to provide a safety margin for recalculating parity bytes to correct for the parity mismatch introduced by deterministic trellis reset (DTR) referred to above. When DTR is performed, the 4 MSBs of the SRS pattern byte values shown in the light gray diagonal band in FIG. 22 are effectively replaced with the zero-state forcing inputs in an exciter to reset the TCM encoders. This introduces a parity mismatch, and the parity bytes corresponding to these SRS pattern bytes must be recalculated in the RS re-encoder in FIG. 19.

Figure 23:
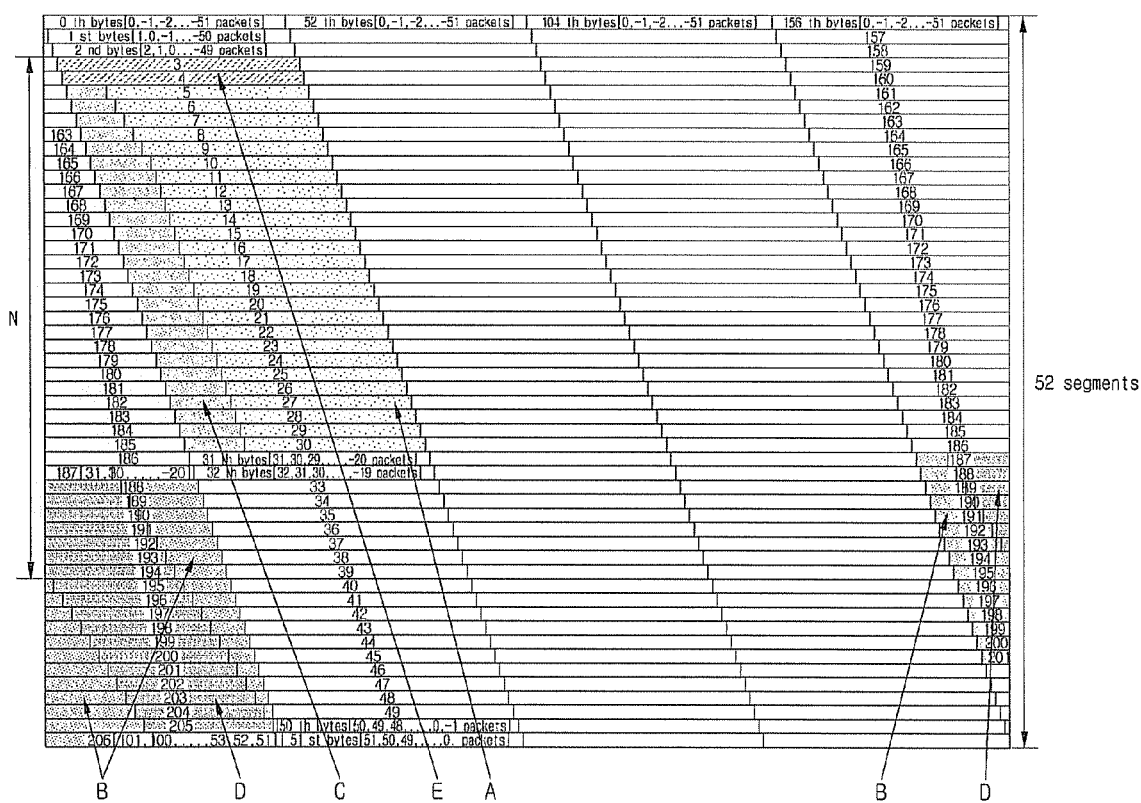
FIG. 23 shows an ATSC byte interleaver output when 35 bytes of SRS pattern data are used which shows why more than 27 bytes of SRS pattern data cannot be used.

FIG. 23 shows an ATSC byte interleaver output which shows why more than 27 bytes of SRS pattern data cannot be used. FIG. 23 is the same as FIG. 16, except that 35 bytes of SRS pattern data are used in FIG. 23, while 26 bytes of SRS pattern data are used in FIG. 16. As in FIG. 16, the region labeled "A" in FIG. 23 contains SRS pattern bytes, while the regions labeled "B" contain parity bytes. The region labeled "C" contains bytes to be replaced by DTR, and the regions labeled "D" contain the parity bytes to be recalculated in order to correct the parity mismatch introduced by DTR. The region labeled "E" contains adaptation field header bytes. As can be seen from FIG. 23, in the segments numbered 32 through 39 corresponding to bytes 28 through 35 of the 35 bytes of SRS pattern data, the SRS pattern bytes in the region labeled "A" appear after the parity bytes to be recalculated in the region labeled "D". This means that the parity bytes to be recalculated in the region labeled "D" corresponding to bytes 28 to 35 of the 35 bytes of SRS pattern data have already passed through the TCM encoder block shown in FIG. 19, making it impossible to recalculate any of the parity bytes to be recalculated in the region labeled "D" for bytes 28 through 35 of the 35 bytes of SRS pattern data.

As can be seen from FIG. 16, the region labeled "C" that contains bytes to be replaced by DTR contains fewer bytes in segments 5 through 9 than in segments 10 through 31. Specifically, the region labeled "C" contains 7 bytes in segment 5, 8 bytes in segment 6, 9 bytes in segment 7, 10 bytes in segment 8, 11 bytes in segment 9, and 12 bytes in each of segments 10 through 31. This is because a slice boundary cuts off the region labeled "C" in segments 5 through 9. A slice boundary is a boundary in the transmission stream between data obtained from two 52-segment slices of data in the transport stream. Thus, if the region labeled "C" contained 12 bytes in each of segments 5 through 9, some of these bytes would come from one slice and the other bytes would come from another slice. For example, in segment 5, 7 bytes would come from one slice and 5 bytes would come from another slice. Each of the bytes in the region labeled "C" resets one of the 12 trellis encoders in FIG. 2 during DTR. Parity bytes corresponding to the bytes in the region labeled "C" must be recalculated in order to correct the parity mismatch introduced by DTR. This cannot be done for all of the bytes in the other slice because the corresponding parity bytes appear beforehand in the transmission stream as a result of the operation of the ATSC byte interleaver. Since segments 5 to 9 do not contain 12 bytes to be replaced by DTR, it is not possible to initialize all 12 of the trellis encoders in FIG. 2 during DTR for segments 5 to 9. Thus, in segment 5, 7 of the 12 trellis encoders in FIG. 2 are reset during DTR. In segment 6, 8 of the 12 trellis encoders are reset. In segment 7, 9 of the 12 trellis encoders are reset. In segment 8, 10 of the 12 trellis encoders are reset. In segment 9, 11 of the 12 trellis encoders are reset. In each of segments 10 through 31, all 12 of the trellis encoders are reset.

Figure 24:
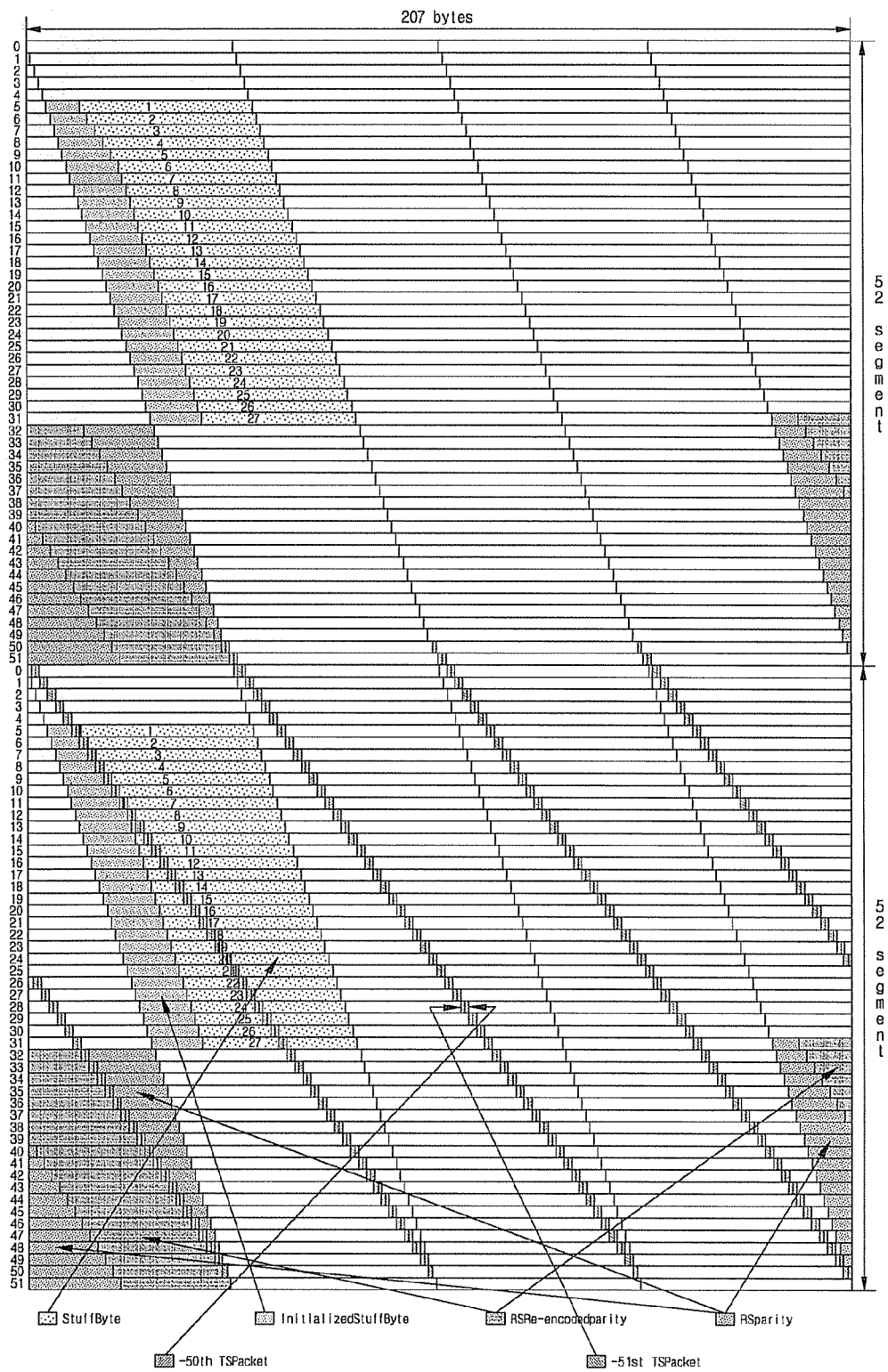
FIG. 24 shows how a slice boundary cuts off the region labeled "C" in FIG. 16 in segments 5 through 9.

FIG. 24 shows how a slice boundary cuts off the region labeled "C" in FIG. 16 in segments 5 through 9. In FIG. 24, the region labeled "InitializedStuffByte" corresponds to the region labeled "C" in FIG. 16. The slice boundaries are the diagonal lines formed by the bytes from the −50th and −51st TS packets.

Figure 25:
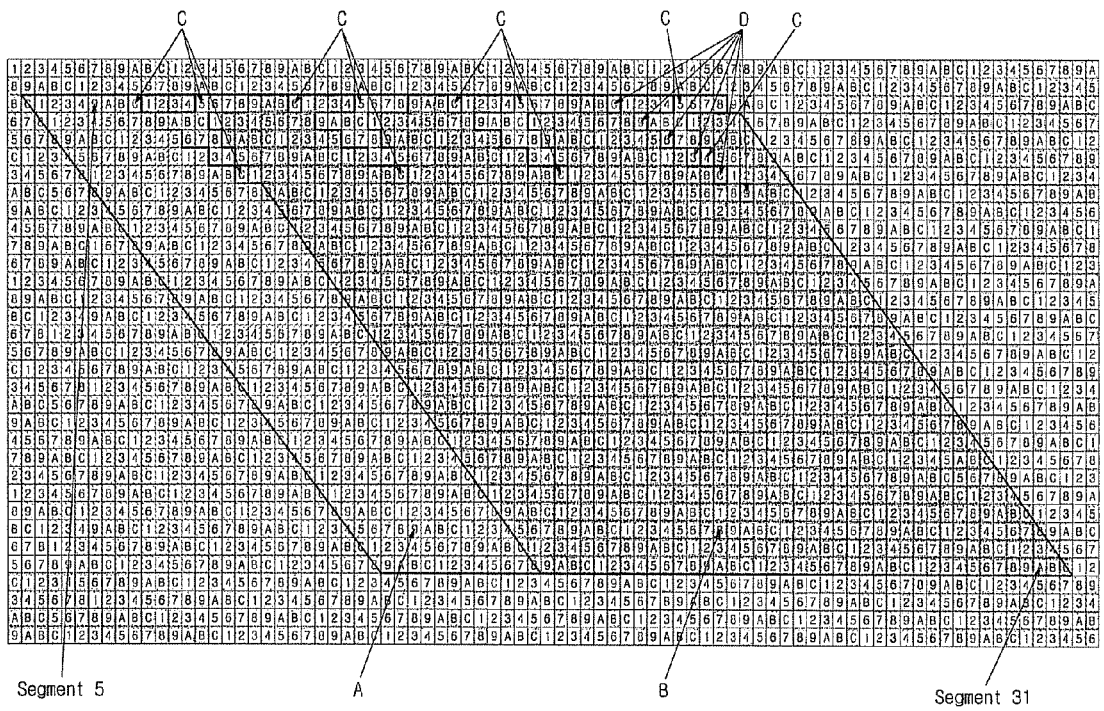
FIG. 25 shows an ATSC byte interleaver output for 27 bytes of SRS pattern data (the maximum permissible number of bytes of pattern data) appearing in segments5 through 31.

FIG. 25 shows an ATSC byte interleaver output for 27 bytes of SRS pattern data (the maximum permissible number of bytes of pattern data) appearing in segments 5 through 31. The region labeled "A" contains trellis encoder initialization bytes that are used to reset the 12 trellis encoders in FIG. 2 during deterministic trellis reset (DTR). The region labeled "B" contains trellis encoder input bytes for generating an SRS training sequence in the transmission stream. The regions labeled "C" contain bytes corresponding to trellis encoders that cannot be initialized in segments 5 through 9. The regions labeled "D" in segments 5 through 10 contain the 6 PCR bytes that are carried in the 15th packet in the transport stream as shown in FIG. 21. The bytes in the regions "D" in segments 5 through 9 correspond to trellis encoders that cannot be initialized. The 12 characters 1 through 9, A, B, and C in FIG. 25 identify the 12 trellis encoders numbered #0 through #11 in FIG. 2. That is, character 1 identifies trellis encoder #0, character 2 identifies trellis encoder #1, and so on, up to character C identifies trellis #11.

As can be seen from the regions labeled "C" and "D" in FIG. 25, in segment 5 (corresponding to byte 1 of the SRS pattern data), the five trellis encoders identified by characters C, 5, 6, 7, and 8 cannot be initialized. In segment 6 (corresponding to byte 2 of the SRS pattern data), the four trellis encoders identified by characters 9, A, B, and C cannot be initialized. In segment 7 (corresponding to byte 3 of the SRS pattern data), the three trellis encoders identified by characters 6, 7, and 8 cannot be initialized. In segment 8 (corresponding to byte 4 of the SRS pattern data), the two trellis encoders identified by characters 3 and 4 cannot be initialized. In segment 9 (corresponding to byte 5 of the SRS pattern data), the one trellis encoder identified by character C cannot be initialized. In segments 10 through 31 (corresponding to bytes 6 through 27 of the SRS pattern data), all 12 of the trellis encoders can be initialized. The various trellis encoders that cannot be initialized in segments 5 through 9 cannot be used to encode SRS pattern data in those segments because the encoded SRS pattern data would not match the known sequence of SRS pattern data that is expected by the receiver equalizer as a result of the inability to initialize the trellis encoders. Therefore, the SRS stuffer in FIG. 5 is designed not to overwrite the bytes in the regions labeled "C" in FIG. 25 when it stuffs the SRS pattern bytes into the adaptation fields in the transport stream. That is, the SRS stuffer does not fill these bytes with SRS pattern bytes stored in the SRS pattern memory as shown in FIG. 22. Also, the SRS stuffer is designed not to overwrite the bytes in the region labeled "D" in FIG. 25 that contain the 6 PCR bytes that are carried in the 15th packet in the transport stream.

As can be seen from the deterministic frame (DF) template for use with SRS shown in FIG. 21, all segments or packets have an adaptation field. However, the current ATSC constraints on the MPEG-2 standard prevent all packets from having an adaptation field. For example, a packet identified by a program_map_PID (packet identifier) value cannot have an adaptation field for any purpose other than for signaling with the discontinuity_indicator that the version_number (Section 2.4.4.9 of ISO/IEC 13818-1 [C3]) may be discontinuous. Also, a packet identified by PID 0x0000 (the PAT (program association table) PID) cannot have an adaptation field for any purpose other than for signaling with the discontinuity_indicator that the version_number (Section 2.4.4.5 of ISO/IEC 13818-1 [C3]) may be discontinuous.

One way to solve this conflict with the ATSC standard is to repeal the ATSC constraints on the MPEG-2 standard in view of the substantial benefits provided by the use of SRS which enables a receiver equalizer to mitigate dynamic multi-path interference and other adverse channel conditions and adapt itself to a dynamically changing channel.

Another way to solve this conflict with the ATSC standard is to provide a packet without an adaptation field at a fixed location in a frame, similar to what is done by making the 15th packet in a frame a PCR-carrying packet and the 19th packet in a frame a splice counter-carrying packet.

For example, FIG. 26 shows one slice (52 segments) of a deterministic frame (DF) template for use with SRS according to an aspect of the invention in which a {Null, PAT, PMT} packet without an adaptation field is provided at a fixed location in a frame. PAT stands for program association table, and PMT stands for program map table. When 10 bytes of SRS pattern data are used, the packet without an adaptation field is provided in the 16th packet. When 20 bytes of SRS pattern data are used, the packet without an adaptation field is provided in the 25th packet. When 26 bytes of SRS pattern data are used, the packet without an adaptation field is provided in the 31st packet. However, it is understood that in other aspects of the invention, a different type of packet without an adaptation field can be provided in the 10th, 25th, 31st, or any other packet, and that two or more packets without an adaptation field can be provided at fixed locations in a frame.

If other pieces of information are to be delivered along with the PCR, they can be assigned to a fixed location in a frame just like is done with the PCR. FIG. 26 shows an example where the 15th packet that carries PCR also carries private data and an adaptation field extension length. These other pieces of information will reduce the number of bytes of SRS pattern data that can be carried in the adaptation field of the 15th packet. However, it is understood that in other aspects of the invention, these other pieces of information can be carried in one or more packets other than the 15th packet, and that one or more different other pieces of information can be carried in the 15th packet and/or in one or more packets other than the 15th packet.

As described above, SRS pattern data is carried in an adaptation field of a transport stream packet. However, the invention is not limited to such an implementation, and similar pattern data for training a receiver equalizer can be carried directly in the payload of a transport stream packet using A/90 data piping which is described in ATSC Data Broadcast Standard A/90 (Including Amendment 1 and Corrigendum 1 and Corrigendum 2), Jul. 26, 2000, the contents of which are incorporated herein by reference in their entirety.

A harmonized single-frequency network (SFN) is another element of the A-VSB system. ATSC A/110A, Synchronization Standard for Distributed Transmission, Revision A, 19 Jul. 2005, describes the following three ATSC 8-VSB elements that must be synchronized in each exciter to produce coherent symbols from multiple ATSC 8-VSB transmitters configured into an SFN.

Figure 27:
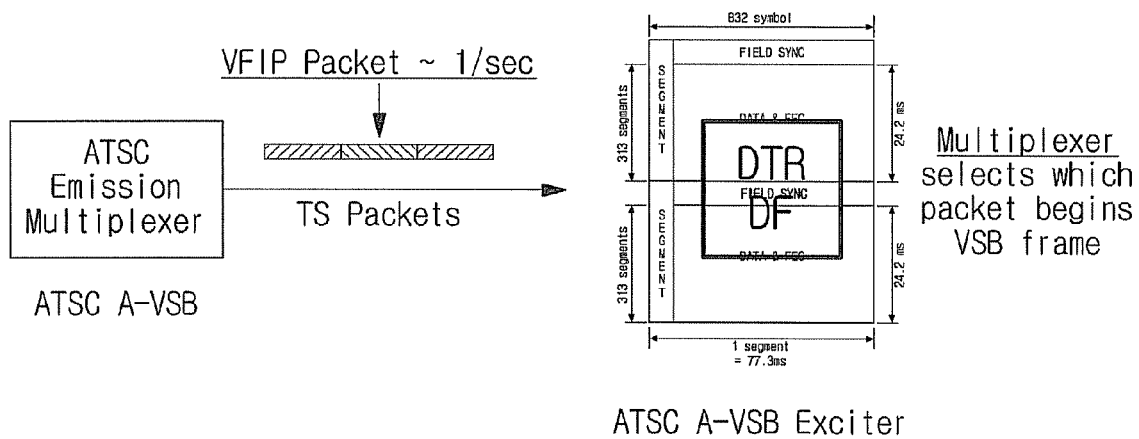
FIG. 27 conceptually shows a harmonized ATSC single-frequency network (SFN) functionality.

1. Frequency Synchronization of the 8-VSB Pilot or Carrier
2. Data Frame Synchronization
3. Pre-Coder/Trellis Encoder Synchronization FIG. 27 shows the emission multiplexer outputting an operational and management packet (OMP) with a reserved PID of 0x1 FFA approximately once per second. This special packet is called a VSB frame initialization packet (VFIP), and it has the needed syntax and working in harmony with the A-VSB exciter, the semantic meanings are defined to efficiently and effectively create the extensible functionality needed for an ATSC SFN.

Figure 28:
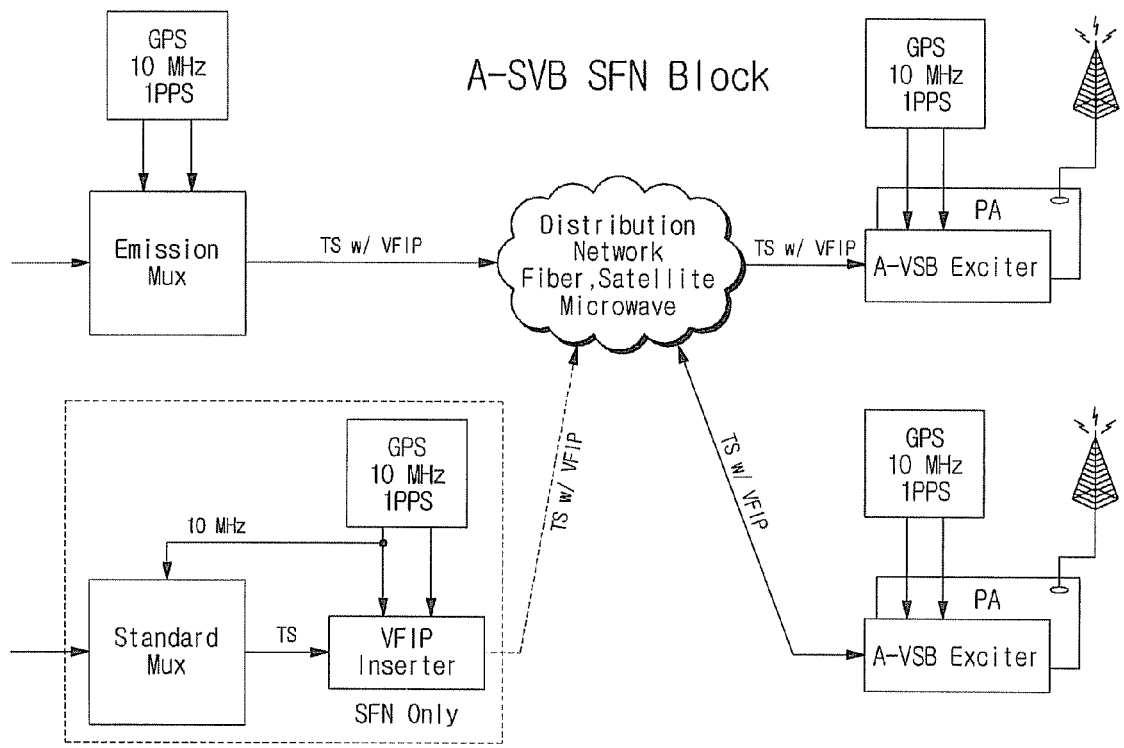
FIG. 28 shows a system configuration for a harmonized SFN and A-VSB functionality.

FIG. 28 depicts the system configuration for a harmonized SFN and A-VSB functionality. However, other configurations can be used for other networks.

The frequency synchronization of the 8-VSB pilot or carrier can be achieved by using a well-known technique—by locking the exciter's carrier frequency to a universally available frequency reference such as the 10 MHz reference from a GPS receiver. This synchronization will regulate the apparent Doppler shift seen by the ATSC receiver from the SFN in overlapping coverage areas and should be controlled to ±0.5 Hz.

Data frame synchronization requires that all exciters in an SFN choose the same TS packet from the incoming TS to start a VSB data frame. Data frame synchronization is implicitly achieved in the A-VSB system by the insertion of a VFIP TS packet. The VFIP always appears as the last (624th) TS packet in a VSB frame). The TS packets in a VSB frame are numbered 0 through 623, so the 624th packet is numbered 623. The semantic meaning is that the A-VSB exciter must insert a data field sync segment with no PN63 inversion directly after the last bit of the VFIP. Then it must continue with normal VSB frame construction starting with next TS packet (0) as the first data segment of the next VSB frame.

Figure 29:
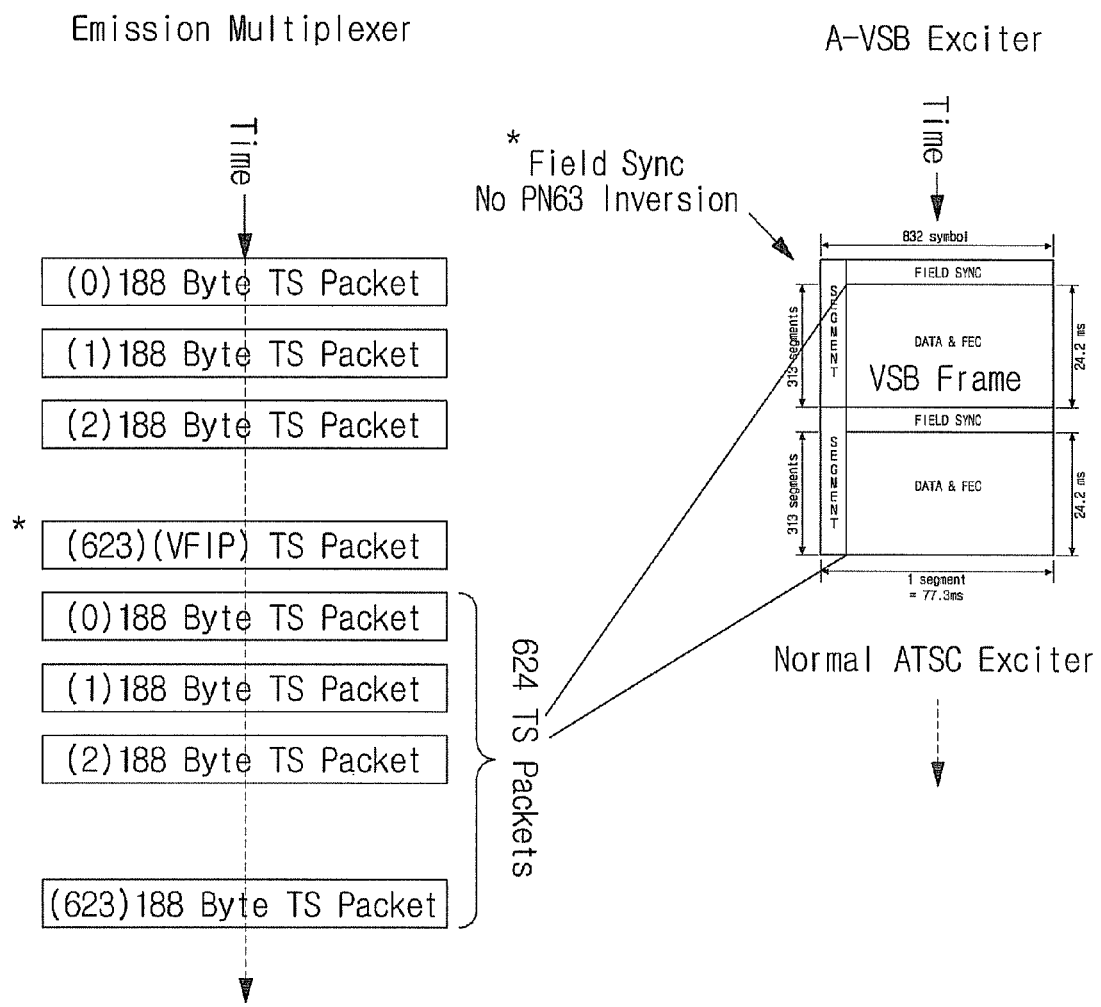
FIG. 29 shows insertion of a VSB frame initialization packet (VFIP) in a last (623rd) TS packet in a VSB frame.

This simple, straightforward approach is shown in FIG. 29. The ATSC A/53 VSB frame has 624 payload segments. These 624 payload segments carry data equivalent to 624 TS packets. Although the continuous 52-segment convolutional byte interleaver spreads data from any particular TS packet across VSB frame boundaries, one VSB frame carries data equivalent to 624 TS packets. The emission multiplexer has its data rate locked to a 10 MHz external GPS reference. The emission multiplexer simply starts by selecting a TS packet currently being generated and makes the decision that this TS packet will begin a VSB frame, and then starts counting 624 TS packets (0-623) inclusive of this selected packet. This is the container of data which equals the payload in one VSB frame that will be produced downstream by the ATSC exciter. This count (0-623) becomes the data frame cadence signal of the VSB frame. This count (0-623) will always be maintained by the emission multiplexer and is the essence for all timing and future A-VSB pre-processing. This decision now needs to be signaled to all of the exciters participating in the SFN so they can follow the decision made by the emission multiplexer to achieve initial frame synchronization and to maintain this condition.

This is shown in the diagram as the insertion of a VFIP with the reserved PID 0x1 FFA as the last packet (623) of a VSB frame. When inserted, the VFIP will appear only in this packet slot (623) and will be inserted at a periodicity as defined in VFIP syntax (normally approximately once per second).

Figure 30:
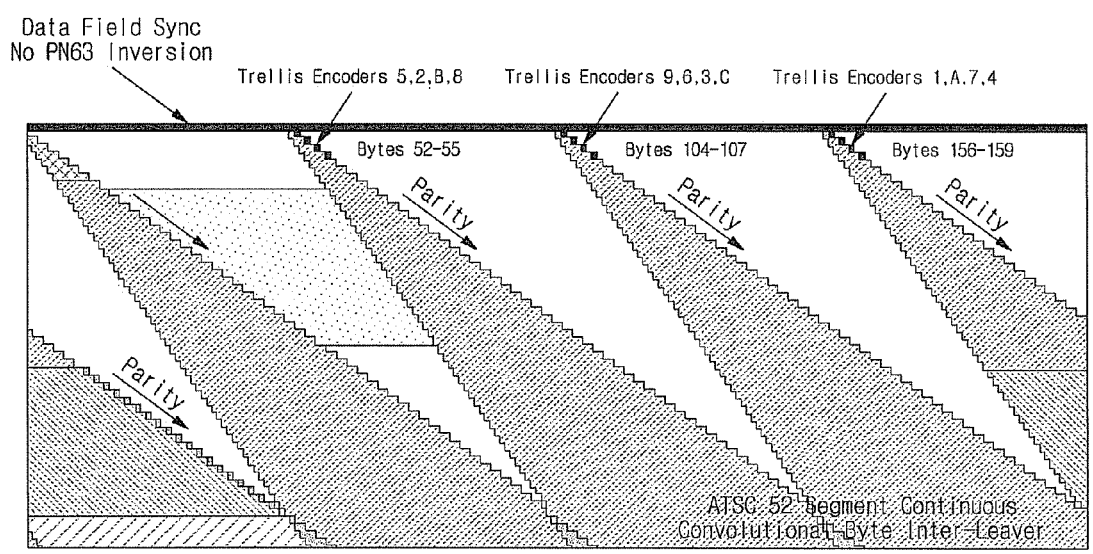
FIG. 30 shows byte mapping in an ATSC 52-segment interleaver.

The pre-coder/trellis encoder synchronization is made simple by using the synergy of the element deterministic trellis reset (DTR) element of the A-VSB system. But to understand this synergy requires an in-depth knowledge of the ATSC 52-segment continuous convolutional byte interleaver. FIG. 30 below shows the byte mapping in the ATSC 52-segment interleaver. The bytes are clocked out in a left-to-right direction and sent to the following stages of the trellis intra-segment interleaver and finally the (12) pre-coder/trellis encoders.

Figure 31:
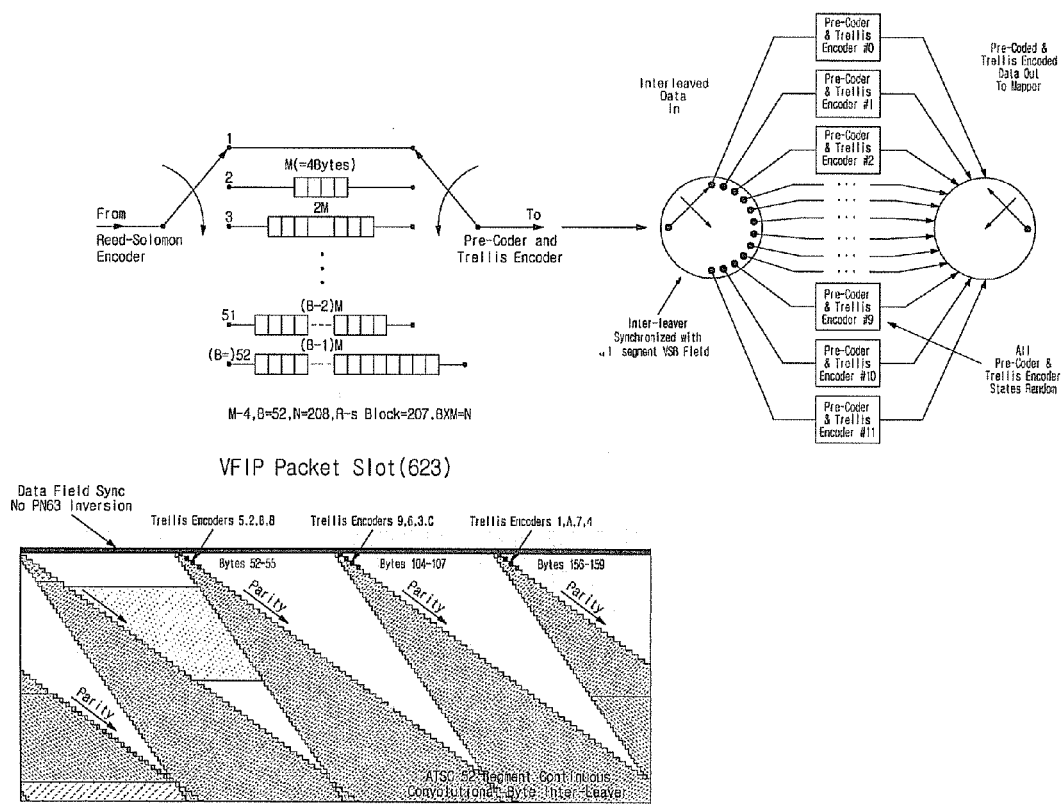
FIG. 31 shows positions of bytes of a VFIP in the ATSC 52-segment interleaver.

Again, a "deterministic" system is a system in which the output can be predicted with 100% certainty. The complexity of this interleaver process is now well understood and will be leveraged and harnessed. This should become one of the temporal strengths of the ATSC system as was previously mentioned. A brief description of this FIG. 31 shows the insertion of data field sync (no PN63 inversion) in response to a VFIP in a last packet slot (623) of the previous frame. (Field sync is really inserted later in process but is shown here to aid understanding.) The diagonal arrows show the positions assumed by tes of packet 623 (VFIP) in the interleaver. Some of the VFIP bytes reside in the last 52 segment group before the end of the previous frame (not shown). The remaining bytes are in the first 52 segments of current frame (shown). Notice the (4) bytes 52-55, 104-107, 156-159 marked on each of the three diagonal sections at the top. These bytes are marked with legends identifying the (12) pre-coder/trellis encoders numbered 1, 2, 3, 4, 5, 6, 7, 8, 9, A, B, C (hex) that will receive these bytes when these bytes exit the interleaver, pass through the trellis intra-segment interleaver, and enter into the corresponding ones of the (12) pre-coder/trellis encoders as shown in FIG. 31.

By knowing this with 100% certainty, a deterministic trellis reset (DTR) is triggered in all of the exciters in the SFN when each one of these (12) bytes first enters its respective pre-coder/trellis encoder. This will occur in a serial fashion over (4) segments and effectively synchronizes all (12) pre-coder/trellis encoders in all exciters in a deterministic fashion.

Figure 32:
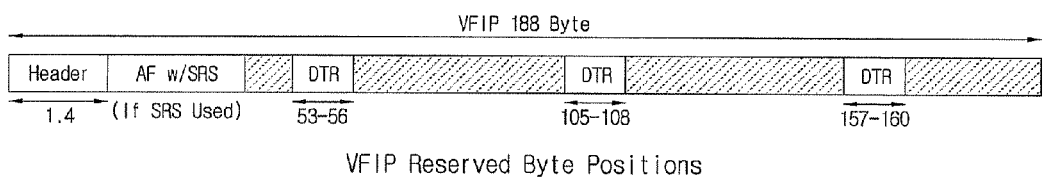
FIG. 32 shows byte positions in a VFIP used for deterministic trellis reset (DTR)

The byte positions (52-55, 104-107, 156-159) used in the VFIP for DTR are shown in FIG. 32. These map into the (12) byte positions shown previously in the interleaver in FIG. 31. Each byte used for DTR will cause a deterministic (1) byte error in the RS decoder when the VFIP is received.

With a total of 12 bytes being used, it is a fact that every VFIP will have a TS packet error because this will cause 12 byte errors which exceeds the 10 byte error correction limit of the RS decoder. The remaining unused space in the VFIP is used for syntax for the timing and control of the SFN, and will be explained next. It should be well understood that VFIP is an operational and management packet (OMP) that allows a very efficient operation of an ATSC SFN. A packet error will never occur in any packet other than the VFIP. The timing and control syntax carried in the VFIP is protected by additional RS parity, which serves two purposes. First, protecting against errors in the distribution network link to the transmitters, and second, permitting special automated test and measurement (T&M) equipment in the field to recover the payload of the VFIP for network test and measurement purposes.

The timing syntax to be added in the VFIP will allow each exciter to calculate a delay to compensate for the distribution network and to allow tight temporal control of the emission time of the coherent symbols from the antennas of all transmitters in a SFN. This controls the delay spread seen by receivers.

The efficiency of this new synchronization method is that, just by inserting a VFIP, the data frame synchronization becomes implicit. Also, all pre-coder/trellis encoders are synchronized after the first 4 segments of the VSB data frame. This all happens without any need for any syntax in the VFIP itself. This action will cause coherent symbols just by the insertion of a VFIP. To get tight control on emission timing and auxiliary transmitter control, additional syntax is added.

The following Table 3 shows VFIP syntax according to an aspect of the invention.

TABLE 3

VSB Frame Initialization Packet (VFIP) Syntax

| Syntax | # bits | identifier |
|---|---|---|
| transport_packet_header | 32 | bslbf |
| om_type | 8 | bslbf |
| section_length | 8 | uimsbf |
| sync_time_stamp | 24 | uimsbf |
| maximum_delay | 24 | uimsbf |
| network_id | 12 | uimsbf |
| om_tier_test | 4 | bslbf |
| for (i=0; i<4; i++) { | | |
|    tier_maximum_delay} | 24 | uimsbf |
| } | | |
| field_T&M | 40 | bslbf |
| for (i=0; i<20; i++) { | | |
|    tx_address | 12 | uimsbf |
|    reserved | 4 | '1111' |
|    tx_time_offset | 16 | uimsbf |
|    tx_power | 12 | uipfmsbf |
|    tx_id_level | 3 | uimsbf |
|    tx_data_inhibit | 1 | uimsbf |
| } | | |
| crc_32 | 32 | rpchof |
| for (i=0; i<n; i++) { | | |
|    stuffing_byte } | 8 | uimsbf |
| VFIP_ECC | 160 | uimsbf |

The identifiers in Table 3 have the following meanings. The identifier "bslbf" means "bit string, left bit first". The identifier "uimsbf" means "unsigned integer, most significant bit first". The identifier "uipfmsbf" means "unsigned integer plus fraction, most significant bit first". The identifier "rpchof" means "remainder polynomial coefficients, highest order first". Further details of these identifiers are omitted because they are well known in the art.

The sync_time stamp and maximum_delay syntax elements are used to compensate all of the transmitters in the SFN for the unequal or time-varying delay in the distribution network. The SFN distribution network is normally by connected by a fiber optic, microwave, or satellite link, or by a piece of coax cable if the transmitter is co-located at the studio. The tx_time_offset syntax element is used to fine tune or adjust the timing of each individual transmitter in the SFN.

Figure 33:
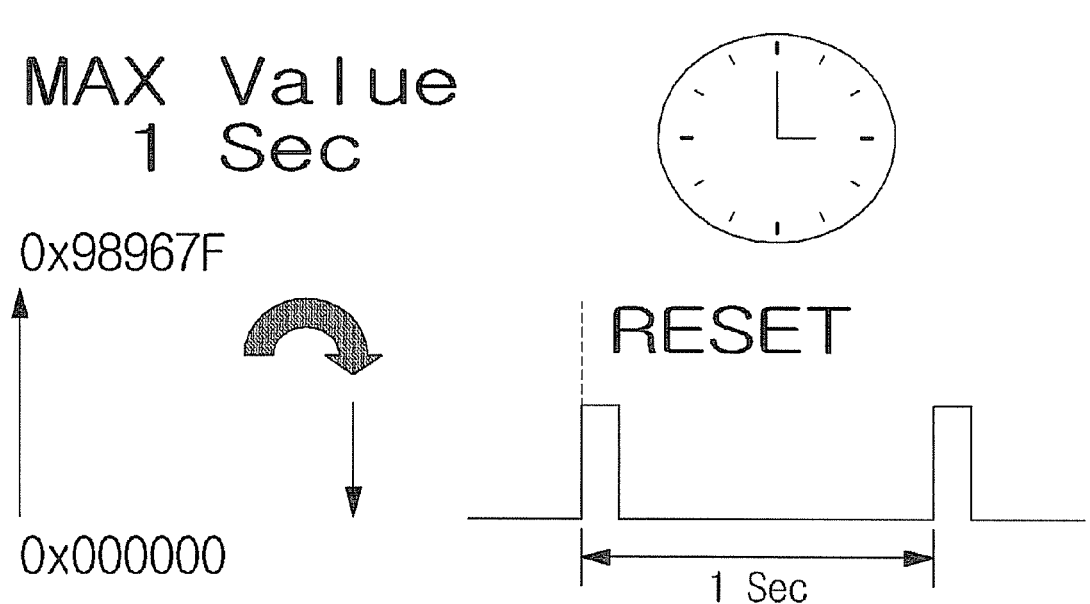
FIG. 33 conceptually shows a 1 PPS counter used in an SFN.

The emission multiplexer and all exciters in an SFN have a 1 pulse per second (PPS) reference clock and a simple 24-bit binary counter as shown in FIG. 33. This 1 PPS reference clock is used to reset the 24-bit binary counter to zero on the rising edge of the 1 PPS reference clock. The counter is clocked by a 10 MHz frequency reference and counts from 0 to 9,999,999 (0x000000 to 0x98967F hex) in one second, and then resets. This simple counter forms the basis for all time stamps used in the SFN. Note that both the sync_time_stamp and maximum_delay syntax elements have 24 bits. The emission multiplexer generates time stamps by inserting the current value of its 24-bit counter at a reference point in time. Since all counters at all nodes in the SFN are synchronized to the GPS 1 PPS reference clock, their counts are in sync and this simple time stamp mechanism works thanks to GPS.

Figure 34:
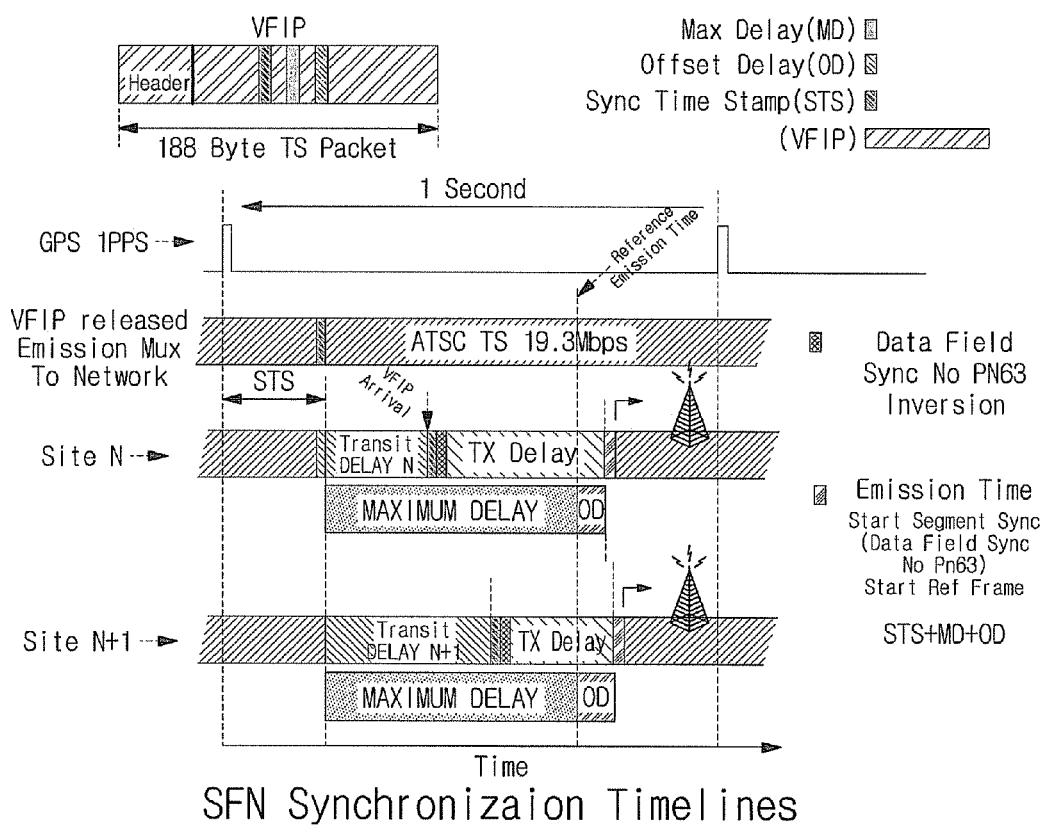
FIG. 34 shown SFN synchronization timelines showing timing syntax and semantics for an ATSC SFN.

The SFN synchronization timelines shown in FIG. 34 show the timing syntax and semantics for an ATSC SFN. The VFIP is shown with the main timing syntax elements (sync_time_stamp (STS), maximum_delay (MD), and tx_time_offset (OD)).

A brief description should add clarity to this process. The sync_time_stamp (STS) syntax element is shown and has 24 bits that carry the value of the 24-bit counter in the emission multiplexer observed at the instant that the VFIP leaves the emission multiplexer and enters the distribution network. The maximum_delay (OD) syntax element has 24 bits and indicates the delay that all transmitters will establish. The value of maximum_delay must be longer than the delay of the longest path in the distribution network. Maximum_delay is a system value entered by the network designer. The tx_time_offset (OD) syntax element gives each transmitter an individual fine tuning of delay, and is used to optimize the network. The emission time for each individual transmitter is given by STS+MD+OD=emission time.

The syntax elements listed in Table 3 above are described below.

transport_packet_header—shall conform to ISO 13818-1 systems. The PID value for VFIP shall be 0x1FFA. VFIP is a form of an operational and management packet (OMP) as defined in ATSC A/110 referred to above and as referenced in the ATSC Code Point Registry (Doc. #TSG-575r34, 18 Apr. 2006, available at www.atsc.org/standards). The payload_unit_start_indicator is not used by the VSB synchronization function and shall be set to 1. The transport priority value is not used by the VSB synchronization function and shall be set to 1. The transport scrambling control value shall be set to 00 (not scrambled). The adaptation_field_control value shall be set to 01 (payload only). When SRS is carried in the adaptation field, the value shall be set to 11 (adaptation field followed by payload). If the maximum 28 bytes is used for SRS (2 bytes for the adaptation field header and 26 bytes for the SRS pattern data), this limits the maximum number of transmitters addressable with one VFIP to 15 in the worst case.

om_type—value shall be set to 0x20, or shall have a value in a range of 0x20-0x2F and be assigned in sequence starting with 0x20. Each VFIP can address up (20) transmitters. This allows each broadcaster a maximum of 320 (high, medium, low) power transmitters including translator stations that can be addressed with the VFIP syntax.

section_length—The section_length specifies the number of bytes following immediately after the section_length field until, and including, the last byte of the crc_32, but not including any stuffing bytes or the VFIP_ECC.

sync_time_stamp—The sync_time_stamp of the VFIP contains the time differne, expressed as a number of 100-ns intervals, between the latest pulse of the 1 PPS reference clock (derived, e.g., from GPS) the instant the VFIP is transmitted into the distribution network.

maximum_delay—The maximum_delay value shall be larger than the longest delay path in the distribution network. The unit is 100 ns and the range of the maximum_delay value is 0x000000 to 0x98967F, which equals a maximum_delay of 1 s.

network_id—A 12-bit unsigned integer field representing the network in which the transmitter is located that provides a seed value for 12 of the 24 bits used to set the symbol sequence of a unique code assigned to each transmitter. All transmitters within a network shall use the same 12-bit pattern.

om_tier_test—A 4-bit field indicating whether a control channel for automated testing and measurement equipment (a T&M channel) is active, and how many tiers of DTV translators are used in the SFN. The leftmost bit indicates whether the T&M channel is active, with (1) indicating that the T&M channel is active and (1) indicating that the T&M channel is inactive. The last three bits indicate the number of tiers of DTV translators in the SFN, with (000) indicating no DTV translators, (001) indicating one tier of DTV translators, (010) indicating two tiers of DTV translators, (011) indicating three tiers of DTV translators, and (100) indicating four tiers of DTV translators.

tier_maximum_delay—The maximum_delay value shall be larger than the longest delay path in the distribution network. The unit is 100 ns and the range of the maximum_delay value is 0x00000 to 0x98967F, which equals a maximum_delay of 1 s.

field_T&M—signaling channel to be determined (TBD) to control remote field T&M and monitoring equipment that is envisioned for the maintenance and operation of an SFN.

tx_address—A 12-bit unsigned integer field that carries the address of the transmitter to which the following fields are relevant and which shall be used to seed a portion of the RF watermark code sequence generator, can also be transmitter in tier of translator SFN.

tx_time_offset—A 16-bit signed integer field that indicates the time offset value, measured in 100-ns intervals, allows for option to fine adjust emission time of each individual transmitter to optimize network timing.

tx_power—A 12-bit unsigned integer plus fraction that indicates the power level to which the transmitter to which it is addressed should be set. The most significant 8 bits indicate the power in integer dBs relative to 0 dBm, and the least significant 4 bits indicate the power in fractions of a dB. When set to zero, tx_power shall indicate that the transmitter to which the value is addressed is not currently operating in the network.

tx_id_level—A 3-bit unsigned integer field that indicates to which of 8 levels (including off) an RF watermark signal of each transmitter shall be set.

tx_data_inhibit—A 1-bit field that indicates when the tx_data information should not be encoded into the RF watermark signal.

crc_32—A 32-bit field that contains a CRC value that gives a zero output of registers in a 32-bit CRC decoder after processing all of the bytes in the VFIP, excluding the stuffing bytes and VFIP_ECC bytes.

stuffing_byte—Each stuffing_byte has a value of 0xFF.

VFIP_ECC—A 160-bit unsigned integer field that carries 20 bytes worth of Reed-Solomon error correcting code used to protect the remaining 164 payload bytes of the packet The exciter must have a means of accepting a transmitter and antenna delay (TAD) value, which is a 16-bit value representing a number of 100-ns intervals. The TAD value shall include the total delay from the system point at which the transmitter output timing is measured and controlled to the output of the antenna. The value is entered at commissioning of the transmitter site by an engineer who has calculated the exact delay to allow the most accuracy in control of designed delay spread seen by receivers. TAD compensation shall be performed through a calculation carried out by the transmitter using a fixed value of TAD determined for that transmitter.

Turbo stream is another element of the A-VSB system. The turbo stream according to an aspect of the invention offers a robust bit stream that is independent of the standard normal stream. The turbo stream is thus operational in a backward compatible manner with the standard normal stream. The turbo stream has to be sufficiently tolerant of severe signal distortion to support other broadcasting applications. The robust performance of the turbo stream is achieved by additional forward error correction and an outer interleaver at the cost of some TS rate loss. Apart from an improvement over the low SNR of the standard normal stream, the turbo stream offers an additional advantage of time diversity that is provided by the outer interleaver.

Figure 35:
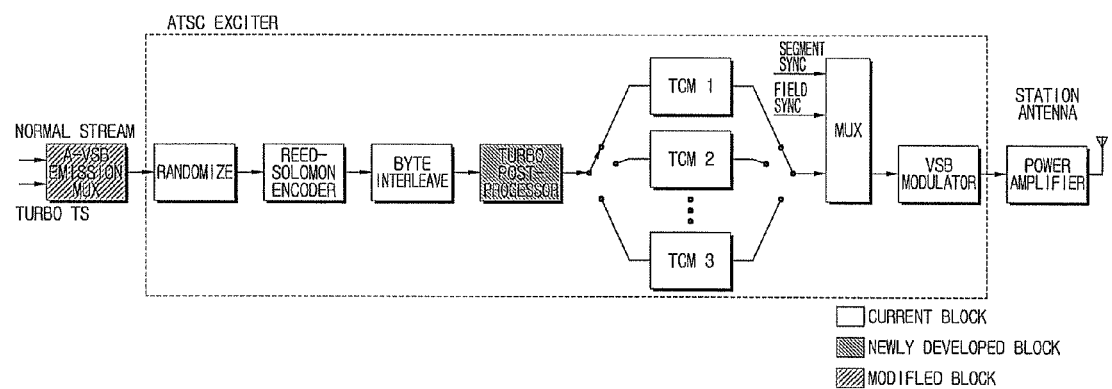
FIG. 35 shows a block diagram of an ATSC DTV transmitter modified for use with a turbo stream according to an aspect of the invention.

The ATSC DTV exciter is modified as shown in FIG. 35 to enable the turbo stream. An A-VSB emission multiplexer (MUX) receives a normal stream and another TS stream (a turbo stream). Then the ATSC emission multiplexer assembles deterministic frames (DF) for turbo stream. In a selected DF, the emission multiplexer inserts the required placeholders for turbo data, which serve as containers for redundant bits to be generated by the outer encoder in the turbo post-processor.

In the exciter, packets in the frames are randomized and then encoded in the (207, 187) Reed-Solomon code. After byte interleaving, they are manipulated in the turbo processor. After being processed in the ⅔ rate TCM encoder block, they are then combined with data field sync and segment sync symbols to form a VSB frame.

Figure 36:
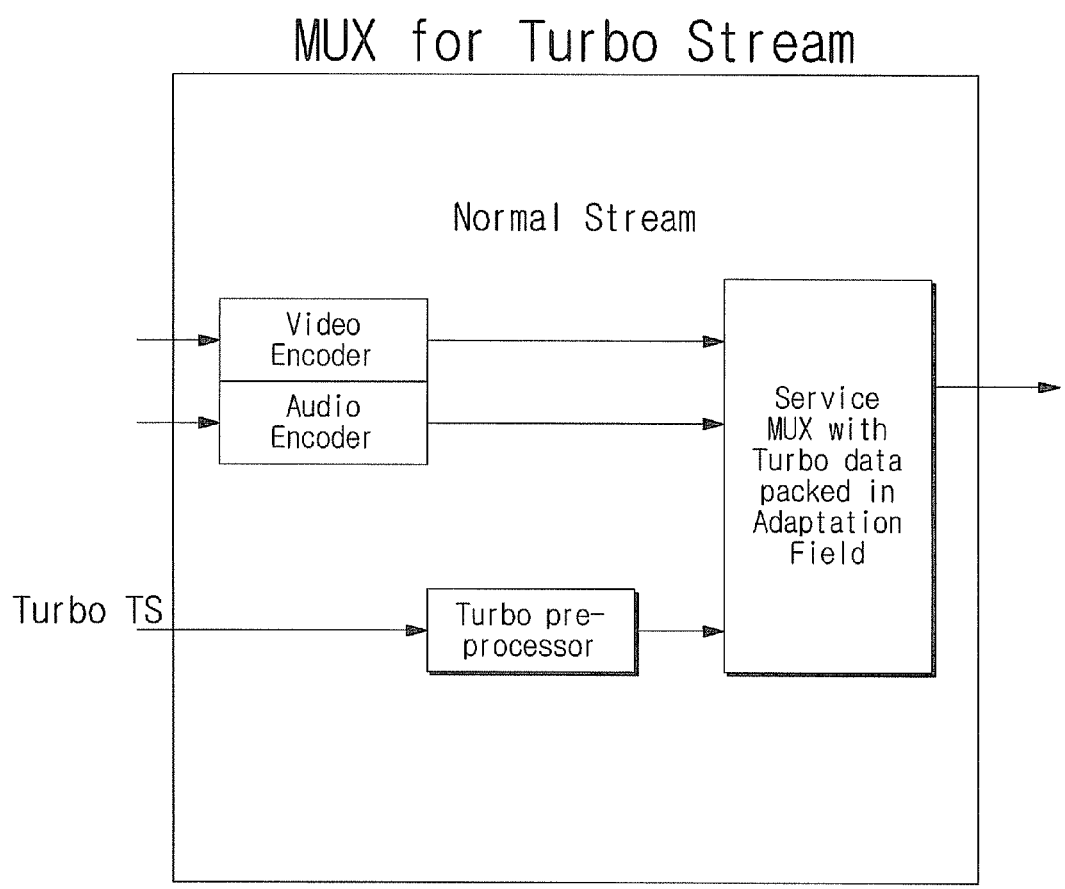
FIG. 36 shows a block diagram of the ATSC emission multiplexer (MUX) for use with a turbo stream in the turbo-modified ATSC DTV transmitter in FIG. 35 according to an aspect of the invention.
Figure 37:
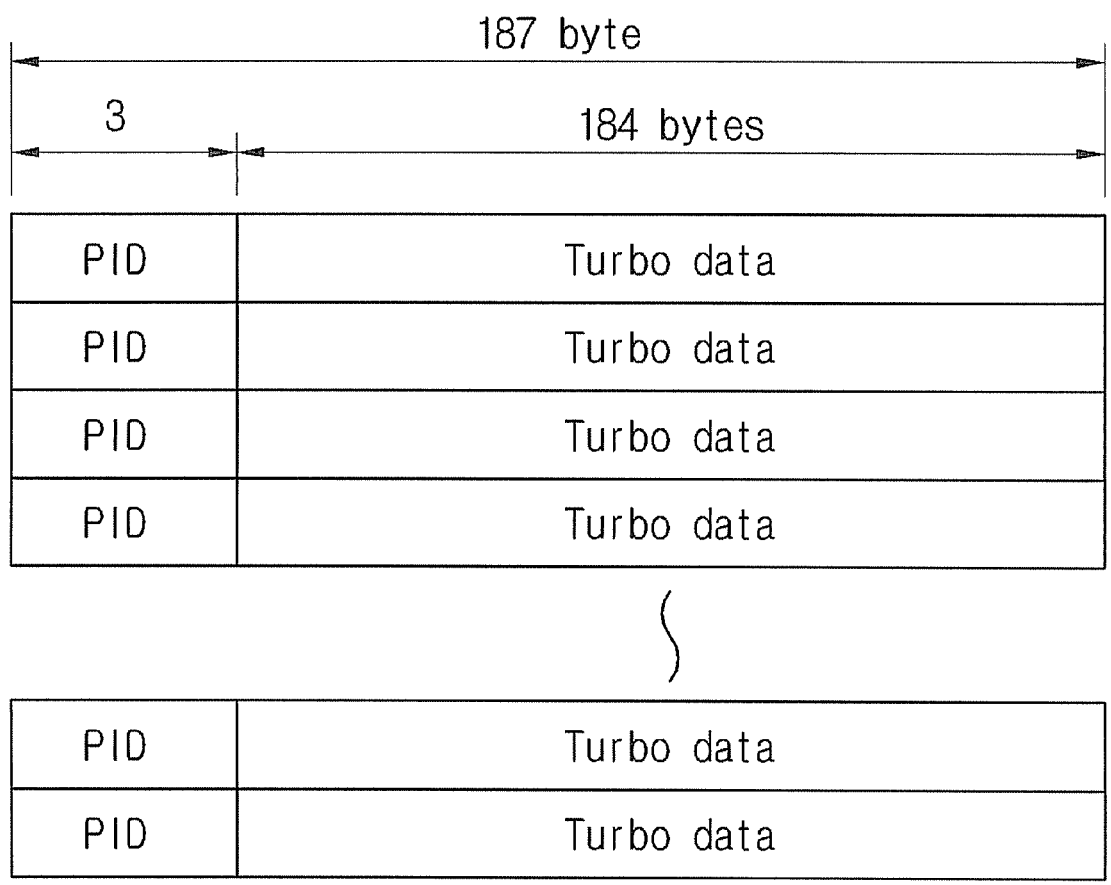
FIG. 37 shows a turbo transport stream input to the turbo pre-processor in FIG. 36 according to an aspect of the invention.

In the ATSC emission multiplexer, a turbo stream pre-processing is carried out. This is shown in FIG. 36. The emission multiplexer accepts turbo TS packets, which have no sync byte (a packet of 187 bytes). The turbo TS packets are pre-processed before being fed to a service multiplexer that generates deterministic frames. FIG. 37 shows an example of a turbo transport stream according to an aspect of the invention. Since the turbo stream is only visible to an A-VSB receiver, the turbo transport stream can be not only a standard MPEG-2 TS but also an advanced codec stream or other like stream in other aspects of the invention.

Figure 38:
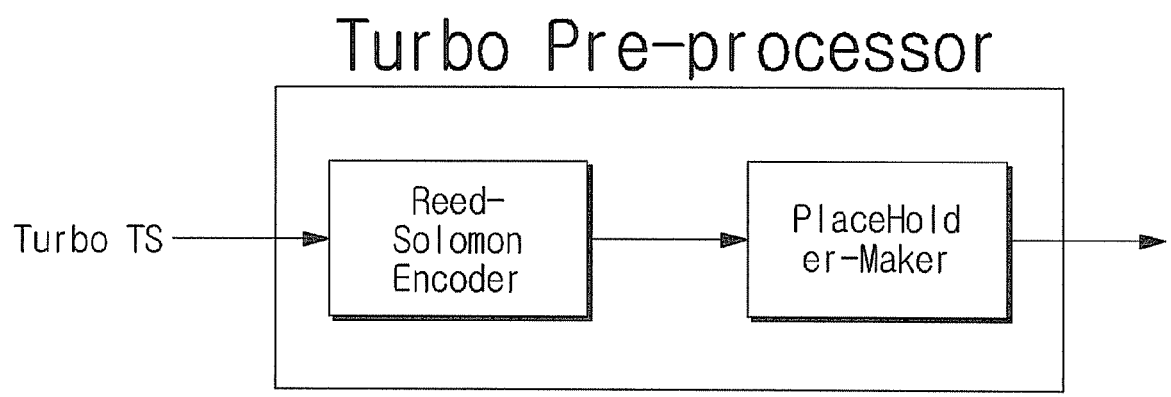
FIG. 38 shows a block diagram of the turbo pre-processor in FIG. 36 according to an aspect of the invention.
Figure 39:
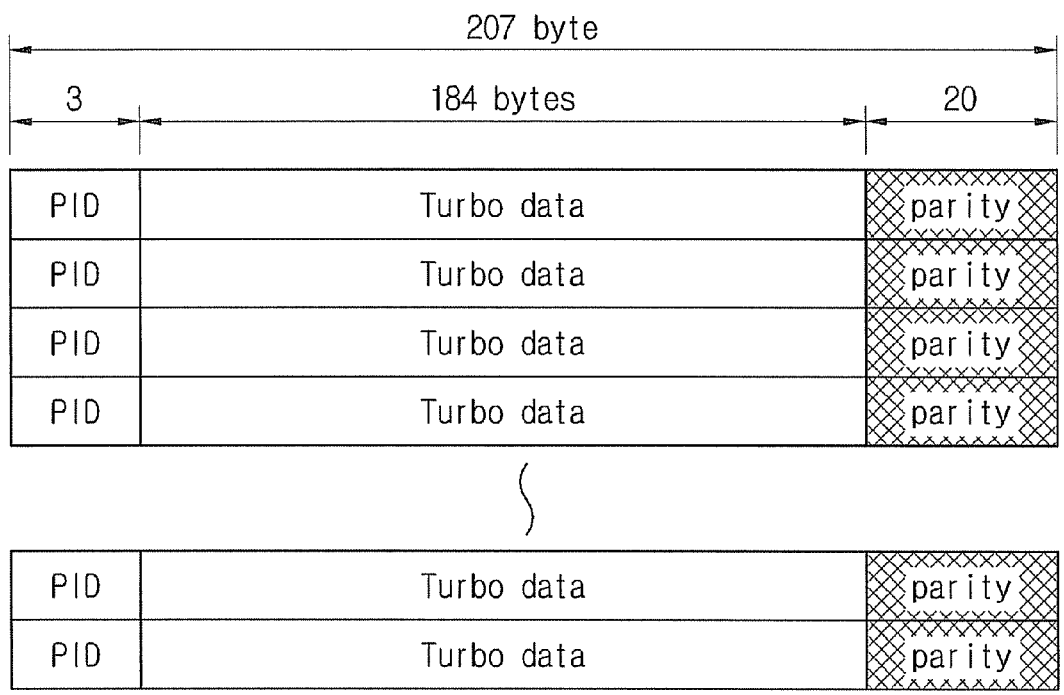
FIG. 39 shows a turbo transport stream with parity added by the Reed-Solomon (RS) encoder in the turbo pre-processor in FIG. 38 according to an aspect of the invention.
Figure 40:
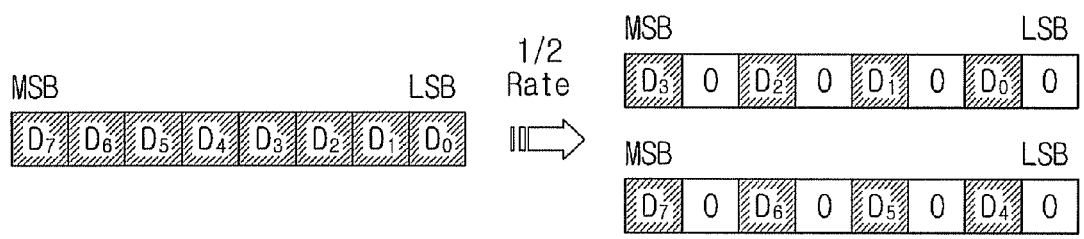
FIG. 40 shows an expansion of one byte to two bytes performed on the turbo transport stream with parity by the placeholder-maker in the turbo pre-processor in FIG. 38 in a ½ rate encoding mode according to an aspect of the invention.

The turbo pre-processor block is detailed in FIG. 38. The turbo stream is RS encoded and 20 bytes of (207, 187) RS parity are attached to each turbo TS packet. FIG. 39 shows the outputs of the (207, 187) RS encoder. Then, the placeholder-maker in the turbo pre-processor inserts required placeholders by expanding byte by te. How to insert placeholders depends on the turbo stream rate. When ½ rate encoding is in use, one byte is expanded to 2 bytes as shown in FIG. 40.

Figure 41:
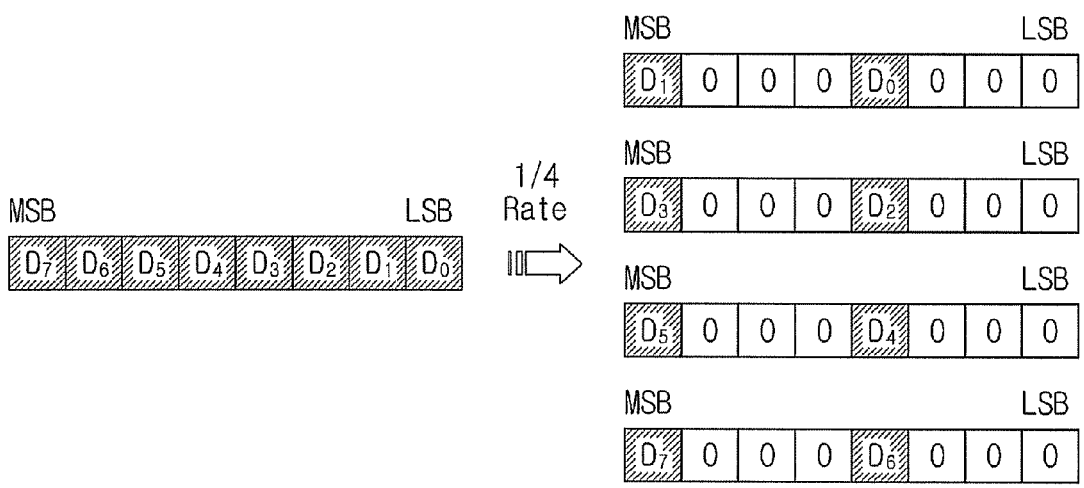
FIG. 41 shows an expansion of one byte to four bytes performed on the turbo transport stream with parity by the placeholder-maker in the turbo pre-processor in FIG. 38 in a ¼ rate encoding mode according to an aspect of the invention.
Figure 42:
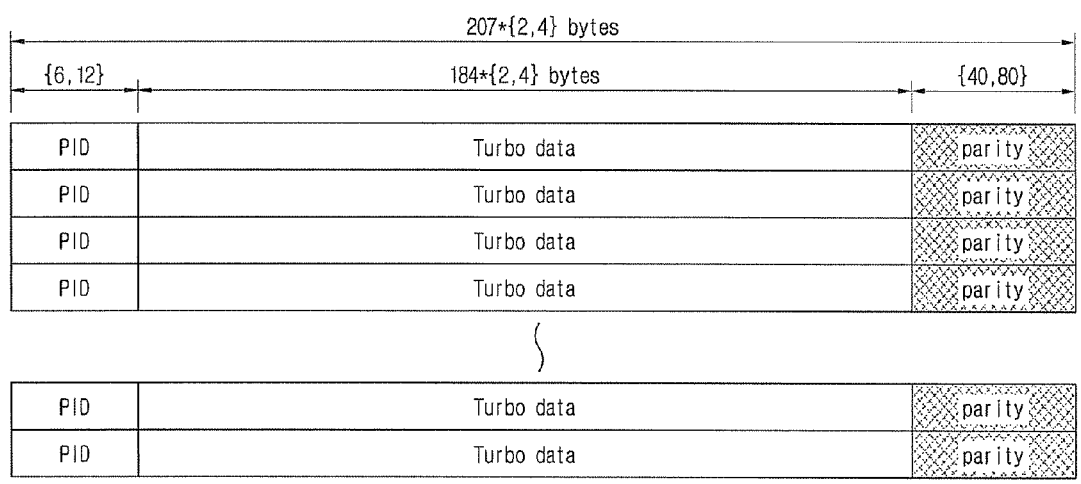
FIG. 42 shows an expanded turbo transport stream output from the turbo preprocessor in FIG. 38 according to an aspect of the invention.

When ¼ rate coding is in use, one bye is expanded to 4 bytes as shown in FIG. 41. The outputs of the turbo pre-processor are shown in FIG. 42.

Figure 43:
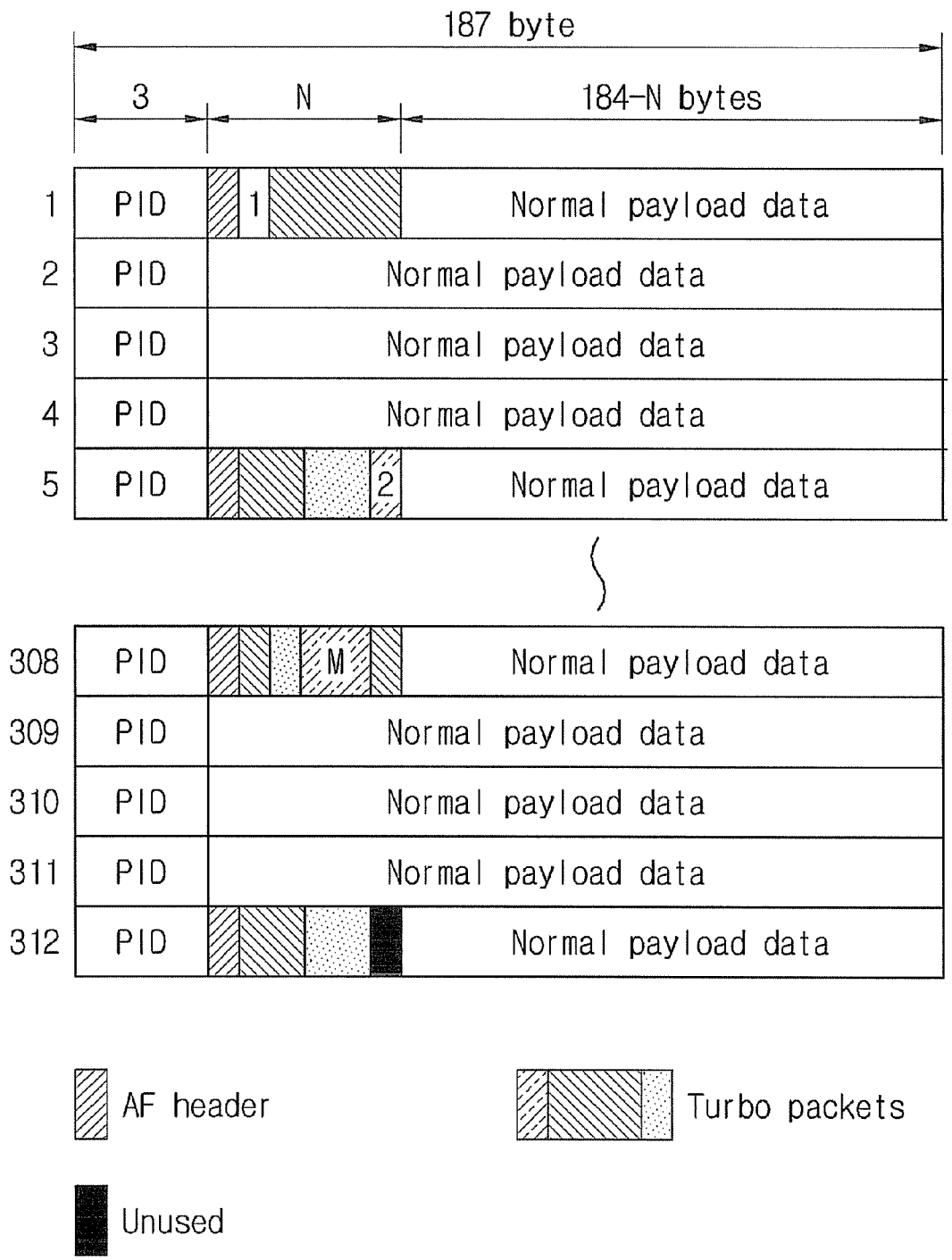
FIG. 43 shows a transport stream carrying turbo data that is input to the randomizer in the turbo-modified ATSC DTV transmitter in FIG. 35 according to an aspect of the invention.

Next, the turbo stream service multiplexer inserts the pre-processed turbo TS packets into stuffing areas in adaptation fields of the deterministic frames. Consequently, a turbo TS packet has to be cut (if necessary, at several places) to fit it into these areas. The outputs of the emission multiplexer are shown in FIG. 43. The number of turbo TS packets accommodated in one field varies depending on the turbo stream mode.

Similar to the DF for SRS, several pieces of information such as PCR and splice counter have to be delivered in the adaptation field along with the turbo stream to be compatible with the MPEG-2 standard. So PCR and splice counter positions are fixed at the 15th and 19th packets in a slice like the case of SRS DF.

FIG. 50 shows one slice (52 segments) of a deterministic frame (DF) template for use with turbo stream mode 2 or 4 according to an aspect of the invention. Turbo TS packets are carried in every 4th packet. In FIG. 50, PCR and splice counter positions are shown in the 15th and 19th packets of a slice.

There are (7) modes defined by an outer encoder code rate and an adaptation field length. The combination of these two parameters is confined to (2) code rates {½, ¼} and (3) adaptation field lengths {86, 128, 384 bytes} in the A-VSB system. This will result in (6) effective turbo data rates. In mode 0, turbo stream is switched off. This is summarized in the following Table 4.

TS packets. The frame structure in turbo stream mode 2 is shown in FIG. 50.

FIG. 51 shows one slice (52 segments) of a deterministic frame (DF) template for use with turbo stream mode 5 or 6 according to an aspect of the invention. In FIG. 51, PCR and splice counter positions are shown in the 15th and 19th packets of a slice. In turbo stream mode 5 or 6, since turbo data per each set of 4 normal packets is 384 bytes (184 bytes*2+16 bytes), two normal packets are entirely dedicated for carrying turbo data. In that case, a null packet is used instead of a normal packet. By using a null packet, the 2 bytes of AF header space that would be required in a normal packet can also carry turbo data. In this way, 184*2 bytes of turbo data are carried in two null packets and the other 16 bytes of turbo data are carried in the AF of the following normal packet as shown in FIG. 51.

The selected turbo stream mode has to be signaled to the exciter and to the receiver by the signaling scheme described below in the section entitled "A-VSB Mode Signaling Scheme".

Figure 44:
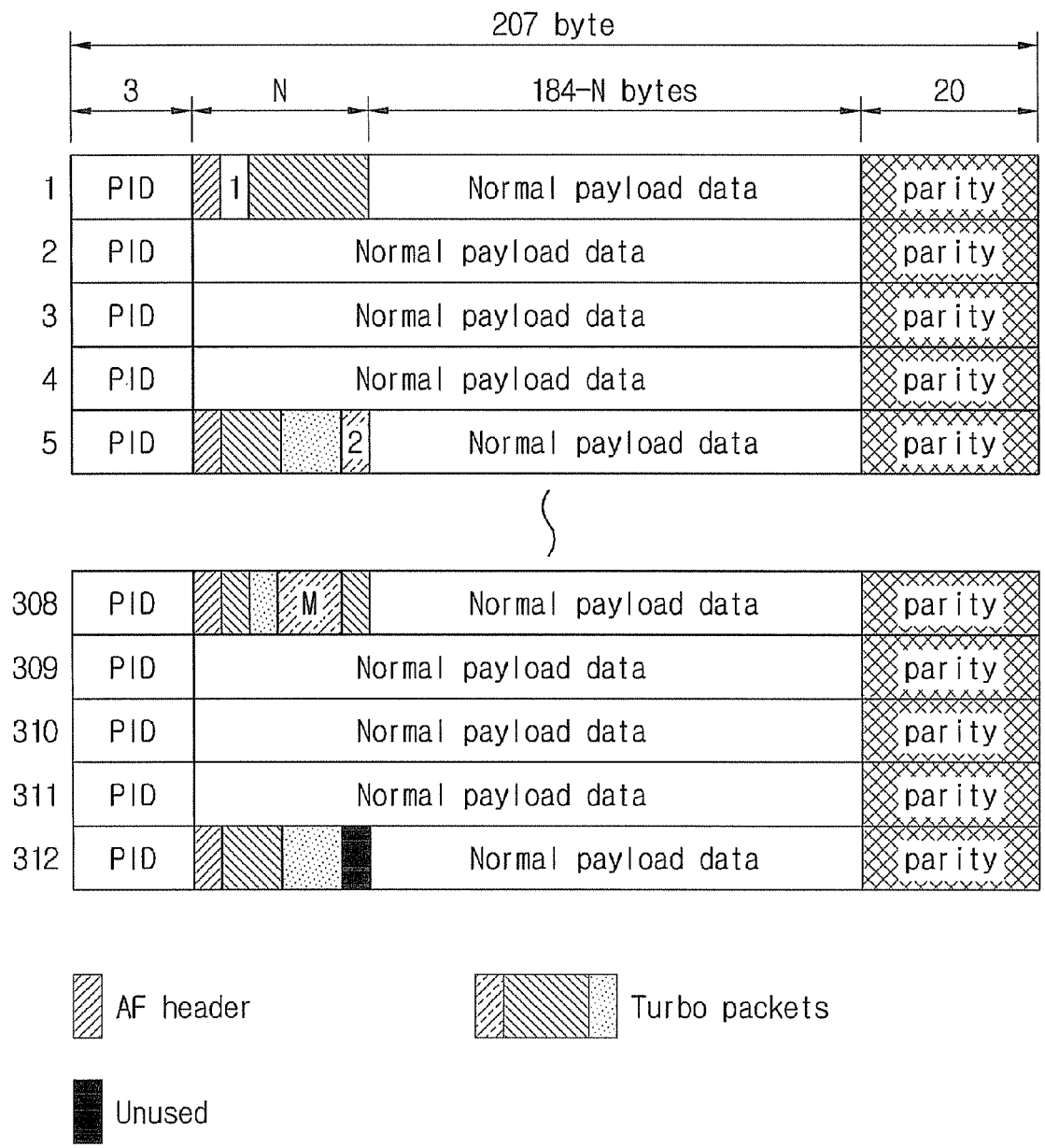
FIG. 44 shows a transport stream carrying turbo data with parity added by the ReedSolomon (RS) encoder in the turbo-modified ATSC DTV transmitter in FIG. 35 according to an aspect of the invention.

A randomized transport stream carrying turbo data is then fed to the RS encoder in FIG. 35. The output of the RS encoder is shown in FIG. 44, which is a just parity-attached version of turbo data-carrying transport stream. The next block, the byte interleaver, spreads this stream byte by te. The spread transport stream is input to the turbo post-processor.

Basically, the turbo post-processor touches only turbo data bytes. Turbo data is extracted in the turbo data extractor. Placeholders in a turbo data byte are filled with redundancy

TABLE 4

Turbo Stream Modes

| | Stream Mode | | | | | | |
|---|---|---|---|---|---|---|---|
| | 0 | 1 | 2 | 3 | 4 | 5 | 6 |
| Turbo Data Bytes (N-2) Per 4 Segments | 0 | 86 | 128 | 86 | 128 | 384 | 384 |
| Turbo Data Bytes Per Field | 0 | 6708 | 9984 | 6708 | 9984 | 29952 | 29952 |
| Turbo Packets Per Field | 0 | 8 | 12 | 16 | 24 | 36 | 72 |
| Used Turbo Data Bytes Per Field | 0 | 6624 | 9936 | 6624 | 9936 | 29808 | 29808 |
| Unused Turbo Bytes Per Field | 0 | 84 | 48 | 84 | 48 | 144 | 144 |
| Code Rate | | 1/4 | 1/4 | 1/2 | 1/2 | 1/4 | 1/2 |
| Normal TS Loss (Mbps) | 0 | 2.19 | 3.30 | 2.19 | 3.30 | 9.88 | 9.88 |
| Turbo TS Rate (Mbps) | 0 | 0.5 | 0.75 | 0.99 | 1.49 | 2.24 | 4.47 |
| Turbo Processing Block (Bits) | 0 | 8944 | 13312 | 8944 | 13312 | {13312, 39936} | {13312, 39936} |

A chunk of a truncated turbo packet is called turbo data. In Table 4, turbo data bytes per field means the space reserved for turbo data in the 312 normal packets (one field). The starting point of a turbo packet will be synchronized to the first byte in the turbo data area in a field. The number of accommodated turbo packets in a field is turbo packets per field in Table 4. Since the number doesn't fit exactly the entire turbo data area, there are some residual bytes (marked "unused" in FIG. 43) at the end. These unused bytes are filled with stuffing bytes in an aspect of the invention.

Figure 45:
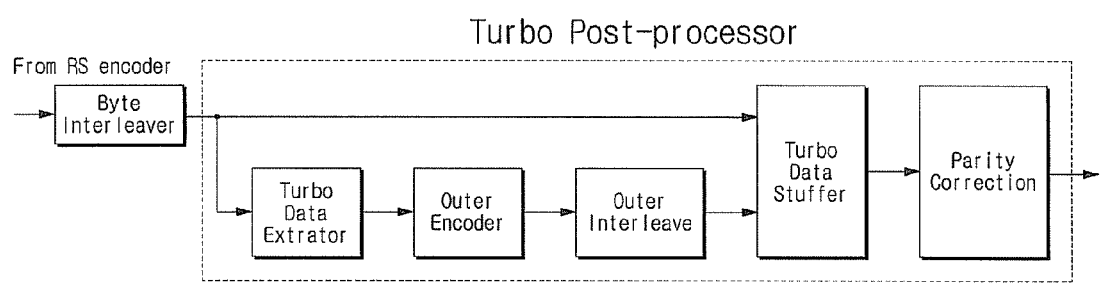
FIG. 45 shows a block diagram of the turbo post-processor in the turbo-modified ATSC DTV transmitter in FIG. 35 according to an aspect of the invention.

For example, in turbo stream mode 2, turbo data per field has 128*312/4=9984 bytes. Since 9984 bytes=12 packets* (207*4) bytes+48 residual bytes, this accommodates 12 turbo bits added by the outer encoder and turbo data is interleaved in the outer interleaver bit by bit as shown in FIG. 45. The turbo data stuffer puts the processed turbo data in place.

Since the turbo data placeholders are filled here, the RS parity bytes attached in the previous block are no longer correct. These incorrect parity bytes are corrected in the parity correction block after the turbo data stuffer in FIG. 45.

An example of the turbo data extractor shown in FIG. 45 gets turbo data from byte-interleaved packets. The amount of the extracted turbo data is the turbo post-processing block size. This block size is specified in bits in Table 4. For example, the block size in turbo stream modes 1 and 3 is 8944 bits. Consequently, the outer interleaver length is also 8944 bits. The block size in turbo stream modes 2 and 4 is 13312 bits. Consequently, the outer interleaver length is also 13312 bits. The block size in turbo stream modes 5 and 6 is {13312, 39936} bits, which means that the block size is 39936 bits, and the outer interleaver length can be either 39936 bits, or can be 13312 bits repeated three times, since 39936/13312=3. That is, an outer interleaver having an outer interleaver length of 39936 can be implemented by three outer interleavers in sequence each having an outer interleaver length of 13312 bits.

Figure 46:
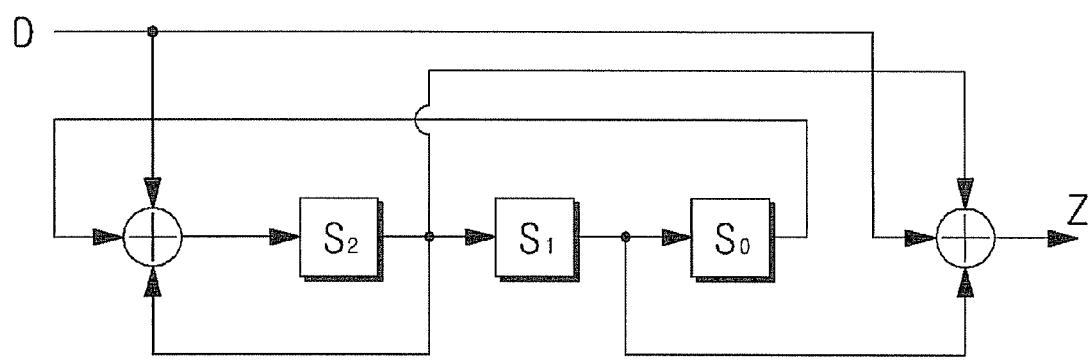
FIG. 46 shows a block diagram of the outer encoder in the turbo post-processor in FIG. 45 according to an aspect of the invention.
Figure 47:
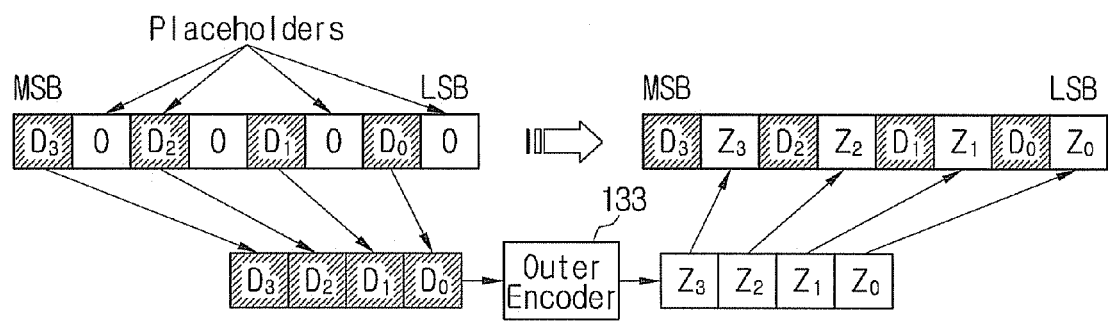
FIG. 47 shows inputs and outputs of the outer encoder in FIGS. 45 and 46 in a ½ -rate encoding mode according to an aspect of the invention.
Figure 48:
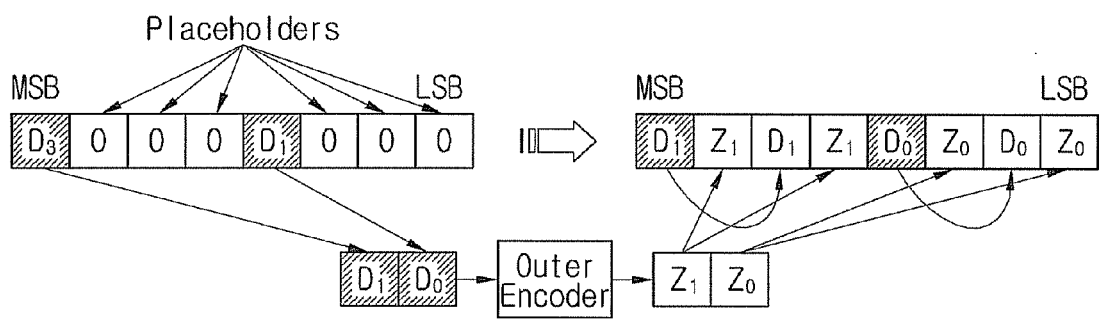
FIG. 48 shows inputs and outputs of the outer encoder in FIGS. 45 and 46 in a ¼ -rate encoding mode according to an aspect of the invention.

An example of the outer encoder used in the turbo processor is depicted in FIG. 46. The outer encoder receives 1 bit (D) and produces 1 bit (Z) in both the ½ rate and ¼ rate modes. The difference between two modes is the manner in which the input bytes having placeholders are treated to generate output bytes. This is clearly explained in FIGS. 47 and 48. In the ½ rate mode, (4) bits ($D_3$, $D_2$, $D_1$, $D_0$) per byte are fed to the outer encoder, while in the ¼ rate mode, (2) bits ($D_1$, $D_0$) per byte are fed to the outer encoder.

At the beginning of a new block, the outer encoder state is set to 0. No trellis-terminating bits are appended at the end of a block. Since the block size is relatively long, the error-correction capability is not deteriorated very much. Possible residual errors are corrected by the high-layer forward error correction (FEC) (RS code) in the turbo pre-processor.

The outer interleaver scrambles the outer encoder output bits. The bit interleaving rule is defined by a linear congruence expression as follows $$\Pi(i)=(P \cdot i + D_{i \bmod 4}) \bmod L$$

For a given interleaving length (L), this interleaving rule has 5 parameters (P, $D_0$, $D_1$, $D_2$, $D_3$) which are defined in the following Table 5.

TABLE 5

Interleaving Rule Parameters

| L | P | $D_0$ | $D_1$ | $D_2$ | $D_3$ |
|---|---|---|---|---|---|
| 8944 | 45 | 0 | 0 | 2700 | 7376 |
| 13312 | 81 | 0 | 0 | 2916 | 12948 |

Each turbo stream mode specifies the interleaving length (L) as shown in Table 4, where the interleaving length (L) is equal to the turbo processing block size. For example, and without limitation thereto, the interleaving length L=13312 is used in turbo stream mode 2. This length corresponds to turbo data symbols within 52 normal packets. Thus, the turbo data extractor in turbo stream mode 2 collects turbo data in 52 normal packets and the outer encoder fills the placeholders. Finally, the outer interleaver takes turbo data to scramble. The interleaving rule {Π(0), Π(1), . . . Π(L−1)} is generated as follows in accordance with Table 5:

$$\Pi(i) = \begin{cases} (81 \cdot i) \bmod 13312 & i \bmod 4 = 0,1 \\ (81 \cdot i + 2916) \bmod 13312 & i \bmod 4 = 2 \\ (81 \cdot i + 12948) \bmod 13312 & i \bmod 4 = 3 \end{cases}$$

Figure 49:
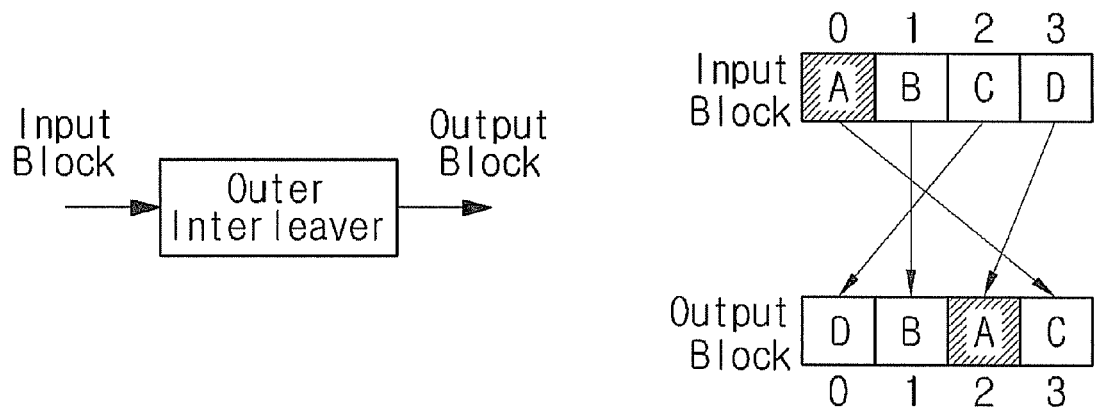
FIG. 49 shows a graphical explanation of a bit interleaving rule for an interleaving length of 4 used by the outer interleaver in the turbo post-processor in FIG. 45 according to an aspect of the invention.

An interleaving rule is Π(i) interpreted as "the Π(i)-th bit in the block is placed in the i-th bit position after interleaving". FIG. 49 explains an interleaving rule of length 4 by way of example. After bit interleaving, the turbo data are stuffed in the AF of the 52 normal packets by the turbo data stuffer.

SRS and turbo stream can also be used together by inserting SRS pattern bytes into the adaptation field of every normal transport packet, and also inserting turbo data into the adaptation fields of at least some normal transport packets. Depending on the turbo stream mode being used, a normal transport packet may carry SRS pattern bytes, turbo data, and normal data, or may carry SRS pattern bytes and normal data but no turbo data, or may carry SRS pattern bytes and turbo data but no normal data.

FIG. 52 shows one slice (52 segments) of a deterministic frame template for use with both SRS and turbo stream mode 2 or 4 according to an aspect of the invention that is a combination of the deterministic frame template for use with SRS shown in FIG. 21, and the deterministic frame template for use with turbo stream mode 2 or 4 shown in FIG. 50. In turbo stream mode 2 or 4, turbo data per each set of 4 normal packets is 128 bytes. Thus, the first normal packet in each set of 4 normal packets carries 128 bytes of turbo data and 54-{10, 20, 26} bytes of normal data, and the second, third, and fourth normal packets in each set of 4 normal packets each carry 182-{10, 20, 26} bytes of normal data, where {10, 20, 26} indicates the number of bytes of SRS pattern data that are being used, i.e., 10, 20, or 26 bytes.

Thus, if 10 bytes of SRS pattern data are being used, the first normal packet carries 128 bytes of turbo data and 54-10=44 bytes of normal data, and the second, third, and fourth normal packets each carry 182-10=172 bytes of normal data. If 20 bytes of SRS pattern data are being used, the first normal packet carries 128 bytes of turbo data and 54-20=34 bytes of normal data, and the second, third, and fourth normal packets each carry 182-20=162 bytes of normal data. If 26 bytes of SRS pattern data are being used, the first normal packet carries 128 bytes of turbo data and 54-26=28 bytes of normal data, and the second, third, and fourth normal packets each carry 182-26=156 bytes of normal data.

FIG. 53 shows one slice (52 segments) of a deterministic frame template for use with both SRS and turbo stream mode 5 or 6 according to an aspect of the invention that is a combination of the deterministic frame template for use with SRS shown in FIG. 21, and the deterministic frame template for use with turbo stream mode 5 or 6 shown in FIG. 51. In turbo stream mode 5 or 6, turbo data per each set of 4 normal packets is 384 bytes. Thus, the first and second normal packets in each set of 4 normal packets each carry 182-{10, 20, 26} bytes of turbo data, the third normal packet in each set of 4 normal packets carries 20+2*{10, 20, 26} bytes of turbo data and 162-3*{10, 20, 26} of normal data, and the fourth normal packet in each set of 4 normal packets carries 182-{10, 20, 26} bytes of normal data, where {10, 20, 26} indicates the number of bytes of SRS pattern data that are being used, i.e., 10, 20, or 26 bytes.

Thus, if 10 bytes of SRS pattern data are being used, the first and second normal packets each carry 182-10=172 bytes of turbo data, the third normal packet carries 20+2*10=40 bytes of turbo data and 162-3*10=132 bytes of normal data, and the fourth normal packet carries 182-10=172 bytes of normal data. If 20 bytes of SRS pattern data are being used, the first and second normal packets each carry 182-20=162 bytes of turbo data, the third normal packet carries 20+2*20=60 bytes of turbo data and 162-3*20=102 bytes of normal data, and the fourth normal packet carries 182-20=162 bytes of normal data. If 26 bytes of SRS pattern data are being used, the first and second normal packets each carry 182-26=156 bytes of turbo data, the third normal packet carries 20+2*26=72 bytes of turbo data and 162-3*26=84 bytes of normal data, and the fourth normal packet carries 182-26=156 bytes of normal data.

A-VSB Mode Signaling Scheme

The SRS and turbo stream features described above assume that each mode is known to an A-VSB receiver. The A-VSB mode signaling scheme fulfills this task.

Figure 54:
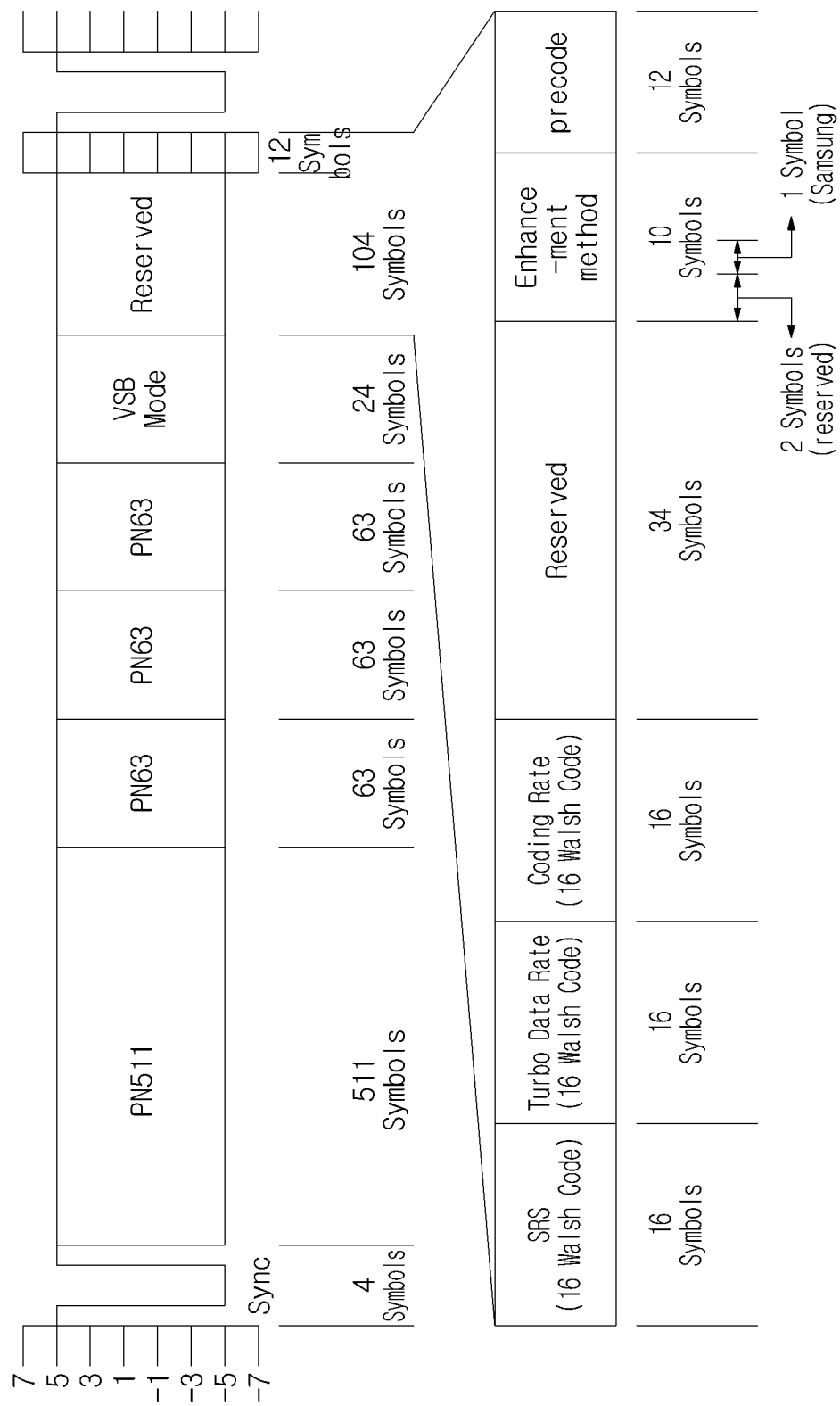
FIG. 54 shows an A-VSB mode signaling bit structure used in an A-VSB mode signaling scheme according to an aspect of the invention.

A mode signaling standard will now be described. Information about the current mode is transmitted in 104 reserved symbols of each data field sync segment. Specifically, as shown in FIG. 54, symbols 1 through 48 of the 104 reserved symbols are allocated for transmitting information about SRS and turbo stream modes, symbols 49 through 82 are reserved, symbols 83 and 84 are reserved, and symbols 85 through 92 are allocated for enhanced data transmission methods. In even data fields, the polarities of symbols 83 through 92 shall be inverted from the polarities of symbols 83 through 92 in odd data fields. Symbols 93 through 102 are allocated for precode. However, it is understood that other allocations can be used in other aspects of the invention.

For more information, refer to "Working Draft Amendment 2 to ATSC Digital Television Standard (A/53C) with Amendment 1 and Corrigendum 1" referred to above which is incorporated herein by reference in its entirety.

An A-VSB mode signaling bit structure will now be described. Walsh codes of (16) bits are used in the data field sync segment to distinguish between different SRS and turbo stream modes. The first (16) bit slots specify an SRS mode. The second and third (16) bit slots specify turbo stream modes, where the second (16) bit slots specify a turbo stream data rate and the third (16) bit slots specify a coding rate. The (34) bits are reserved for future use. The AVSB mode signaling bit structure is summarized in FIG. 54. Examples of the Walsh codes of (16) bits are shown in FIG. 55, wherein the "Modulation Symbol Index" is the Walsh code number (#), and the "Walsh Chip within Symbol" is the individual elements of the Walsh codes. However, it is understood that other A-VSB mode signaling bit structures can be used in other aspects of the invention.

Examples of mappings between Walsh codes and A-VSB modes are as follows.

An example of a mapping between numbers of SRS pattern bytes per packet and Walsh codes of (16) bits is shown in the following Table 6:

TABLE 6

Mapping of SRS-n

| SRS Pattern Bytes Per Packet | Walsh Code # Used |
|---|---|
| 0 | 1 |
| 10 | 3 |
| 20 | 6 |
| 26 | 14 |

The unused Walsh codes of (16) bits are reserved for other numbers of SRS pattern bytes per packet which can be used in other aspects of the invention. However, it is understood that mappings other than that shown in Table 6 can be used in other aspects of the invention.

An example of a mapping between turbo data rates and Walsh codes of (16) bits is shown in the following Table 7:

TABLE 7

Mapping of Turbo Data Rate

| Turbo Data Mix Ratio | Turbo Data Bytes Per 4 Segments | Turbo Data Rate 1/2 Coding | Turbo Data Rate 1/4 Coding | Used Walsh Code # |
|---|---|---|---|---|
| 0 | 0 | — | — | 3 |
| 10.27% | 86 | 0.99 (16 Packet) | 0.5 (8 Packet) | 4 |
| 15.46% | 128 | 1.49 (24 Packet) | 0.75 (12 Packet) | 9 |
| 46.26% | 384 | 4.47 (72 Packet) | 2.24 (36 Packet) | 12 |

The unused Walsh codes of (16) bits are reserved for other turbo data rates which can be used in other aspects of the invention. However, it is understood that mappings other than that shown in Table 7 can be used in other aspects of the invention.

If necessary, the turbo data mix ratio shown in Table 7 can be increased to 100% in the future.

An example of a mapping between coding rates and support of multiple turbo streams and Walsh codes of (16) bits is shown in the following Table 8:

TABLE 8

Mapping of Other Parameters

| Item | Walsh Code # Used |
|---|---|
| # of Turbo Streams 0 | 2 |
| # of Turbo Streams 1, Coding Rate 1/2 | 5 |
| # of Turbo Streams 1, Coding Rate 1/4 | 7 |
| # of Turbo Streams 2, Coding Rate 1/2 | 9 |
| # of Turbo Streams 2, Coding Rate 1/4 | 11 |

The unused Walsh codes are reserved for other configurations which can be used in other aspects of the invention. However, it is understood that mappings other than that shown in Table 8 can be used in other aspects of the invention.

The 34 bits following the Walsh codes of (16) bits for coding rates shall be reserved space. It is suggested that these bits be filled with a continuation of inverting values of Walsh codes of (16) bits for SRS modes and turbo data rates.

All data field sync segments transmit the current mode. When the current mode changes to the next mode, the next mode is transmitted in even data field sync segments during the next 16 frames. After the next 16 frames, the next mode becomes valid, the system operates in the next mode, and all data field sync segments transmit the next mode.

ATSC Byte Interleaver Mapping

Figure 56:
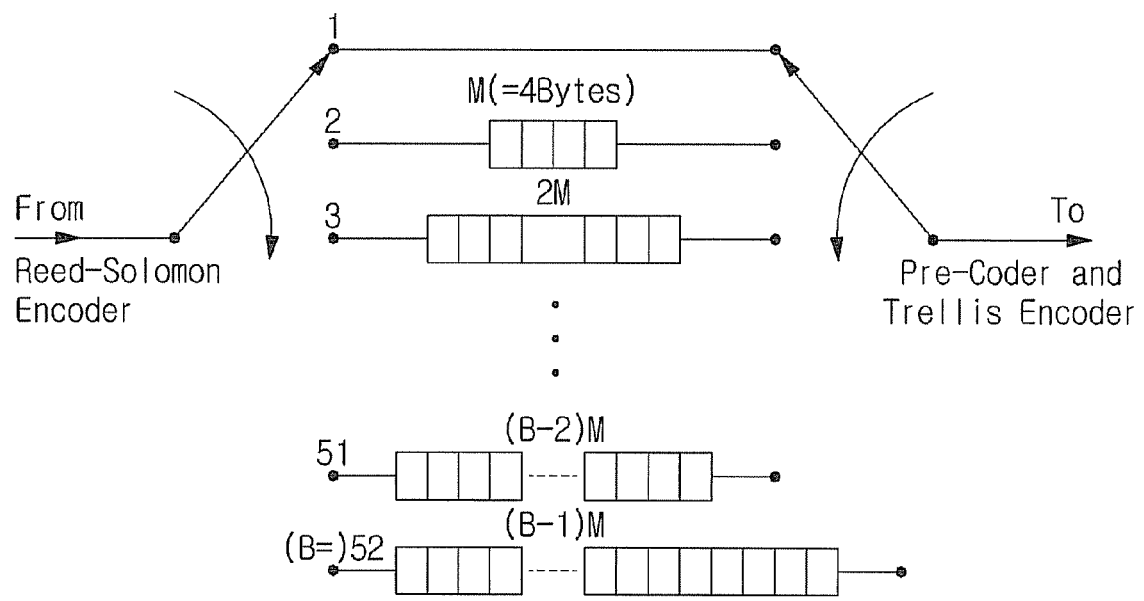
FIG. 56 shows a diagram of an ATSC 52-segment byte interleaver used according to an aspect of the invention.

FIG. 56 shows a diagram of an ATSC 52-segment byte interleaver that is a part of the ATSC 8-VSB system. Since it is crucial to understand the exact mapping of the byte interleaver for A-VSB, a graphical mapping procedure is developed.

Figure 57:
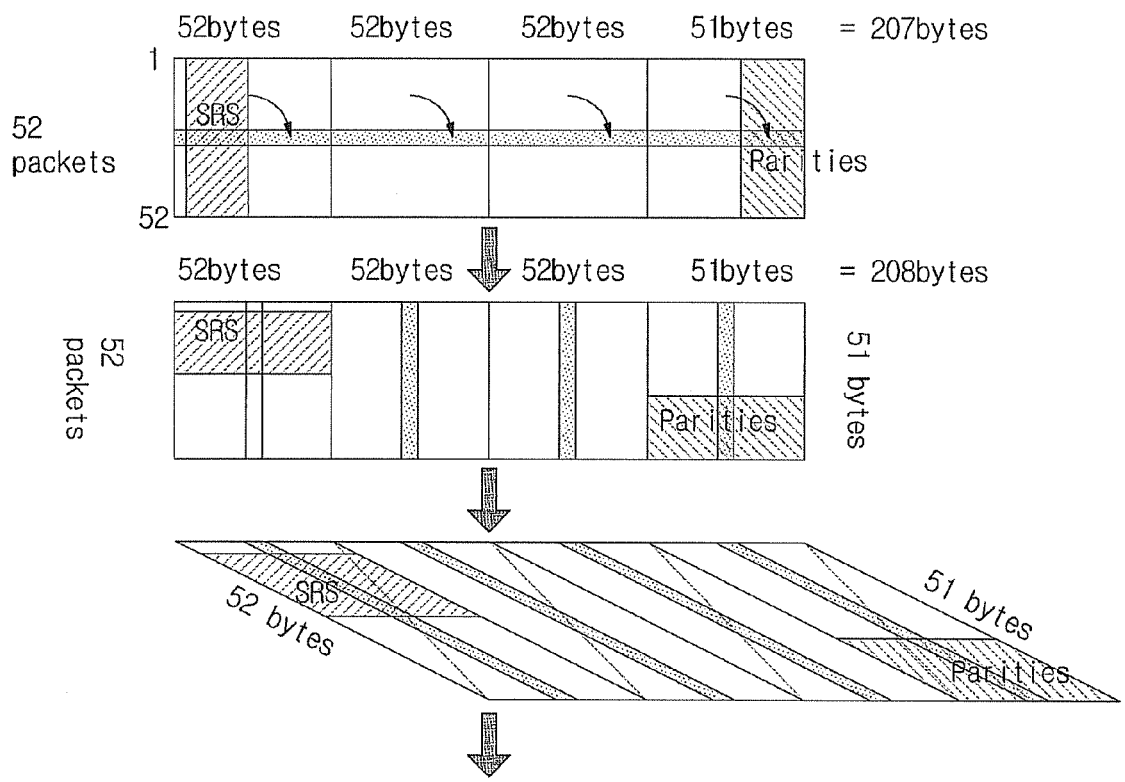
FIG. 57 shows a first stage of manipulation of 52 input packets with SRS in the byte interleaver in FIG. 56 according to an aspect of the invention.
Figure 58:
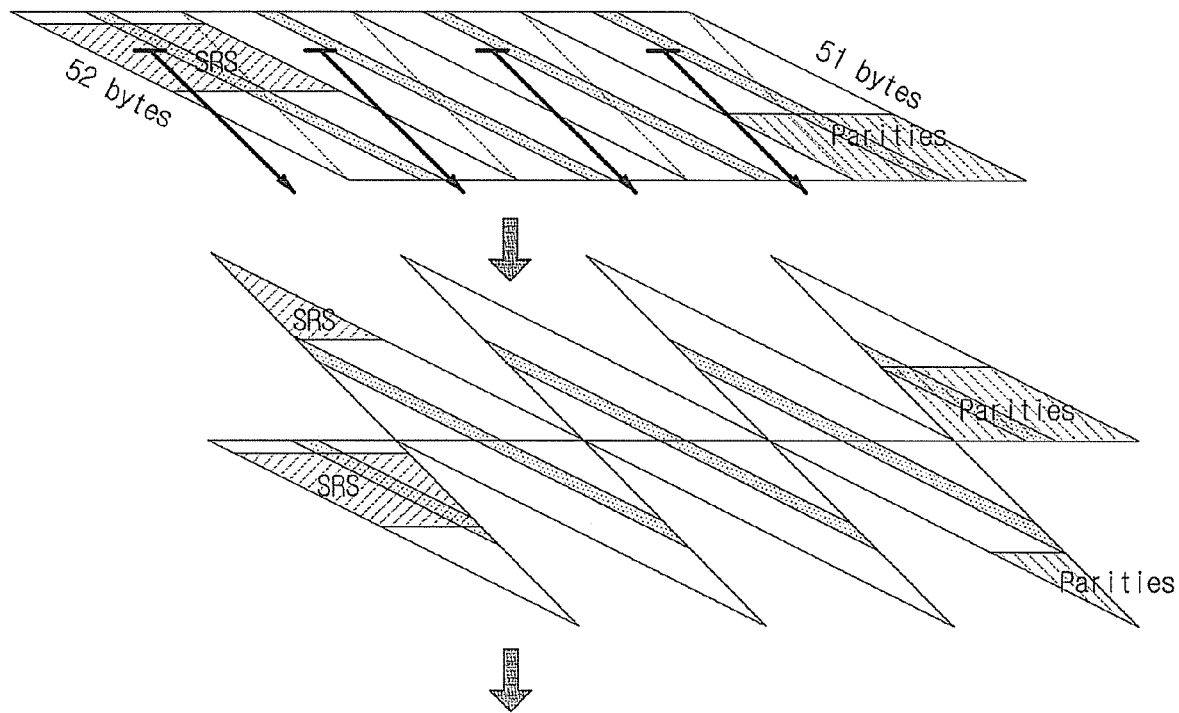
FIG. 58 shows a second stage of manipulation of the 52 input packets with SRS in the byte interleaver in FIG. 56 according to an aspect of the invention.
Figure 59:
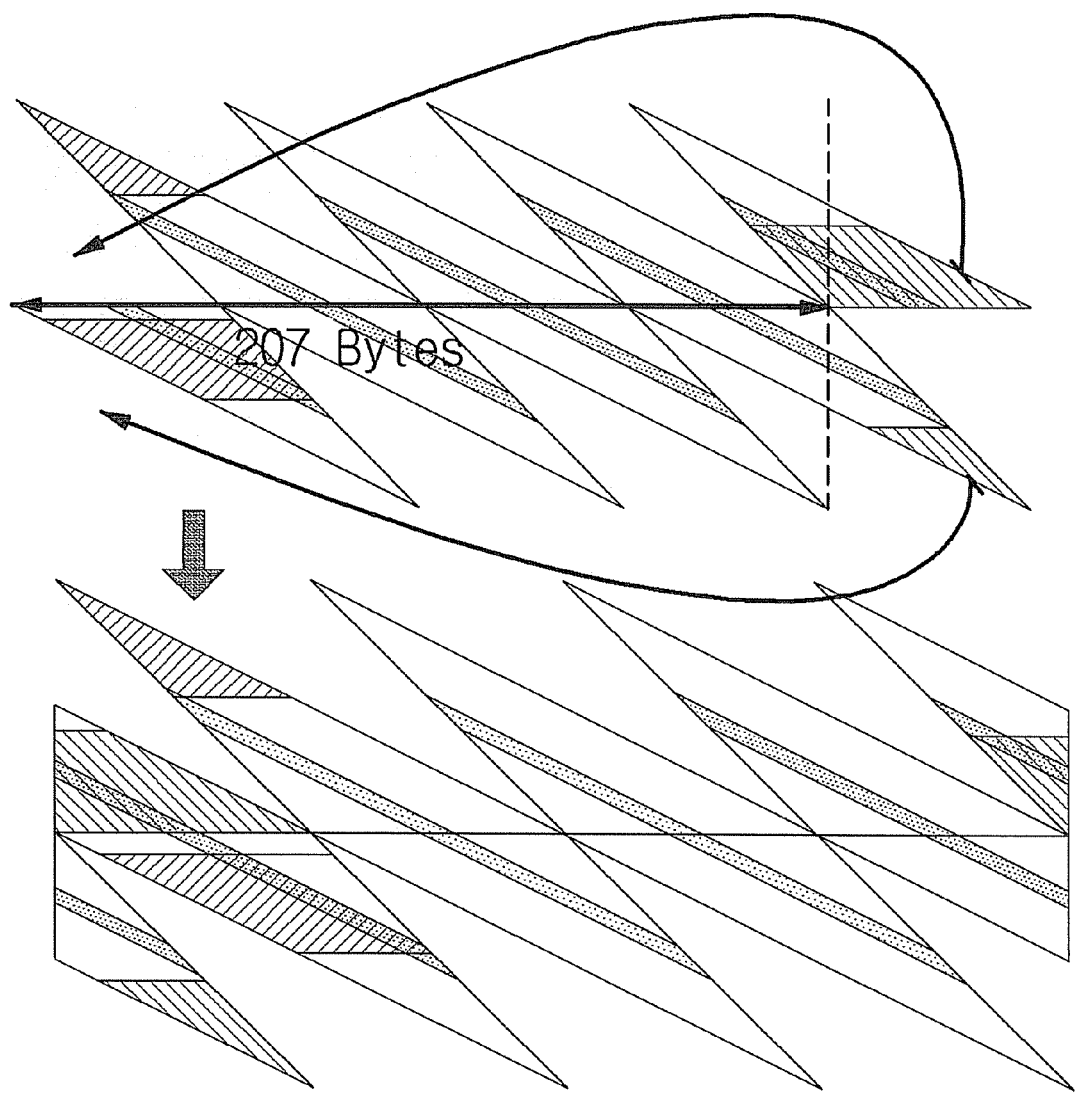
FIG. 59 shows a third stage of manipulation of the 52 input packets with SRS in the byte interleaver in FIG. 56 according to an aspect of the invention.

FIG. 57 shows a first stage of manipulation of 52 input packets with SRS in the byte interleaver in FIG. 56. FIG. 58 shows a second stage of manipulation of the 52 input packets with SRS in the byte interleaver in FIG. 56. FIG. 59 shows a third stage of manipulation of the 52 input packets with SRS in the byte interleaver in FIG. 56.

Figure 60:
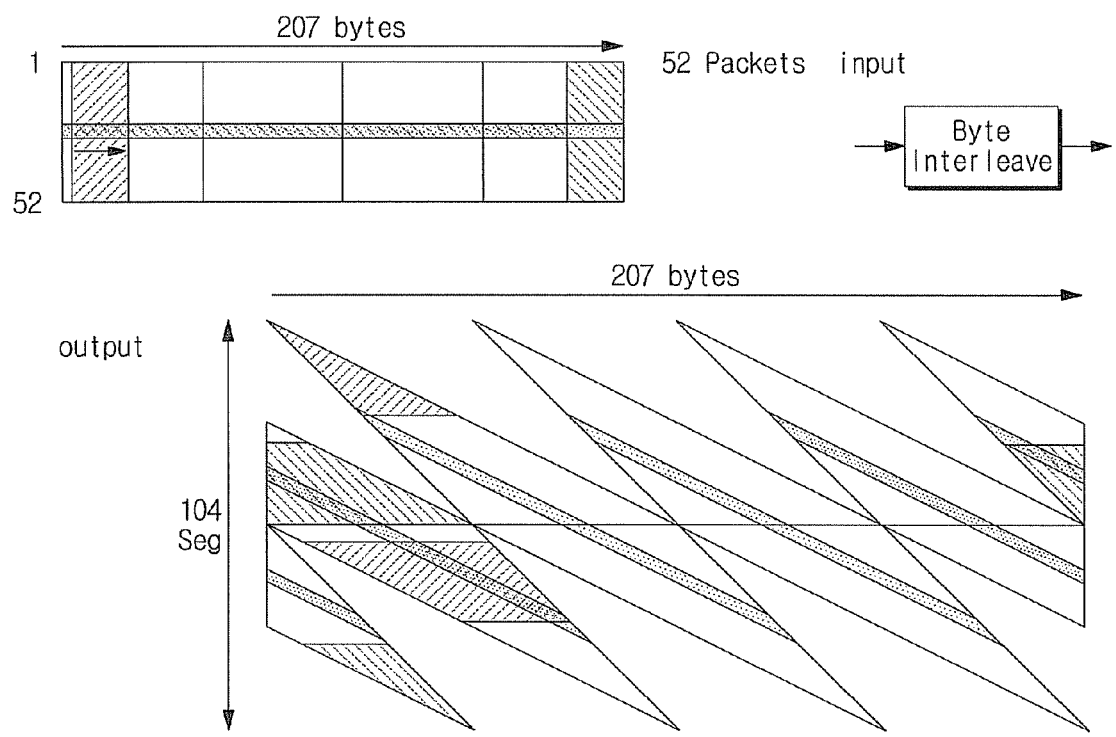
FIG. 60 shows a mapping of 52 input packets performed by the byte interleaver in FIG. 56 according to an aspect of the invention.
Figure 61:
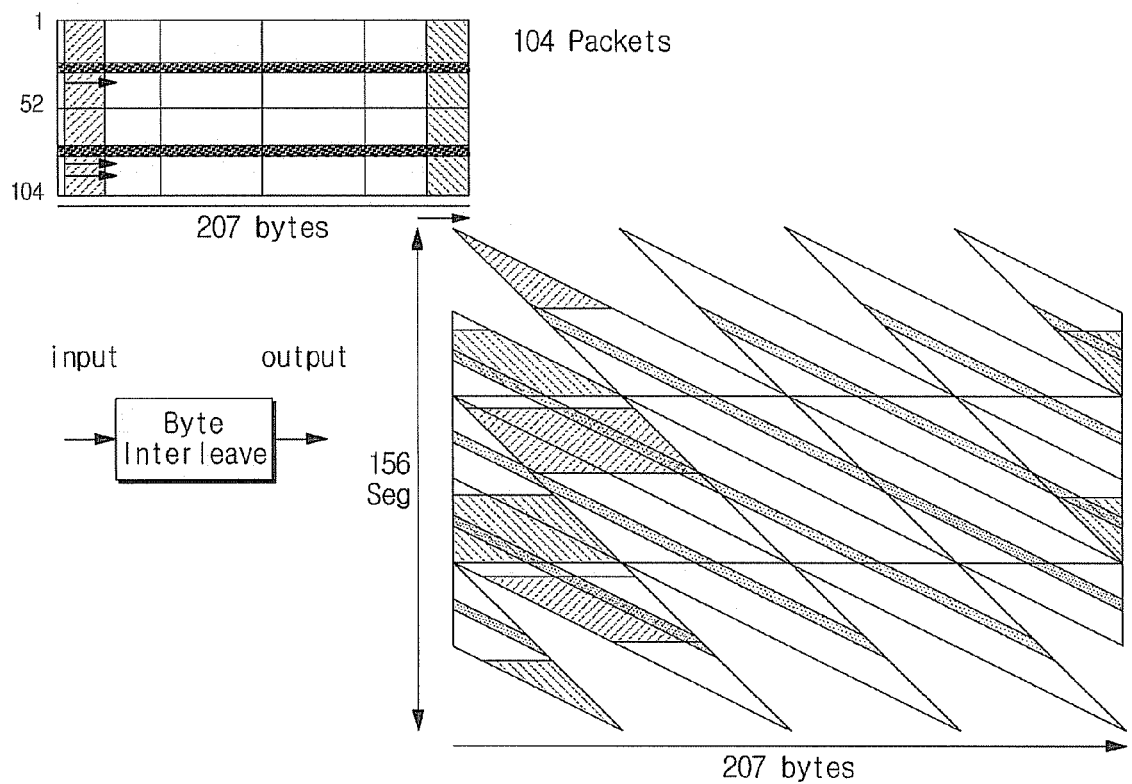
FIG. 61 shows a mapping of 104 input packets performed by the byte interleaver in FIG. 56 according to an aspect of the invention.

FIG. 60 shows a mapping of 52 input packets performed by the byte interleaver in FIG. 56, and FIG. 61 shows a mapping of 104 input packets performed by the byte interleaver in FIG. 56.

Figure 62:
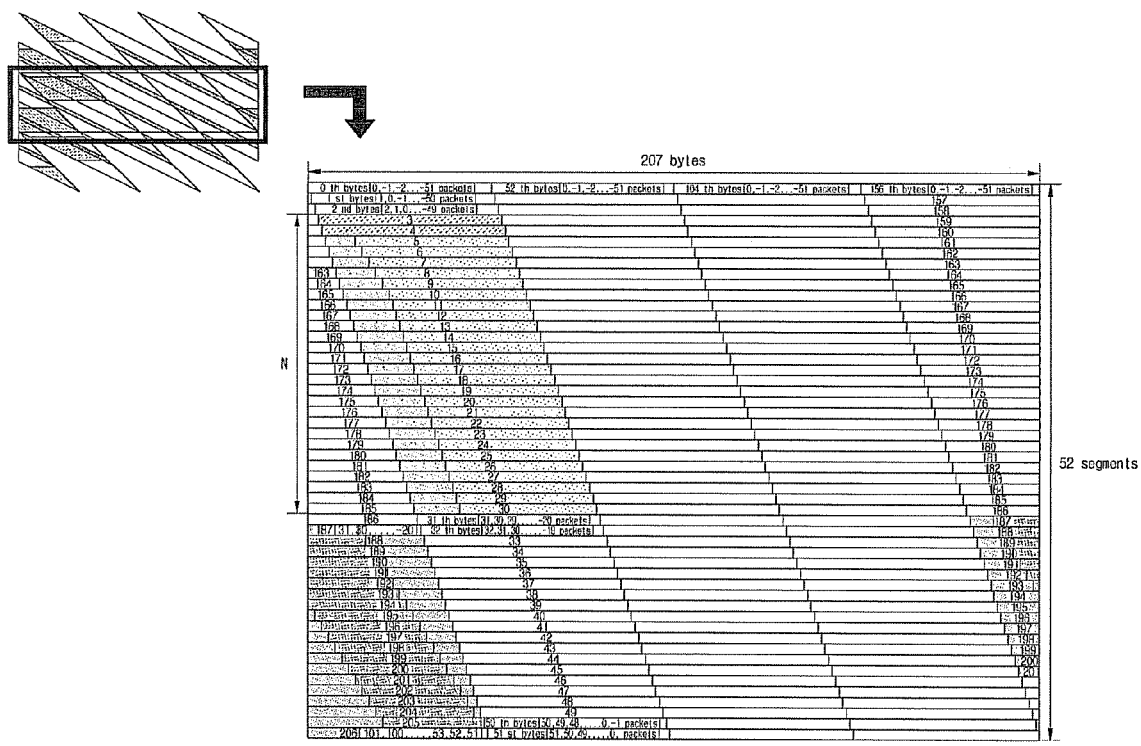
FIG. 62 shows a detail of a mapping performed by the byte interleaver in FIG. 56 when 26bytes are used for SRS according to an aspect of the invention.

FIG. 62 shows a detail of a mapping performed by the byte interleaver in FIG. 56 when 26 bytes are used for SRS.

Digital Broadcasting Receiver

Figure 63:
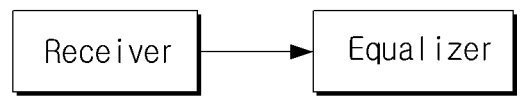
FIG. 63 shows a block diagram of a portion of a digital broadcasting receiver that performs equalization using SRS.

FIG. 63 shows a block diagram of a portion of a digital broadcasting receiver including a receiver to receive a transport stream including SRS data from a digital broadcasting transmitter such as the one shown in FIG. 5, and an equalizer to equalize the received stream using the SRS data in the transport stream. The SRS data in the transport stream is identified by Walsh codes of (16) bits inserted into the reserved area of the data field sync of the transport stream as shown in FIG. 54. In the digital broadcasting transmitter in FIG. 5, the SRS data is inserted into the transport stream by the SRS stuffer, a block diagram of which is shown in FIG. 13, and the data field sync having the reserved area into which the Walsh codes of (16) bits is inserted is multiplexed with the transport stream by the multiplexer MUX.

Conclusion

While described in the context of an ATSC system for use in digital television, it is understood that aspects of the invention can be used in other transmission systems.

Furthermore, statistical multiplexing has proven very efficient for transmitting multiple streams over a single channel, and most broadcasters have adopted it or can be expected to adopt it in the future. Statistical multiplexing is a packet mode communication system, as is A-VSB according to an aspect of the invention, and thus offers another opportunity for implementing A-VSB.

Although several embodiments of the invention have been shown and described, it would be appreciated by those skilled in the art that changes may be made in these embodiments without departing from the principles and spirit of the invention, the scope of which is defined in the claims and their equivalents.

What is claimed is:

1. A digital broadcasting receiver comprising:
   a receiver to receive a transmitted stream from a digital broadcasting transmitter, the transmitted stream comprising a known pattern of symbols and a data field sync; and
   an equalizer to equalize the received stream using the known pattern of symbols,
   wherein the digital broadcasting transmitter comprises an outer encoder for encoding the stream in a ½ or ¼ code rate and a trellis encoder for trellis encoding the stream, and
   wherein the trellis encoder is reset on first 2 symbols, that is 4 bits, of the known pattern of symbols, and the known pattern of symbols is not included in the data field sync.

2. The digital broadcasting receiver of claim 1, wherein the transmitted stream further comprises information regarding the known pattern of symbols, and
   wherein the data field sync comprising a reserved area comprising the information regarding the known pattern of symbols.

3. The digital broadcasting receiver of claim 2, wherein the information regarding the known pattern of symbols is Walsh coded and inserted into the reserved area of the data field sync.

4. The digital broadcasting receiver of claim 2, wherein the information regarding the known pattern of symbols comprises at least one of information on a length of the known pattern of symbols and information on a loss of payload data of the transmitted stream.

* * * * *